(12) United States Patent
Dai et al.

(10) Patent No.: US 12,211,134 B2
(45) Date of Patent: Jan. 28, 2025

(54) ANIMATION OPERATION METHOD, ANIMATION OPERATION PROGRAM, AND ANIMATION OPERATION SYSTEM

(71) Applicant: Sumitomo Electric Industries, Ltd., Osaka (JP)

(72) Inventors: Guiming Dai, Osaka (JP); Toshiaki Kakii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/696,530

(22) PCT Filed: Mar. 3, 2023

(86) PCT No.: PCT/JP2023/008121
§ 371 (c)(1),
(2) Date: Mar. 28, 2024

(87) PCT Pub. No.: WO2023/210164
PCT Pub. Date: Nov. 2, 2023

(65) Prior Publication Data
US 2024/0265613 A1    Aug. 8, 2024

(30) Foreign Application Priority Data

Apr. 26, 2022 (JP) ................................ 2022-072171

(51) Int. Cl.
G06T 13/40 (2011.01)
G06F 3/0488 (2022.01)

(52) U.S. Cl.
CPC ............ *G06T 13/40* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2015/0235370 A1* | 8/2015 | Abovitz | G02B 27/0172 382/103 |
| 2016/0078289 A1* | 3/2016 | Michel | G06T 7/73 345/156 |
| 2018/0067562 A1 | 3/2018 | Saitou | |
| 2019/0025916 A1 | 1/2019 | Okumura et al. | |

FOREIGN PATENT DOCUMENTS

| | | |
|---|---|---|
| CN | 110036412 A | 7/2019 |
| CN | 110114789 A | 8/2019 |
| CN | 114007706 A | 2/2022 |
| JP | 2008-065860 A | 3/2008 |
| JP | 2015-038725 A | 2/2015 |
| JP | 2016-126500 A | 7/2016 |
| JP | 2018-041164 A | 3/2018 |
| JP | 2019-046250 A | 3/2019 |
| WO | 2017/150129 A1 | 9/2017 |
| WO | 2022/079933 A1 | 4/2022 |

* cited by examiner

*Primary Examiner* — Peter Hoang
(74) *Attorney, Agent, or Firm* — XSENSUS LLP

(57) ABSTRACT

An animation operation method includes: correlating a predetermined motion of an animation with a predetermined motion of at least one of a hand and a finger of a user which is detected by a detection device; and performing the predetermined motion of the animation corresponding to the predetermined motion when the predetermined motion is detected by the detection device.

7 Claims, 34 Drawing Sheets

ANIMATION OPERATION METHOD, ANIMATION OPERATION PROGRAM, AND ANIMATION OPERATION SYSTEM

CROSS-REFERENCE TO RELATED APPLICATIONS

The present application is based on PCT filing PCT/JP2023/008121, filed Mar. 3, 2023, which claims priority from Japanese Patent Application No. 2022-072171, filed Apr. 26, 2022, the entire contents of each are incorporated herein by reference.

TECHNICAL FIELD

An aspect of the present disclosure relates to an animation operation method, an animation operation program, and an animation operation system.

BACKGROUND ART

Regarding communication using computers, for example, Japanese Unexamined Patent Application Publication No. 2015-38725 (Patent Literature 1) discloses an utterance animation generation device that generates a face image. The utterance animation generation device generates a viseme sequence by gradually performing speech recognition on speech signals using an acoustic model and a language model which are prepared in advance and a correspondence table between a plurality of phonemes and a plurality of visemes. The utterance animation generation device generates a mixed weight for each of the plurality of visemes by smoothing the generated viseme sequence and generates a face image by mixing a plurality of face models corresponding to the plurality of visemes according to the mixed weight for each of the plurality of visemes.

CITATION LIST

Patent Literature

[Patent Literature 1] Japanese Unexamined Patent Application Publication No. 2015-38725

SUMMARY OF INVENTION

An animation operation method according to an aspect of the present disclosure is an animation operation method of operating a motion of an animation imitating ears which expresses non-verbal information, the animation operation method including: correlating a predetermined motion of the animation with a predetermined motion of at least one of a hand and a finger of a user which is detected by a detection device; and performing the predetermined motion of the animation corresponding to the predetermined motion when the predetermined motion is detected by the detection device.

DESCRIPTION OF EMBODIMENTS

Figure 1:
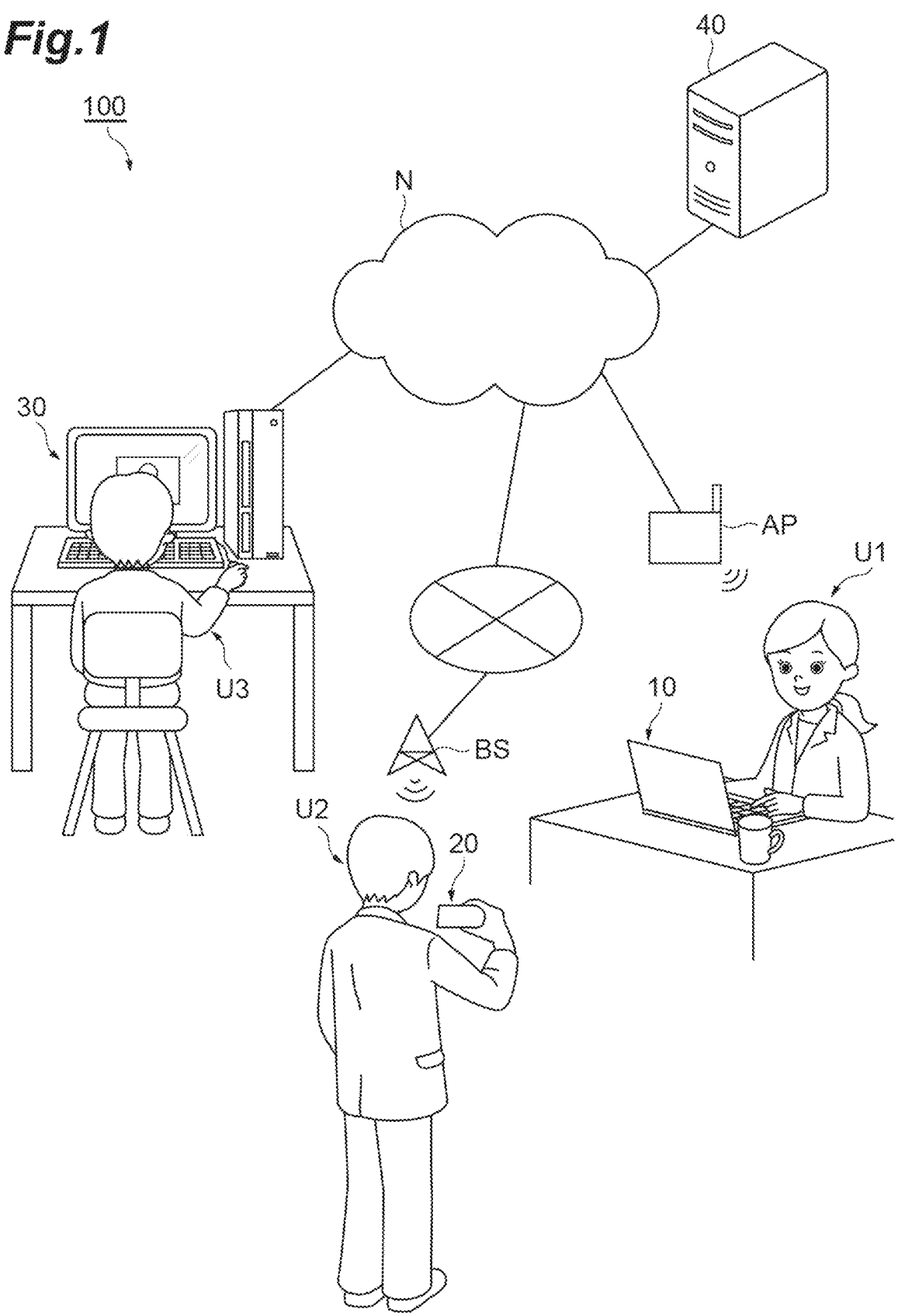
FIG. 1 is a diagram schematically illustrating an example of a configuration of a communication support system according to an embodiment.

Problems to Be Solved by Present Disclosure

In a video conference (a web meeting) or the like, users may participate in the conference using only speech without using cameras in view of a communication environment (such as band restriction) or privacy. In this case, icons of the users participating in the conference or the like are displayed on terminals of the users. It is difficult to recognize (ascertain) a status or situation in which a communication partner is interested in making an utterance from display of the icons or the like. Accordingly, it is difficult to achieve smooth communication.

Therefore, in order to achieve smooth communication, there is a method of displaying a user status using an ear animation (an animation imitating ears of an animal). The animation is generated by estimating the user state based on speech data and image data acquired by the corresponding terminal. In this case, since the user status is reflected in the animation in real time, a user can recognize a status of another user who is a communication partner. Accordingly, it is possible to realize smooth communication in a conversation which is made using terminals.

Here, it may not be necessarily preferable to reflect a user status in an animation in real time. For example, when a user performs a different action (checking of a mail or the like) during a video conference, the user may not want another user to see the user participating in the video conference while performing the different action. When a user status is estimated and reflected in an animation in real time, the user may feel a strain. Accordingly, it is preferable to reflect only necessary motions in an animation at a timing intended by a user.

An objective of an aspect of the present disclosure is to provide an animation operation method, an animation operation program, and an animation operation system that can operate an animation according to a user's intention.

Advantageous Effects of Present Disclosure

According to an aspect of the present disclosure, it is possible to operate an animation in accordance with a user's intention.

Description of Embodiments of Present Disclosure

First, details of embodiments of the present disclosure will be described below. At least some of the embodiments described below may be arbitrarily combined.

(1) An animation operation method according to an aspect of the present disclosure is an animation operation method of operating a motion of an animation imitating ears which expresses non-verbal information, the animation operation method including: correlating a predetermined motion of the animation with a predetermined motion of at least one of a hand and a finger of a user which is detected by a detection device; and performing the predetermined motion of the animation corresponding to the predetermined motion when the predetermined motion is detected by the detection device.

In the animation operation method according to the aspect of the present disclosure, a predetermined motion of a predetermined animation is corrected with a predetermined motion of at least one of a hand and a finger of a user detected by the detection device, and the predetermined motion of the animation corresponding to the predetermined motion is performed when the predetermined motion is detected by the detection device. Accordingly, when a motion of the user is not detected as the predetermined motion by the detection device, the animation does not operate. The predetermined animation operates when a specific motion is detected by the detection device. Accordingly, for example, when a motion of simply moving the hand or the finger is performed, the animation does not operate. In this way, it is possible to reflect only a necessary motion in the animation at a timing intended by the user. Accordingly, it is possible to operate the animation according to the user's intention.

(2) In (1), the predetermined motion of the animation may be similar to the predetermined motion of at least one of the hand and the finger of the user. Accordingly, the predetermined animation is executed by performing the predetermined motion similar to (associated with) the predetermined animation. As a result, it is possible to realize an intuitive operation.

(3) In (1) or (2), the detection device detecting a motion of the finger of the user may be used, a predetermined motion of the animation may be correlated with the predetermined motion of the finger of the user detected by the detection device, and the predetermined motion of the animation corresponding to the predetermined motion of the finger may be performed when the predetermined motion is detected by the detection device. Accordingly, the predetermined animation operates when a specific motion of the finger is detected by the detection device. As a result, for example, when a motion of simply moving the finger is performed, the animation does not operate. In this way, it is possible to reflect only a necessary motion in the animation at a timing intended by the user. Accordingly, it is possible to operate the animation according to the user's intention.

(4) In (1) or (2), the detection device including an angular velocity detecting unit configured to detect an angular velocity of the detection device may be used, a predetermined motion of the animation may be correlated with a predetermined value of the angular velocity detected by the angular velocity detecting unit, and the predetermined motion of the animation corresponding to the predetermined value may be performed when the angular velocity of the predetermined value is detected by the angular velocity detecting unit through the user's operation of the detection device. Accordingly, when the detection device is not operated by the user, the animation does not operate. The predetermined animation operates when a specific operation with which the angular velocity of the detection device becomes the predetermined value is performed. Accordingly, for example, when a motion of simply moving the detection device is performed, the animation does not operate. In this way, it is possible to reflect only a necessary motion in the animation at a timing intended by the user. Accordingly, it is possible to operate the animation according to the user's intention.

(5) In (4), the detection device may be held and used by the hand of the user. Accordingly, it is possible to operate the motion of the animation with the motion of the finger (hand) of the user.

(6) In (4), the detection device may be worn on the finger of the user for use. Accordingly, it is possible to operate the motion of the animation with the motion of the hand of the user.

(7) In any one of (4) to (6), the detection device including a display unit displaying the animation may be used. Accordingly, since the animation is displayed on the display unit of the detection device, it is possible to operate the detection device while ascertaining the animation.

(8) In any one of (4) to (7), a predetermined motion of the animation may be performed when a predetermined input or operation for performing the predetermined motion of the animation is carried out by the user. Accordingly, when a predetermined input or operation is not carried out by the user, the predetermined animation does not operate. As a result, it is possible to avoid operating of the animation against the user's intention.

(9) In (8), the detection device including a push unit configured to be pushed by the user may be used, and the predetermined motion of the animation may be performed when the push unit is pushed by the user. In this way, when the push unit of the detection device is pushed as the predetermined motion of the user, the predetermined animation is operated. Accordingly, when the push unit is not pushed by the user, the predetermined animation does not operate. As a result, it is possible to avoid operating of the animation against the user's intention.

(10) In (8), the detection device including an input unit configured to receive an input of speech of the user may be used, and the predetermined motion of the animation may be performed when the speech of the user is input to the input unit. In this way, when speech of the user is input to the input unit of the detection device as the predetermined motion of the user, the predetermined animation is operated. Accordingly, when speech is not input by the user, the predetermined animation does not operate. As a result, it is possible to avoid operating of the animation against the user's intention.

(11) In (8), the predetermined motion of the animation may be performed when the angular velocity detected by the angular velocity detecting unit becomes equal to or greater than a predetermined value through the user's operation of the detection device. The predetermined value of the angular velocity can be set to be equal to or greater than a fixed value of the angular velocity. Accordingly, it is possible to operate the motion of the predetermined animation even when the user does not perform any specific operation (such as push of a button).

(12) In any one of (1) to (11), the detection device including an acceleration detecting unit configured to detect acceleration of the detection device may be used, a predetermined motion of the animation may be correlated with a predetermined value of the acceleration detected by the acceleration detecting unit, and the predetermined motion of the animation corresponding to the predetermined value may be performed when the acceleration of the predetermined value is detected by the acceleration detecting unit through the user's operation of the detection device. Accordingly, when the detection device is not operated by the user, the animation does not operate. The predetermined animation operates when a specific operation in which the acceleration of the detection device reaches the predetermined value is performed. Accordingly, for example, when an operation of simply moving the detection device is performed, the animation does not operate. In this way, it is possible to reflect only a necessary motion at a timing intended by the user. As a result, it is possible to operate the animation according to the user's intention.

(13) In any one of (1) to (12), the detection device detecting at least one of a motion speed and a moving quantity of at least one of the hand and the finger of the user may be used, and a predetermined motion of the animation may be changed based on the at least one of the motion speed and the moving quantity. With this method, a motion speed of the animation changes or a moving quantity thereof changes according to the motion speed or the moving quantity. Accordingly, the animation can express (display) sensitive non-verbal information corresponding to a situation of the user. As a result, since an emotion (feeling) of the user is expressed better by the animation, it is possible to realize smooth communication.

(14) An animation operation program according to another aspect of the present disclosure is an animation operation program for operating a motion of an animation imitating ears which expresses non-verbal information, the animation operation program causing a computer to perform: correlating a predetermined motion of the animation with a predetermined motion of at least one of a hand and a finger of a user which is detected by a detection device; and performing the predetermined motion of the animation corresponding to the predetermined motion when the predetermined motion is detected by the detection device.

In the animation operation program according to the aspect of the present disclosure, a predetermined motion of a predetermined animation is corrected with a predetermined motion of at least one of a hand and a finger of a user detected by the detection device, and the predetermined motion of the animation corresponding to the predetermined motion is performed when the predetermined motion is detected by the detection device. Accordingly, when a motion of the user is not detected as the predetermined motion by the detection device, the animation does not operate. The predetermined animation operates when a specific motion is detected by the detection device. Accordingly, for example, when a motion of simply moving the hand or the finger is performed, the animation does not operate. In this way, it is possible to reflect only a necessary motion in the animation at a timing intended by the user. Accordingly, it is possible to operate the animation according to the user's intention.

(15) An animation operation system according to another aspect of the present disclosure is an animation operation system for operating a motion of an animation imitating ears which expresses non-verbal information, wherein a predetermined motion of the animation is correlated with a predetermined motion of at least one of a hand and a finger of a user which is detected by a detection device, and the predetermined motion of the animation corresponding to the predetermined motion is performed when the predetermined motion is detected by the detection device.

In the animation operation system according to the aspect of the present disclosure, a predetermined motion of a predetermined animation is corrected with a predetermined motion of at least one of a hand and a finger of a user detected by the detection device, and the predetermined motion of the animation corresponding to the predetermined motion is performed when the predetermined motion is detected by the detection device. Accordingly, when a motion of the user is not detected as the predetermined motion by the detection device, the animation does not operate. The predetermined animation operates when a specific motion is detected by the detection device. Accordingly, for example, when a motion of simply moving the hand or the finger is performed, the animation does not operate. In this way, it is possible to reflect only a necessary motion in the animation at a timing intended by the user. Accordingly, it is possible to operate the animation according to the user's intention.

Details of Embodiments of Present Disclosure

Specific examples of embodiments of the present disclosure will be described below with reference to the accompanying drawings. The present disclosure is not limited to such examples, is defined by the appended claims, and is intended to include all modifications within meanings and scopes equivalent to the claims. The same elements in description with reference to the drawings will be referred to by the same reference signs, and repeated description thereof will be omitted.

FIG. 1 is a diagram schematically illustrating an example of a configuration of a communication support system (an animation operation system) (hereinafter also simply referred to as a "system"). The system 100 is a computer system that supports communication. Examples of communication accompany a telephone conversation with another user such as a television conference, a medical examination, counseling, an interview (character evaluation), and telework.

<Configuration of System>

The system 100 includes a terminal 10, a terminal 20, and a terminal 30. In the example illustrated in FIG. 1, the terminal 10 is a laptop personal computer (PC) that is used by a user U1. The terminal 20 is a mobile phone (such as a smartphone) that is used by a user U2. The terminal 30 is a desktop PC that is used by a user U3. The terminal 10, the terminal 20, and the terminal 30 can be connected to a network N. In this example, the terminal 10 is connected to the network N via an access point AP, the terminal 20 is connected to the network N via a base station BS, and the terminal 30 is connected to the network N by a wire (not illustrated). In addition to the PC and the mobile phone, a tablet terminal, a wearable terminal, a head-mounted display (HMD) terminal, and various other terminals may be used as the terminal 10, the terminal 20, and the terminal 30. The number of terminals included in the system 100 is not limited to the example illustrated in FIG. 1.

The system 100 includes a server 40. The server 40 is connected to the network N. Accordingly, the terminal 10, the terminal 20, and the terminal 30 and the server 40 can communicate with each other via the network N. The number of servers included in the system 100 is not limited to the example illustrated in FIG. 1.

The configuration of the network N is not particularly limited. For example, the network N may include the Internet (a public network), a communication carrier network, and a provider network.

Figure 2:
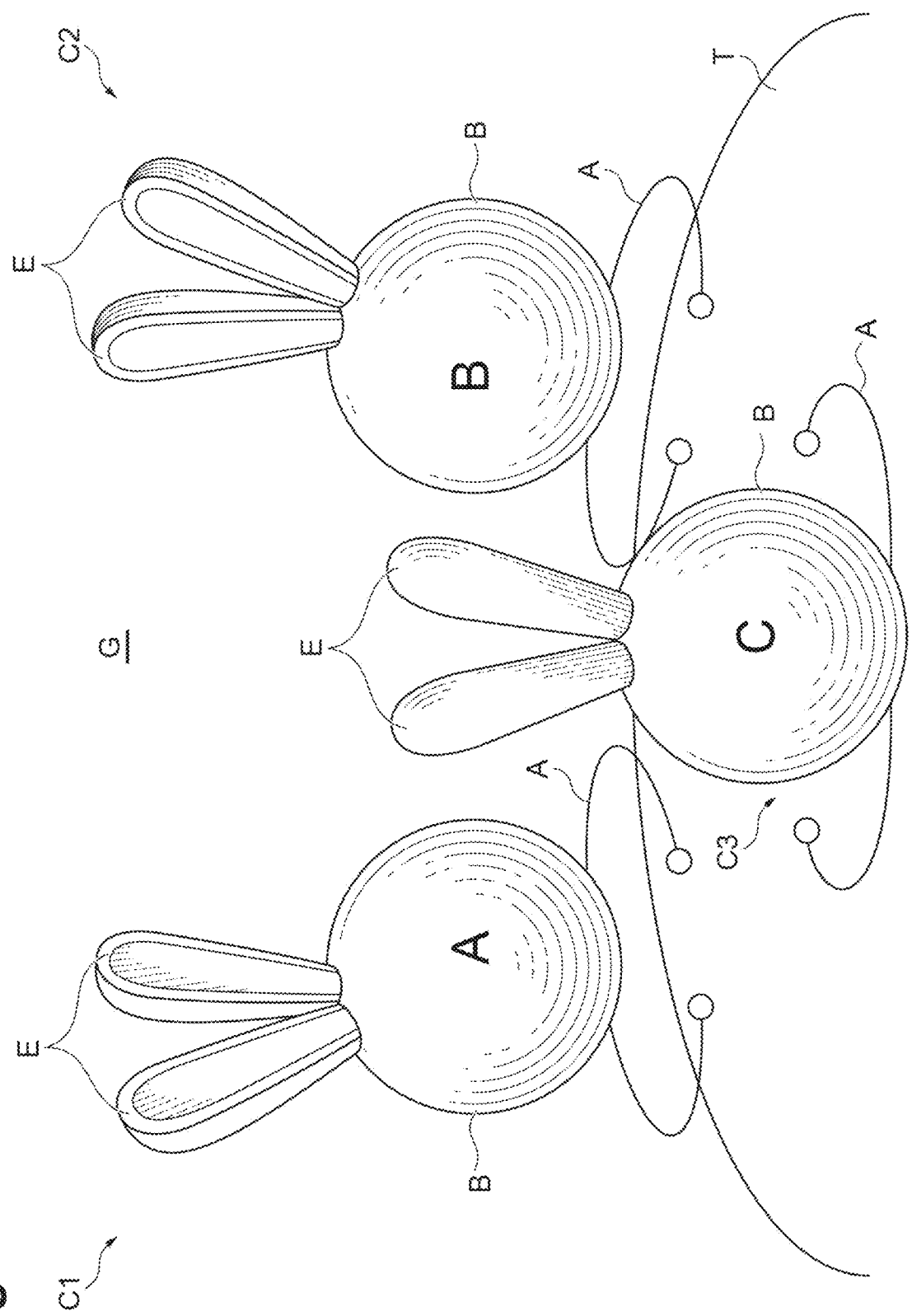
FIG. 2 is a diagram illustrating an example of communication which is provided by the communication support system according to the embodiment.

FIG. 2 is a diagram illustrating an example of communication that is provided by the system 100. Communication is performed using a communication screen G which is displayed by a computer. The communication screen G is displayed on the terminal 10, the terminal 20, and the terminal 30 and is presented to the user U1, the user U2, and the user U3. The users U1, U2, and U3 serve as communication partners with each other. In the example illustrated in FIG. 2, a character C1 of the user U1, a character C2 of the user U2, and a character C3 of the user U3 are displayed on the communication screen G as participants in communication. The characters C1, C2, and C3 are displayed, for example, in the same size on the communication screen G.

In the example illustrated in FIG. 2, the characters C1, C2, and C3 are displayed in one space (a continuous background space). In the space, for example, a table T is displayed as an object. The characters C1, C2, and C3 are displayed to surround the table T and to face each other. The characters C1, C2, and C3 are arranged, for example, at equidistant intervals (intervals of 60°) on the table T. In the example illustrated in FIG. 2, the character C1 and the character C2 are obliquely displayed around the table T to face each other. The character C3 is displayed such that the back appears at the screen center. When the screen illustrated in FIG. 2 is a screen of the terminal 30 of the user U3, the character C3 of the user U3 may be displayed such that the back thereof appears as a default. In this case, since ear animations E of the characters C1 and C2 of the other users U1 and U2 are easy to see, it is possible to accurately ascertain the statuses of the other users U1 and U2.

By turning the table T, positions of the characters C1, C2, and C3 can be changed. In addition, a viewpoint can be changed. For example, the viewpoint can be changed to a viewpoint at which the characters C1, C2, and C3 are viewed from above (a bird's-eye viewpoint, an overhead viewpoint). This change of a viewpoint may be performed through manual operation of a keyboard or the like or may be performed based on sensing of a wearable sensor. In this way, by displaying the character C1, the character C2, and the character C3 in a single continuous space, it is possible to produce presence in the same space. Accordingly, it is possible to realize a conversation with presence and togetherness.

The characters C1, C2, and C3 represent the users U1, U2, and U3 on the communication screen G. The characters C1, C2, and C3 are dynamic characters. The characters C1, C2, and C3 are generated by image materials independent from real images (such as imaging data) of the users U1, U2, and U3. The image materials are materials for generating an animation character. The characters C1, C2, and C3 may be drawn by two-dimensional or three-dimensional computer graphics (CG).

Each of the characters C1, C2, and C3 includes a body B and an ear animation E. In the characters C1, C2, and C3, the body B and the ear animation E are displayed as a unified body on the communication screen G. Display as a unified body means that the body B and the ear animation E are visually recognized as a lump when each of the characters C1, C2, and C3 is viewed. That is, display as a unified body means a state in which it can be recognized at a glance that the body B and the ear animation E are coupled (correlated). Accordingly, display as a unified body may be a state in which the body B and the ear animation E are connected or a state in which the body B and the ear animation E are separated.

The body B is identification information for identifying a user which is a communication partner. The body B includes at least one of an image indicating the user and text indicating the user. Shadows are displayed in the characters C1, C2, and C3. The body B has a spherical shape and includes text ("A," "B," or "C") for identifying the user. Each of the characters C1, C2, and C3 may include an utterance animation (not illustrated) or may include an arm animation A.

The ear animation E is an animation representing non-verbal information. The ear animation E is an animation representing a user status (motion). The ear animation E is an animation expressing a user status in a shape different from a real moving part of the user. The ear animation E does not include a facial expression which changes dynamically. The ear animation E is displayed outside of a display area of the body B to protrude from the display area. The ear animation E is an animation imitating ears of an animal (for example, a rabbit) and operates according to a change of the user status. The ear animation E operates according to a motion of the user. The ear animation E performs, for example, motions such as expansion and contraction, folding, and swinging.

In the system 100, statuses, reactions, and the like of the users U1, U2, and U3 can be ascertained using the ear animations E of the characters C1, C2, and C3 displayed on the communication screen G.

Figure 3:
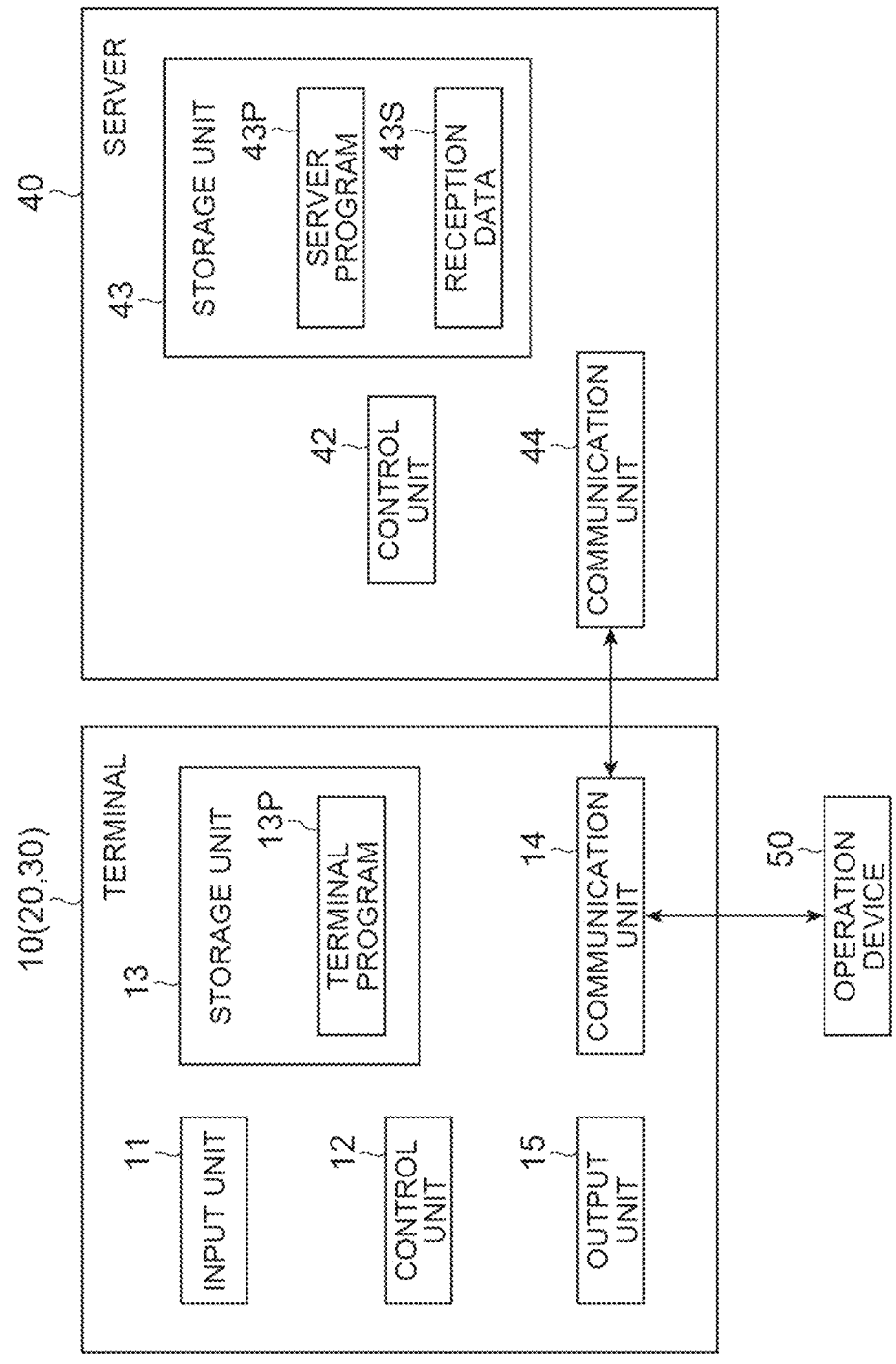
FIG. 3 is a diagram illustrating an example of functional blocks of a terminal and a server.

FIG. 3 is a diagram illustrating an example of functional blocks of the terminal 10, the terminal 20, the terminal 30, and the server 40. The functional blocks of the terminal 20 and the terminal 30 are the same as the functional blocks of the terminal 10, and thus the terminal 10 and the server 40 will be described below. The terminal 10 will be first described and then the server 40 will be described.

<Configuration of Terminal>

The terminal 10 includes an input unit 11. The input unit 11 is a part to which speech data and image data of the user U1 are input. Video data of the user U1 may be input to the input unit 11. A video includes speech data and image data of the user U1.

The terminal 10 includes a control unit 12. The control unit 12 is a part that generates control data of the user U1. The control data of the user U1 is generated based on motion data which is output from an operation device (detection device) 50. In this embodiment, data causing the ear animation E of the character C1 to perform six motions such as "nod," "agreement," "praise (applause)," "inquiry," "show of hands," and "surprise" is generated as the control data.

The control data is correlated with motion data. In this embodiment, motion data is correlated with the control data for "nod," "agreement," "praise (applause)," "inquiry," "show of hands," and "surprise." The motion data is data that is transmitted from the operation device 50. When the motion data corresponds to the control data, the control unit 12 generates the control data.

The control data may be generated based on the speech data and the image data of the user U1 input to the input unit 11. The image data is constituted by a plurality of successive unit frames. Each unit frame generally includes image information of the user U1. For example, image data of 60 frames/second includes 60 unit frames per second. Details of generation of the control data by the control unit 12 will be described later.

The control unit 12 generates control data for controlling the motion of the character C1 based on a sightline of the user detected based on the image data. For example, when the user U1 gazes at the character C2, the character C1 is made to face the character C2. That is, the body B and the ear animation E of the character C1 are rotated by, for example, 30° about a Z axis (an axis in a vertical direction) to cause the character C1 to face the character C2. Accordingly, the ear animation E of the character C1 faces the character C2 from the front. When the sightline of the user U1 is not directed to the characters C2 and C3, the character C1 may be made to face forward.

The motion of the character C1 based on information associated with a sightline may not exactly match the sightline of the user U1. For example, when the user U1 turns the sightline after the sightline has faced the character C2, the character C1 may face the character C2 for a predetermined time. That is, a stop time may be set such that the character C1 stops in a state in which the sightline faces the other character. A speed at which the user U1 moves the sightline to the character C2 may not match a speed at which the character C1 turns. That is, a turning speed of the character C1 may be set. Since the character C1 does not need to move (turn) frequently according to the sightline of the user U1 through this setting, it is possible to avoid interruption of movement of the character C1 with a conversation.

The control unit 12 generates sightline data including information associated with the sightline of the user U1. The control unit 12 outputs the sightline data to a communication unit 14.

The control unit 12 can add content for controlling the rhythm of the motion of the character C1 to the control data.

The control unit 12 generates control data with an adjusted (set) rhythm for the motions (folding, expansion and contraction, vibration, color change, and the like) of the ear animation E.

The control unit 12 detects an utterance speed based on speech data and reflects a rhythm based on the utterance speed in the motion of the ear animation E. The control unit 12 can divide speech data into sub words based on a speech model or an acoustic model and detect the utterance speed. The control unit 12 reflects the rhythm based on the utterance speed of the user U1 in the motion of the ear animation E of the character C1.

The control unit 12 detects a motion (swinging or the like) speed of the body of the user U1 based on image data and reflects a rhythm based on the motion speed in the motion of the ear animation E. The control unit 12 can detect a key point (a joint point of the body) based on a posture estimation model, detect a trajectory of movement of the key point at intervals of a predetermined time from time-series scenes, and detect the motion speed. The control unit 12 reflects a rhythm based on the motion speed of the user U1 in the motion of the ear animation E of the character C1.

The control unit 12 also a part that controls the motions of the characters C1, C2, and C3 based on the control data. The control unit 12 displays the characters C1, C2, and C3 on the communication screen G based on the generated control data and the received control data and controls the motions of the ear animations E of the characters C1, C2, and C3.

When the user U1 is a receiving user (a listener), the control unit 12 may synchronize the motion of the ear animation E of the character C1 with the rhythm based on the utterance speed of the character C2 or the character C3 who is a speaker based on the received control data. When there is no speaker (no user speaks), the control unit 12 causes the ear animations E of the characters C1, C2, and C3 in a prescribed rhythm (a rhythm applied to the characters of all the users).

The control unit 12 is also a part that generates video data of the communication screen G. The video data of the communication screen G includes video data of the character C1, the character C2, and the character C3 which are controlled based on the control data. In addition, the video data of the communication screen G may include various objects appearing on the communication screen G.

The terminal 10 includes a storage unit 13. The storage unit 13 is a part that stores information necessary for control (processing) of the terminal 10. In FIG. 3, a terminal program 13P is illustrated as information stored in the storage unit 13. The terminal program 13P is a program for operating the terminal 10, and operates a computer to perform control by the control unit 12 or the like. Since the system 100 is a communication support system, the terminal program 13P can also be referred to as a communication support program (an animation operation program).

The terminal 10 includes a communication unit 14. The communication unit 14 is a part that communicates with an external device outside of the terminal 10 via the network N (see FIG. 1). Examples of the external device outside of the terminal 10 include the terminal 20, the terminal 30, the server 40, and the operation device 50. The communication unit 14 transmits speech data and control data generated by the control unit 12 to the server 40 or receives speech data and control data from the server 40. The communication unit 14 is a part that communicates with the operation device 50.

The communication unit 14 transmits sightline data to the operation device 50 or receives motion data from the operation device 50.

The terminal 10 includes an output unit 15. The output unit 15 outputs a video of the communication screen G. The video of the communication screen G is a video based on video data of the communication screen G generated by the control unit 12.

<Configuration of Server>

The server 40 includes a control unit 42. The control unit 42 controls the operation of the server 40. The server 40 includes a storage unit 43. The storage unit 43 is a part that stores information necessary for control of the server 40. In FIG. 3, a server program 43P and reception data 43S are illustrated as the information stored in the storage unit 43. The server program 43P is a program for operating the server 40 and operates a computer to perform control by the control unit 42 or the like. The reception data 43S is data which is sent from the terminal 10, the terminal 20, and the terminal 30 to the server 40 and may include control data generated by the terminal 10, the terminal 20, and the terminal 30.

The server 40 includes a communication unit 44. The communication unit 44 is a part that communicates with an external device outside of the server 40 via the network N (see FIG. 1). Examples of the external device outside of the server 40 include the terminal 10, the terminal 20, and the terminal 30. The communication unit 44 receives control data of the user U1, control data of the user U2, and control data of the user U3 from the terminal 10, the terminal 20, and the terminal 30 or transmits control data generated by the terminal 10, the terminal 20, and the terminal 30 to the terminal 10, the terminal 20, and the terminal 30.

<Hardware Configuration>

An example of hardware configurations of the functional parts of the terminal 10 and the server 40 will be described below. The communication unit 44 of the server 40 can be constituted by a network card or a wireless communication device such that it can access the network N. The control unit 42 of the server 40 can be constituted by a processor such as a central processing unit (CPU) or a graphics processing unit (GPU), a clock, and an internal memory. The control unit 42 may be constituted as a single hardware piece (system on a chip (SoC)) in which the processor, the clock, the internal memory, the storage unit 43, and the communication unit 44 are integrated. The control unit 42 causes a server computer to operate as the server 40 by operating based on the server program 43P. The storage unit 43 of the server 40 can be constituted by a nonvolatile storage medium such as a flash memory, a hard disk, or a solid state disk (SSD).

The input unit 11 of the terminal 10 can be constituted by a microphone, a camera, and the like. Speech of the user U1 is acquired by the microphone. That is, the microphone is a kind of speech sensor that acquires speech. An image of the user U1 is acquired by the camera. That is, the camera is a kind of image sensor that acquires an image. The input unit 11 may be constituted by an operation device such as a keyboard, a mouse, or a touch panel. The control unit 12 of the terminal 10 may have the same configuration as the control unit 42 of the server 40. The control unit 12 causes a general-purpose computer to operate as the terminal 10 by operating based on the terminal program 13P. The storage unit 13 of the terminal 10 may have the same configuration as the storage unit 43 of the server 40. The communication unit 14 of the terminal 10 may have the same configuration as the communication unit 44 of the server 40. The output unit 15 of the terminal 10 can be constituted by a display device such as a liquid crystal panel or an organic EL panel (which may be a touch panel). The output unit 15 may be constituted by a speaker.

First Embodiment

<Configuration of Operation Device>

Figure 4:
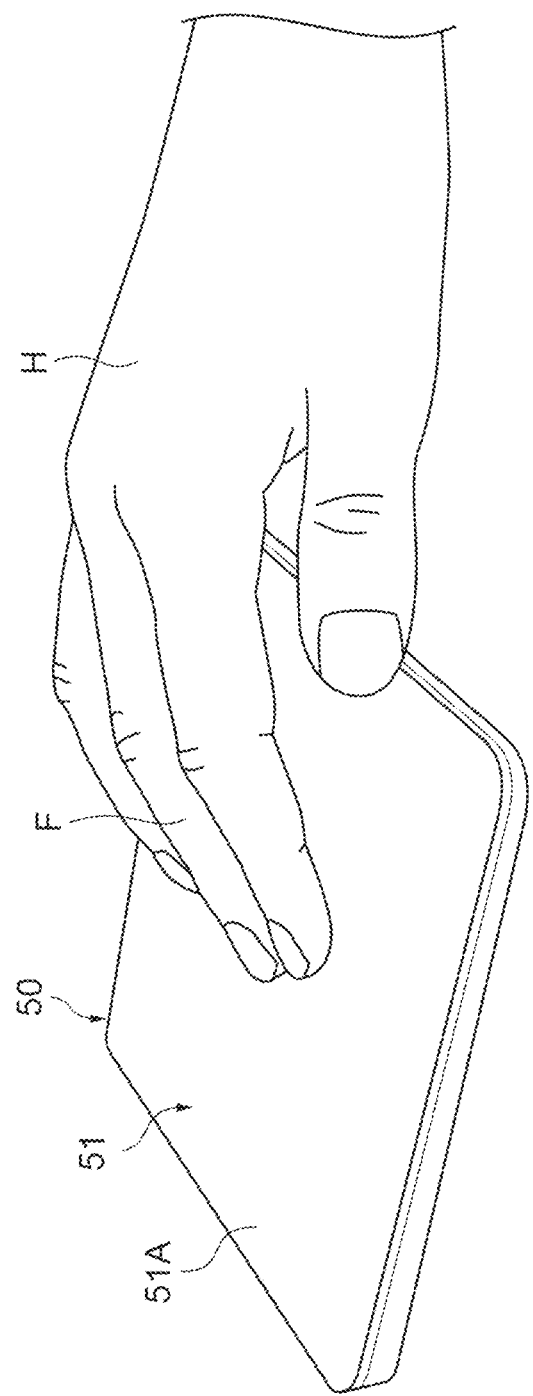
FIG. 4 is a perspective view of an operation device according to a first embodiment.

FIG. 4 is a perspective view of an operation device 50 according to a first embodiment. In FIG. 4, an example in which the operation device 50 is operated with a finger F of each of the users U1, U2, and U3 is illustrated. The operation device 50 is a device that is operated by the users U1, U2, and U3. The ear animations E are operated through the operation of the users U1, U2, and U3 on the operation device 50. The operation device 50 is a touch pad. A capacitance system, a pressure sensitive system, an ultrasonic system, or the like can be employed as a system of the touch pad.

As illustrated in FIG. 4, the operation device 50 includes a body 51 as a hardware constituent. The body 51 includes an operation surface 51A. The operation device 50 is operated with a finger F of a hand H of the users U1, U2, and U3. The operation device 50 may be provided as an independent member or may be provided in a part of a remote controller for operating a television display or the like. That is, the operation device 50 may be a part of a device.

Figure 5:
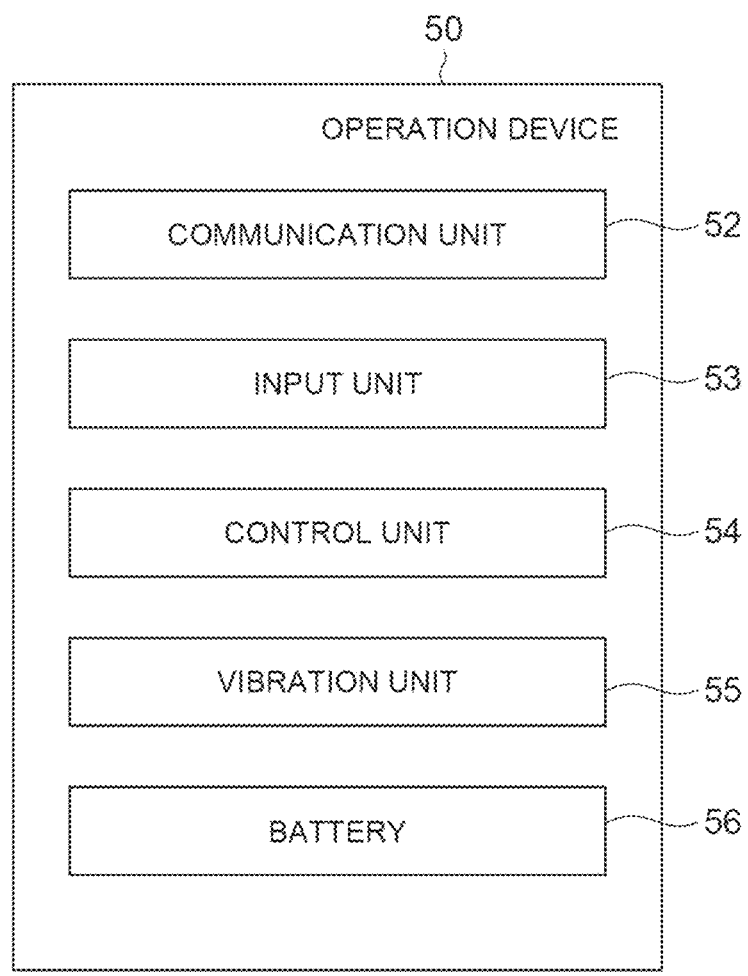
FIG. 5 is a diagram illustrating an example of functional blocks of the operation device illustrated in FIG. 4.

FIG. 5 is a diagram illustrating an example of functional blocks of the operation device 50. As illustrated in FIG. 5, the operation device 50 includes a communication unit 52. The communication unit 52 is a part that communicates with an external device by wireless communication or wired communication. The wireless communication is, for example, LAN, Bluetooth (registered trademark), or WiFi. Examples of the external device include the terminal 10, the terminal 20, and the terminal 30. The communication unit 52 transmits motion data output from the control unit 54 to the terminal 10, the terminal 20, and the terminal 30 or receives sightline data from the terminal 10, the terminal 20, and the terminal 30.

The operation device 50 includes an input unit 53. The input unit 53 is a part that receives an input of operation of the users U1, U2, and U3 to the operation surface 51A. The input unit 53 detects operations (gestures) of the users U1, U2, and U3 on the operation surface 51A. Examples of the operation include a click, a tap, a slide, and a scroll. The input unit 53 outputs an operation signal to the control unit 54.

The operation device 50 includes a control unit 54. The control unit 54 generates motion data based on the operation signal from the input unit 53. The control unit 54 outputs the motion data to the communication unit 52. When sightline data is output from the communication unit 14, the control unit 54 causes a vibration unit 55 to vibrate for a predetermined time. The predetermined time in which the vibration unit 55 is caused to vibrate can be appropriately set.

The control unit 54 can be constituted by a processor such as a central processing unit (CPU) or a graphics processing unit (GPU), a clock, and an internal memory. The control unit 54 may be constituted as a single hardware piece (system on a chip (SoC)) in which the processor, the clock, the internal memory, and the communication unit 52 are integrated.

The operation device 50 includes a vibration unit 55. The vibration unit 55 causes the operation surface 51A of the body 51 to vibrate. The vibration unit 55 can be constituted by a motor, a piezoelectric device, or the like. The vibration unit 55 is controlled by the control unit 54.

The operation device 50 includes a battery 56. The battery 56 supplies electric power to the constituents of the operation device 50. The battery 56 is charged by attaching a charging cable to the body 51. When the operation device 50 is connected to the terminals 10, 20, and 30 via cables, the operation device 50 may be supplied with electric power from the terminals 10, 20, and 30. That is, when the operation device 50 is connected to the terminals 10, 20, and 30 via cables, the operation device 50 may not include the battery 56.

The operation of the operation device 50 by each of the users U1, U2, and U3 when an ear animation E of a character C (C1, C2, or C3) operates to express a motion such as "nod," "agreement," "praise (applause)," "inquiry," "show of hands," or "surprise" will be described below. That is, a relationship between the motion of the ear animation E of the character C and the motion of each of the users U1, U2, and U3 detected by the operation device 50 will be described. The motion of the ear animation E is similar to (associated with) a motion of a finger F of each of the users U1, U2, and U3 for operating the ear animation E. For example, when the ear animation E operates to express "nod," a motion similar to a nodding motion is performed with the finger F on the operation surface 51A of the operation device 50. That is, each of the users U1, U2, and U3 can operate the ear animation E by performing a motion similar to the ear animation E to be operated using the operation device 50. A similar motion implicates the motion of the ear animation E or corresponds to a displayed image and is movement enabling a motion to be easily discriminated.

Motion patterns illustrated in FIGS. 6 to 11 are examples of a motion of an ear animation E. User motions illustrated in FIGS. 6 to 11 are examples of movement of a finger F of the users U1, U2, and U3 when the ear animation E operates based on the motion patterns illustrated in FIGS. 6 to 11.

Figure 6:
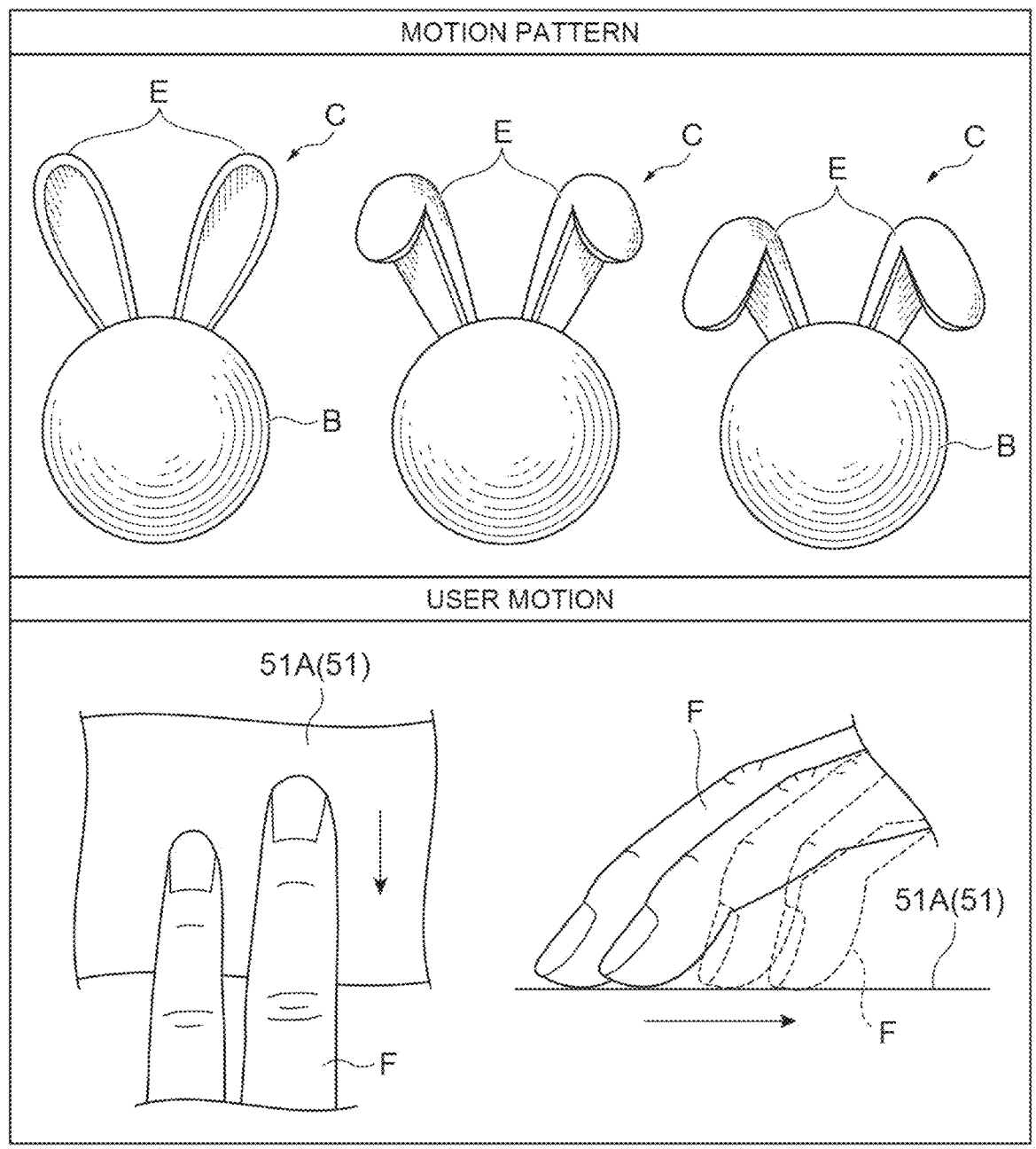
FIG. 6 is a diagram illustrating an example of a motion of an ear animation as a motion pattern and an example of movement of a user's hand when the ear animation illustrated in the motion pattern of FIG. 6 is operated as a user motion.

The motion pattern of FIG. 6 indicates a motion of "nod" in the ear animation E. As illustrated in the motion pattern of FIG. 6, in the motion of "nod," an upper half of each ear in the ear animation E of the character C is folded forward. When the ear animation E operates to perform the motion of "nod," the users U1, U2, and U3 touch the operation surface 51A of the body 51 of the operation device 50 with two fingers F (for example, an index finger and a middle finger) as illustrated in the user motion of FIG. 6. Alternatively, the users U1, U2, and U3 cause two fingers F to slide in a state in which the operation surface 51A is touched with the two fingers F. A slide quantity by which the fingers F slide ranges, for example, from 1 cm to 2 cm.

When a motion indicated by the user motion of FIG. 6 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "nod" based on the motion data. When the fingers F slide in the user motion of FIG. 6 and the motion of the fingers F stops after the fingers F have slid, the ears of the ear animation E stop in a state in which the ears have been folded.

Figure 7:
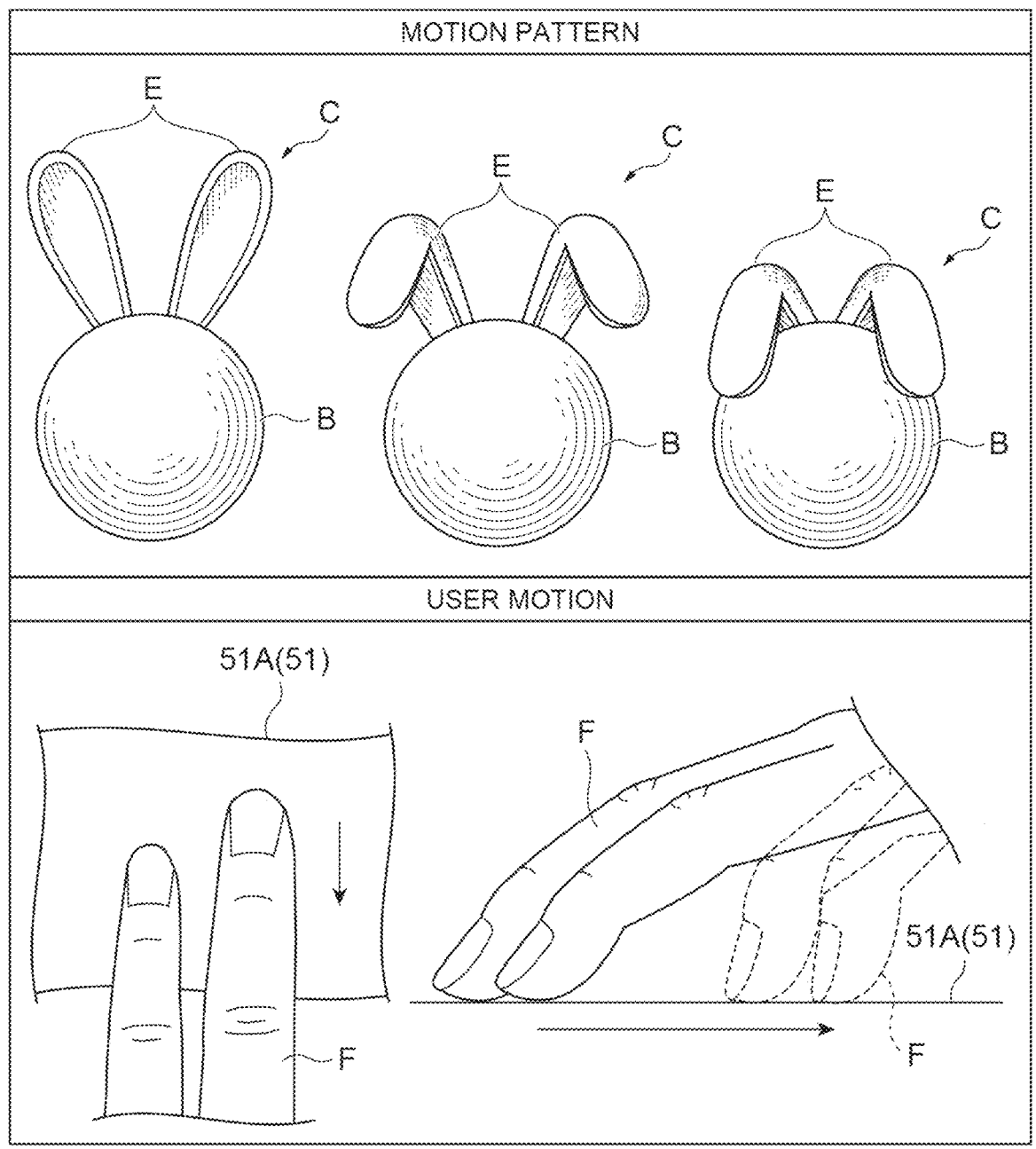
FIG. 7 is a diagram illustrating an example of a motion of an ear animation as a motion pattern and an example of movement of a user's hand when the ear animation illustrated in the motion pattern of FIG. 7 is operated as a user motion.

The motion pattern of FIG. 7 indicates a motion of "agreement" in the ear animation E. In the motion of "agreement," each ear in the ear animation E of the character C is folded forward as a whole. When the ear animation E operates to perform the motion of "agreement," the users U1, U2, and U3 cause two fingers F (for example, an index finger and a middle finger) to slide in a state in which the operation surface 51A is touched with the two fingers F as illustrated in the user motion of FIG. 7. A slide quantity by which the fingers F slide is greater than 2 cm and ranges, for example, from 3 cm to 4 cm. That is, when the ear animation E operates to perform the motion of "agreement," the users U1, U2, and U3 increase the slide quantity of the fingers F in comparison with the case in which the ear animation E operates to perform the motion of "nod."

When a motion indicated by the user motion of FIG. 7 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "agreement" based on the motion data.

Figure 8:
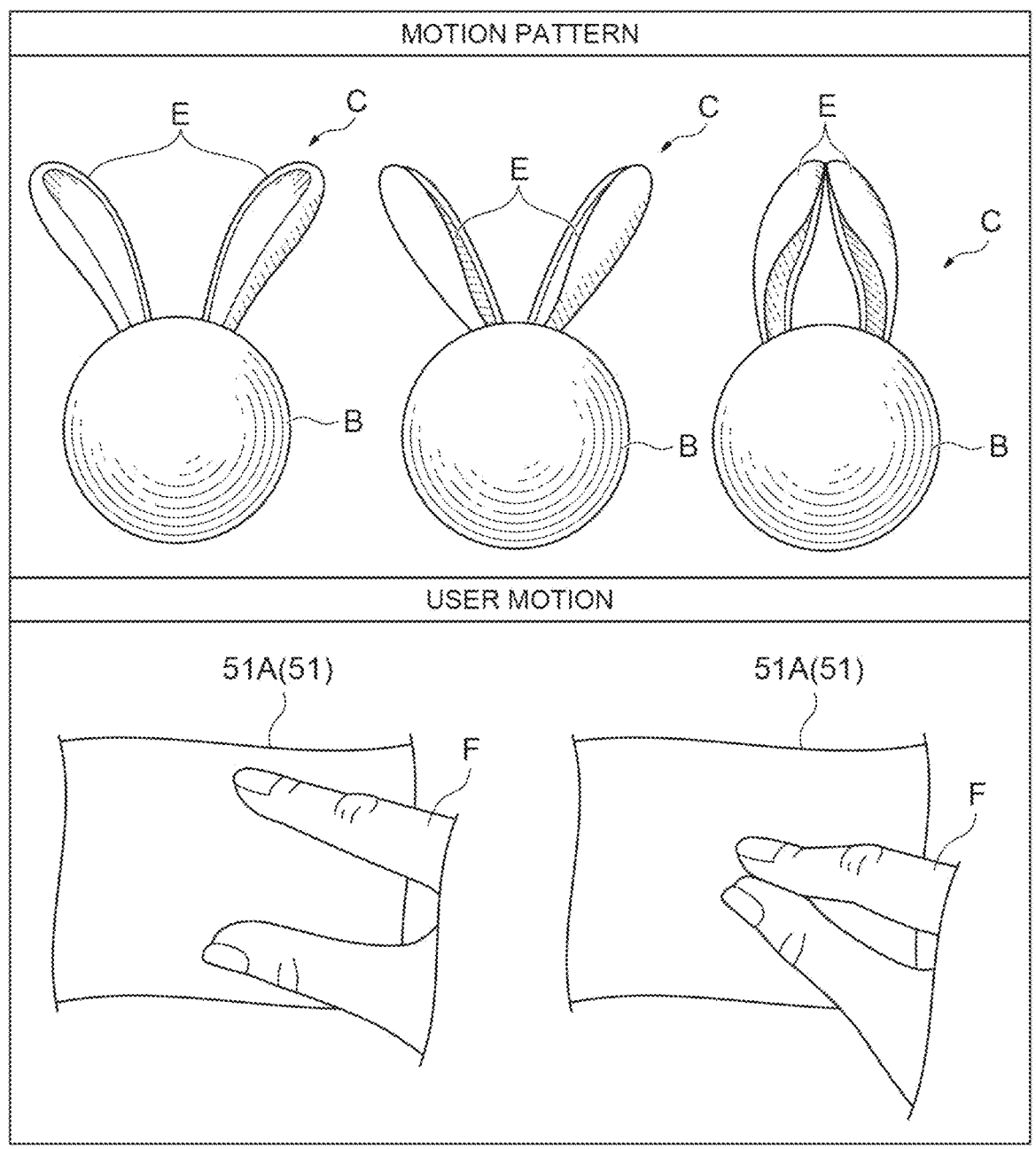
FIG. 8 is a diagram illustrating an example of a motion of an ear animation as a motion pattern and an example of movement of a user's hand when the ear animation illustrated in the motion pattern of FIG. 8 is operated as a user motion.

The motion pattern of FIG. 8 indicates a motion of "praise (applause)" in the ear animation E. In the motion of "praise (applause)," the ears in the ear animation E of the character C get close or separated away. When the ear animation E operates to perform the motion of "praise (applause)," the users U1, U2, and U3 cause two fingers F (for example, a thumb or an index finger, or an index finger and a middle finger) to get close (contact) or separated away in a state in which the operation surface 51A is touched with the two fingers F as illustrated in the user motion of FIG. 8.

Figure 25:
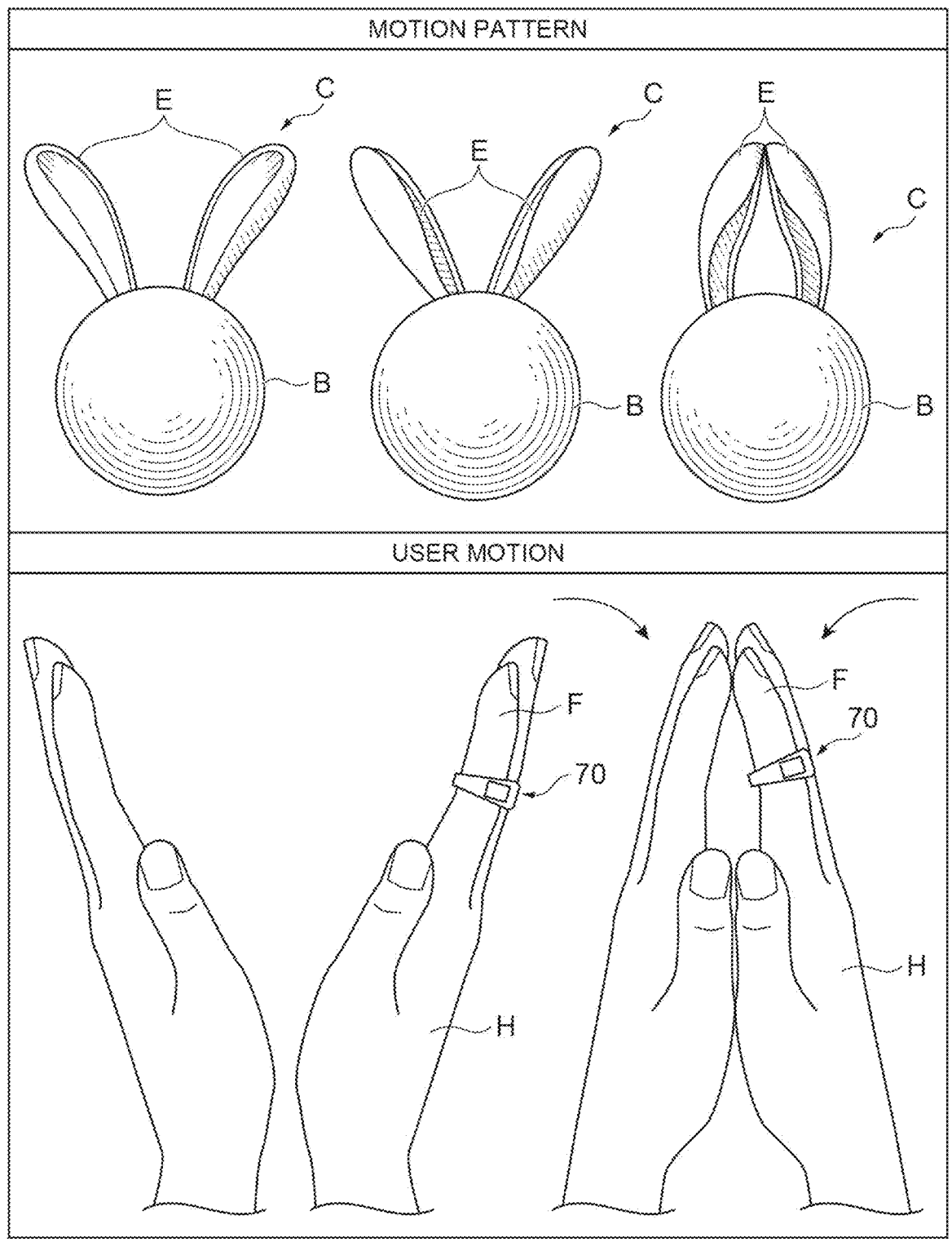
FIG. 25 is a diagram illustrating an example of a motion of an ear animation as a motion pattern and an example of movement of a user's hand when the ear animation illustrated in the motion pattern of FIG. 25 is operated as a user motion.

When a motion indicated by the user motion of FIG. 25 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "praise (applause)" based on the motion data. The control unit 12 of each of the terminals 10, 20, and 30 may generate control data to applaud a plurality of times based on motion data associated with one motion of causing two fingers F to get close or separated away.

Figure 9:
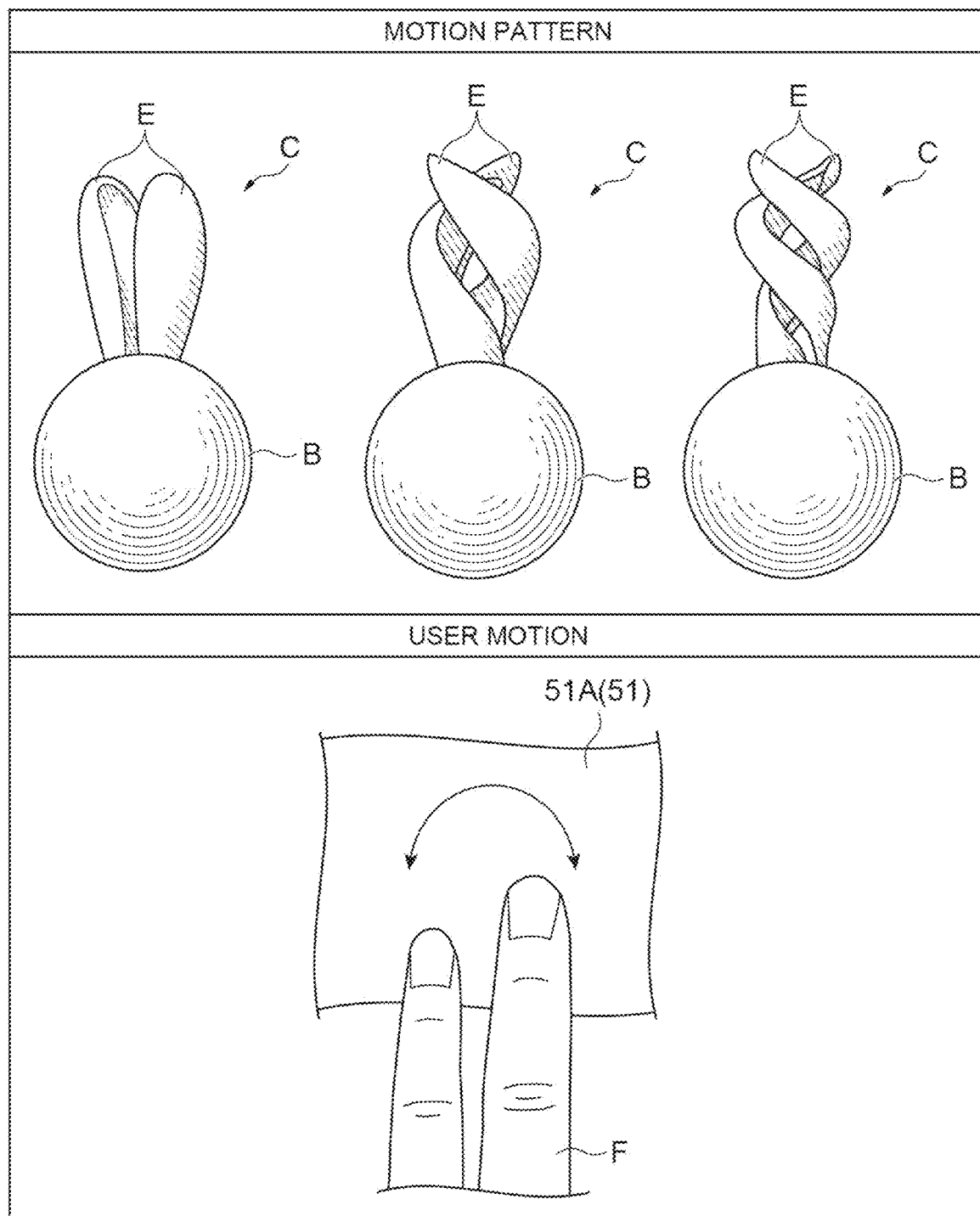
FIG. 9 is a diagram illustrating an example of a motion of an ear animation as a motion pattern and an example of movement of a user's hand when the ear animation illustrated in the motion pattern of FIG. 9 is operated as a user motion.

The motion pattern of FIG. 9 indicates a motion of "inquiry" in the ear animation E. In the motion of "inquiry," the ears in the ear animation E of the character C are entwined. When the ear animation E operates to perform the motion of "inquiry," the users U1, U2, and U3 cause two fingers F (for example, an index finger and a middle finger) to slide to draw a semicircle (an arc) in a state in which the operation surface 51A is touched with the two fingers F as illustrated in the user motion of FIG. 9.

When a motion indicated by the user motion of FIG. 9 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "inquiry" based on the motion data.

Figure 10:
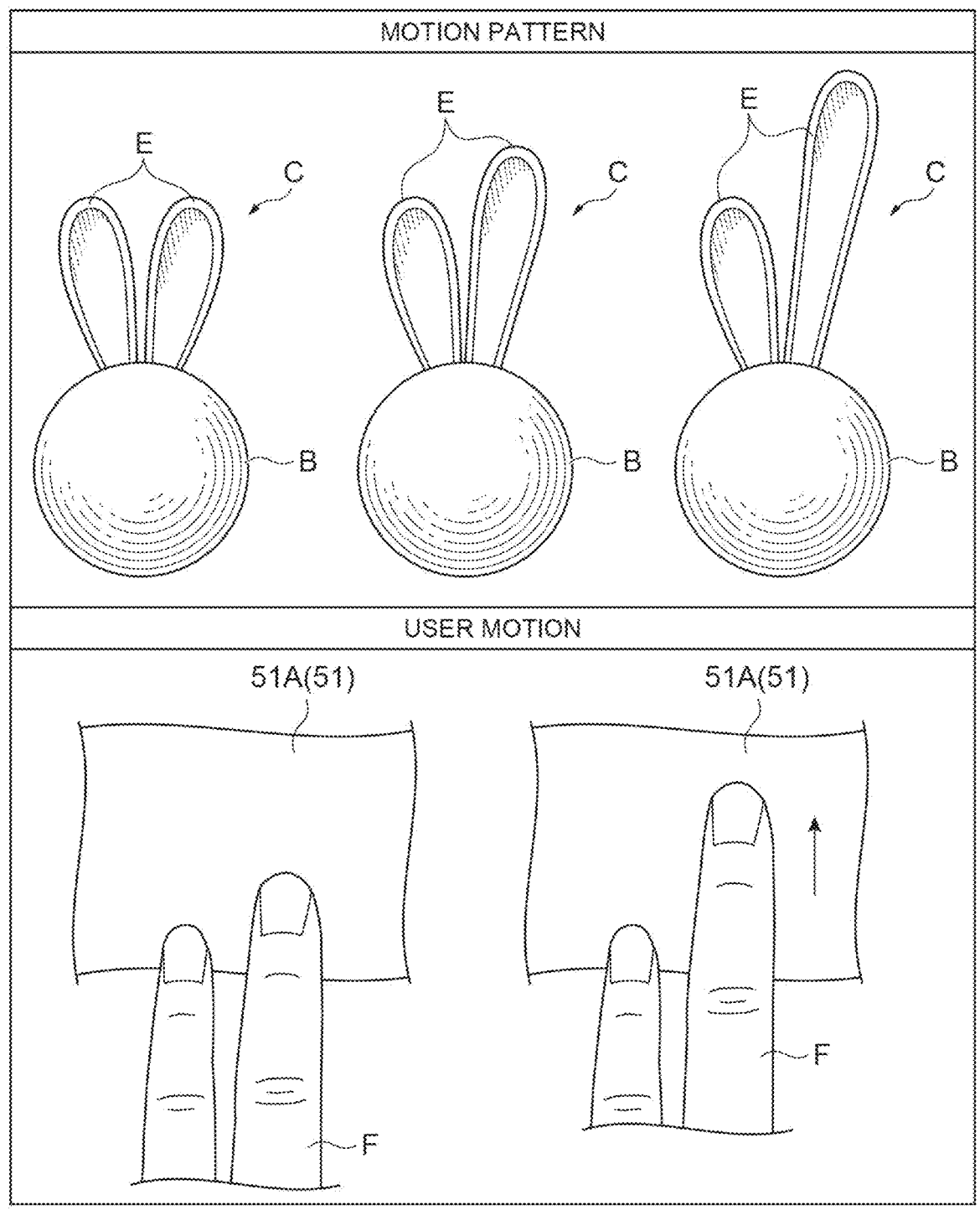
FIG. 10 is a diagram illustrating an example of a motion of an ear animation as a motion pattern and an example of movement of a user's hand when the ear animation illustrated in the motion pattern of FIG. 10 is operated as a user motion.

The motion pattern of FIG. 10 indicates a motion of "show of hands" in the ear animation E. In the motion of "show of hands," the ears in the ear animation E of the character C grow. When the ear animation E operates to perform the motion of "show of hands," the users U1, U2, and U3 cause only one finger F (a middle finger) to slide upward in a state in which the operation surface 51A is touched with two fingers F (for example, an index finger and a middle finger) as illustrated in the user motion of FIG. 10.

When a motion indicated by the user motion of FIG. 10 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "show of hands" based on the motion data.

Figure 11:
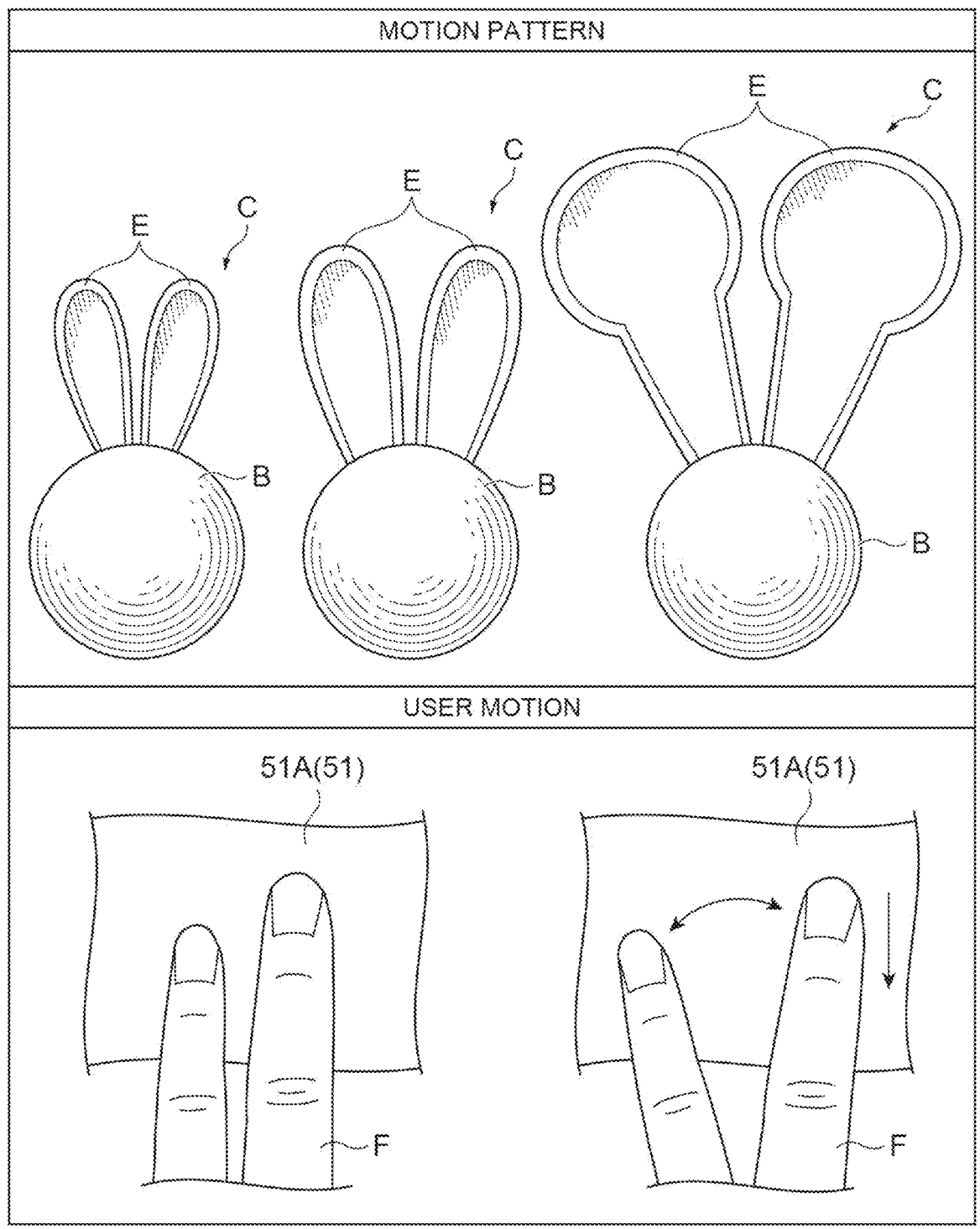
FIG. 11 is a diagram illustrating an example of a motion of an ear animation as a motion pattern and an example of movement of a user's hand when the ear animation illustrated in the motion pattern of FIG. 11 is operated as a user motion.

The motion pattern of FIG. 11 indicates a motion of "surprise" in the ear animation E. In the motion of "surprise," the tip of each ear in the ear animation E of the character C is enlarged. At this time, the body B of the character C turns over rearward. When the ear animation E operates to perform the motion of "surprise," the users U1, U2, and U3 cause two fingers F (for example, an index finger and a middle finger) to get separated away while sliding in a state in which the operation surface 51A is touched with the two fingers F as illustrated in the user motion of FIG. 11.

When a motion indicated by the user motion of FIG. 11 is performed, the operation device 50 detects the motion through the input unit 53 and transmits the detected motion as motion data to the terminals 10, 20, and 30. The control unit 12 of each of the terminals 10, 20, and 30 generates control data for operating the ear animation E to perform the motion of "surprise" based on the motion data.

The operation device 50 does not generate motion data when the operation surface 51A is operated with one or three or more fingers F in a motion indicated by one of the user motion of FIG. 6, the user motion of FIG. 7, the user motion of FIG. 8, the user motion of FIG. 9, the user motion of FIG. 10, and the user motion of FIG. 11. That is, the operation device 50 generates motion data only when a predetermined operation is performed on the operation surface 51A with two fingers F.

<Operation Method for Motion of Ear Animation>

An operation method for a motion of an ear animation E of a character C will be described below. When the ear animation E is operated, each of the users U1, U2, and U3 performs a motion indicated by one of the user motion of FIG. 6, the user motion of FIG. 7, the user motion of FIG. 8, the user motion of FIG. 9, the user motion of FIG. 10, and the user motion of FIG. 11. Accordingly, motion data is generated by the operation device 50. The operation device 50 transmits the motion data to the terminals 10, 20, and 30.

The terminals 10, 20, and 30 generate control data corresponding to the motion data when the motion data is received. Accordingly, in the communication screens G of the terminals 10, 20, and 30, the ear animations E of the characters C1, C2, and C3 perform one motion of "nod," "agreement," "praise (applause)," "inquiry," "show of hands," and "surprise." In this way, the motions of the ear animations E of the character C are controlled by the users U1, U2, and U3 operating the operation devices 50.

Advantageous Effects

As described above, the system 100 according to this embodiment includes the operation device 50. The operation device 50 detects motions of the fingers F of the users U1, U2, and U3, generates motion data, and transmits the motion data to the terminals 10, 20, and 30. The terminals 10, 20, and 30 generate control data corresponding to the motion data and execute motions of the ear animations E. Accordingly, in the system 100, when the operation devices 50 are not operated by the users U1, U2, and U3, the ear animations E do not operate. The ear animations E operate when a specific motion is performed on the operation device 50. Accordingly, for example, when a motion of simply touching the operation device 50 is performed, the ear animation E does not operate. In this way, it is possible to reflect only necessary motions in the ear animations E at timings intended by the users U1, U2, and U3. Accordingly, it is possible to operate the ear animations E according to intentions of the users U1, U2, and U3.

For example, in a mode in which statuses of the users U1, U2, and U3 are estimated on the basis of speech data and image data acquired by a microphone and a camera and the ear animations E are operated based thereon, a method of turning on the microphone or the camera when it is intended to operate the ear animation E or turning off the microphone or the camera when it is not intended to operate the ear animation E is considered to operate the ear animations E according to intentions of the users U1, U2, and U3. However, it is troublesome to turn on/off the camera or the microphone every time. When turning off the camera or the microphone gets forgotten, the ear animations E may operate against intentions of the users U1, U2, and U3. On the other hand, in the system 100, motions of the ear animations E are executed only when a specific operation is performed on the operation devices 50 by the users U1, U2, and U3. Accordingly, with the system 100, it is possible to operate the ear animations E according to intentions of the users U1, U2, and U3 without performing any troublesome operation.

In the system 100 according to this embodiment, the motions of the ear animations E are similar to the predetermined motions of the fingers F of the users U1, U2, and U3. Accordingly, the ear animations E are executed by performing a predetermined motion similar to (associated with) the ear animations E. As a result, it is possible to realize an intuitive operation.

In the system 100 according to this embodiment, the terminals 10, 20, and 30 generate sightline data including information associated with sightlines of the users U1, U2, and U3 and transmit the sightline data to the operation devices 50. The operation devices 50 cause the vibration unit 55 to vibrate for a predetermined time based on the sightline data. Accordingly, the users U1, U2, and U3 operating the operation devices 50 can feel the sightlines of the other users U1, U2, and U3 directed to the own characters C1, C2, and C3.

In the system 100 according to this embodiment, the operation device 50 generates the motion data only when a predetermined operation is performed on the operation surface 51A with a predetermined number of (two in this embodiment) fingers F. Accordingly, when the fingers F of the users U1, U2, and U3 unintentionally touch the operation surfaces 51A of the operation devices 50, or the like, motion data is not generated and thus the ear animations E do not operate. Accordingly, since only necessary motions can be reflected in the ear animations E at timings intended by the users U1, U2, and U3, it is possible to operate the ear animations E according to intentions of the users U1, U2, and U3.

Second Embodiment

A second embodiment will be described below. The second embodiment is different from the first embodiment in the configuration of the operation device. In the second embodiment, the control unit 12 is a part that generates control data of the user U1. The control data of the user U1 is generated based on motion data which is output from an operation device (detection device) 60. In this embodiment, data causing the ear animation E of the character C1 to perform six motions such as "nod," "agreement," "praise (applause)," "inquiry," "show of hands," and "surprise" is generated as the control data.

The control data is correlated with the motion data. In this embodiment, the motion data is correlated with the control data for "nod," "agreement," "praise (applause)," "inquiry," "show of hands," and "surprise." The motion data is data that is transmitted from the operation device 60. The motion data includes a value detected by an acceleration sensor 65 of the operation device (detection device) 60 and a value detected by a gyro sensor 66. A predetermined motion of a predetermined ear animation E is correlated with a predetermined value of acceleration detected by the acceleration sensor 65 and a predetermined value of an angular velocity detected by the gyro sensor 66. For example, in case of the motion of "nod," the predetermined value of the angular velocity detected by the gyro sensor 66 can be set to about 180 deg/s. In case of the motion of "agreement," the predetermined value of the angular velocity detected by the gyro sensor 66 can be set to about 90 deg/s. The predetermined value can include a predetermined numerical range. Specifically, the predetermined value may be set to a range of OO m/s² to OO m/s² in association with acceleration and may be set to a range of OO deg/s to OO deg/s in association with an angular velocity. When the motion data corresponds to the control data, the control unit 12 generates the control data.

Figure 12:
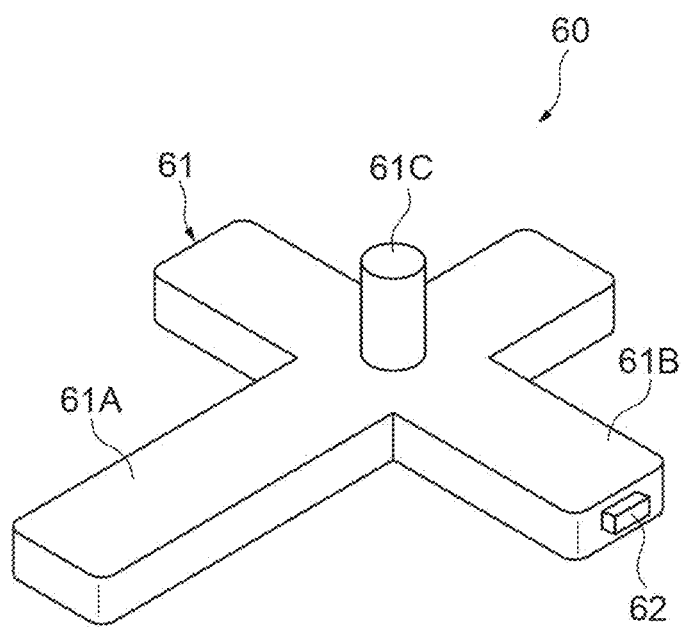
FIG. 12 is a perspective view of an operation device according to a second embodiment.

FIG. 12 is a perspective view of the operation device 60 according to the second embodiment. FIG. 12 is a diagram illustrating a state in which the operation device 70 is worn on a finger F of each of the users U1, U2, and U3. As illustrated in FIG. 12, the operation device 60 includes a body 61 and a switch 62 as hardware constituents. The operation device 60 is a device that is operated by each of the users U1, U2, and U3. The ear animation E is operated through operation of each of the users U1, U2, and U3 on the operation device 60.

The body 61 is held by each of the users U1, U2, and U3. In this embodiment, the body 61 is grasped with a hand H of each of the users U1, U2, and U3 (see a user motion of FIG. 14). The body 61 has a cross shape. The body 61 can be formed of a resin, a metal, or the like. In this embodiment, the body 61 includes a first body portion 61A, a second body portion 61B, and a protrusion 61C. The first body portion 61A and the second body portion 61B have a long rectangular parallelepiped shape. The first body portion 61A and the second body portion 61B are disposed such that extension directions thereof are perpendicular to each other. The protrusion 61C has, for example, a columnar shape. The protrusion 61C protrudes from the surfaces of the first body portion 61A and the second body portion 61B in a part in which the first body portion 61A and the second body portion 61B cross each other.

The switch 62 is disposed on a side surface (an end surface) of the second body portion 61B of the body 61. The switch 62 is, for example, a mechanical switch. The switch 62 protrudes from the side surface of the second body portion 61B. The switch 62 outputs an operation signal to an input unit 64 when it is pushed by each of the users U1, U2, and U3.

The body 61 of the operation device 60 is grasped with a hand H of each of the users U1, U2, and U3. Specifically, the operation device 60 is grasped with a left hand of each of the users U1, U2, and U3. Specifically, the operation device 60 is grasped, for example, such that the protrusion 61C is inserted between an index finger and a middle finger of the left hand and the second body portion 61B is located at third joints of the fingers. Accordingly, the operation device 60 is grasped such that the switch 62 faces the thumb. As a result, it is possible to operate the switch 62 with the thumb.

Figure 13:
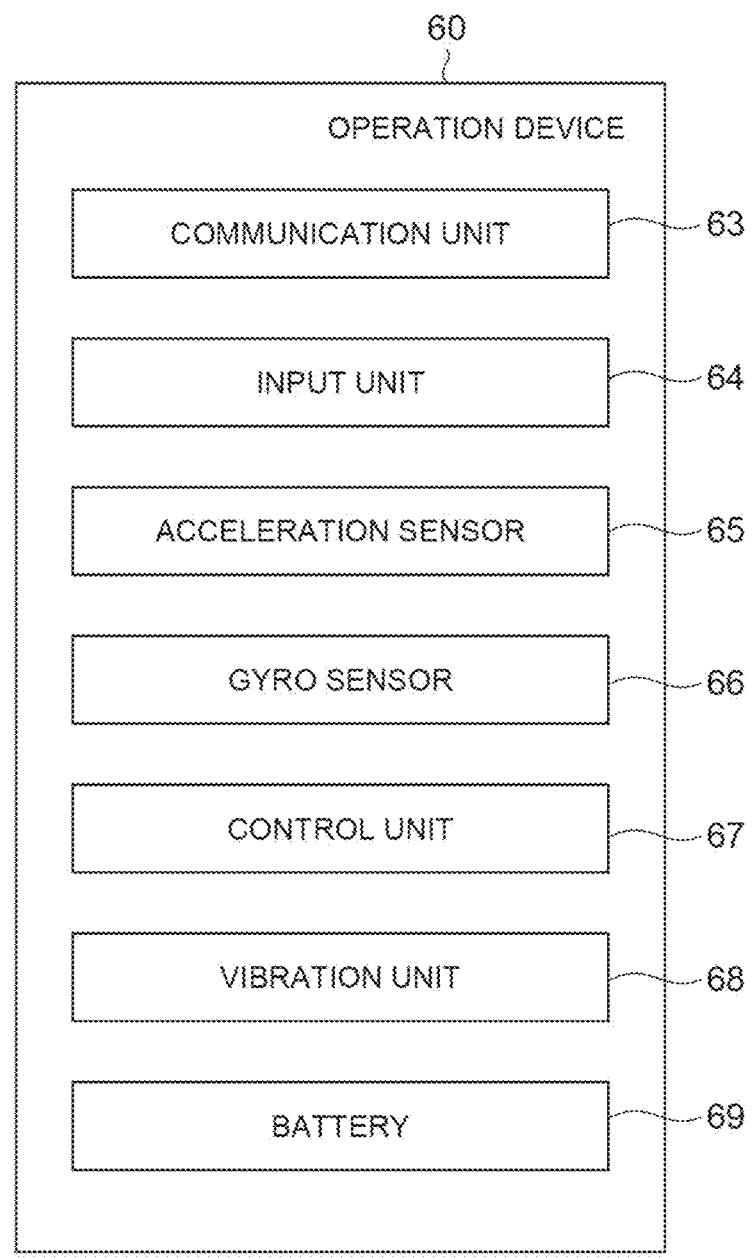
FIG. 13 is a diagram illustrating an example of functional blocks of the operation device illustrated in FIG. 12.

FIG. 13 is a diagram illustrating an example of functional blocks of the operation device 60. As illustrated in FIG. 13, the operation device 60 includes a communication unit 63. The communication unit 63 is a part that communicates with an external device by wireless communication or wired communication. The wireless communication is, for example, LAN, Bluetooth (registered trademark), or WiFi. Examples of the external device include the terminal 10, the terminal 20, and the terminal 30. The communication unit 63 transmits motion data output from a control unit 67 to the terminal 10, the terminal 20, and the terminal 30 or receives sightline data from the terminal 10, the terminal 20, and the terminal 30.

The operation device 60 includes an input unit 64. The input unit 64 is a part that receives an input of an operation signal of the switch 62. The input unit 64 outputs the operation signal to the control unit 67.

The operation device 60 includes an acceleration sensor (acceleration detecting unit) 65. The acceleration sensor 65 detects acceleration of the body 61. That is, the acceleration sensor 65 detects acceleration of the hand H of each of the users U1, U2, and U3 grasping the operation device 60. A detection sensitivity of the acceleration sensor 65 can be appropriately set. The acceleration sensor 65 outputs a detection value to the control unit 67.

The operation device 60 includes a gyro sensor (angular velocity detecting unit) 66. The gyro sensor 66 detects an angular velocity of the body 61. The gyro sensor 66 is a three-axis (an X axis, a Y axis, and a Z axis) gyro sensor. The gyro sensor 66 detects a change in rotation or direction of the body 61 as the angular velocity. That is, the gyro sensor 66 detects an angular velocity of the hand H of each of the users U1, U2, and U3 grasping the operation device 60. A detection sensitivity of the gyro sensor 66 can be appropriately set. The gyro sensor 66 outputs a detection value to the control unit 67.

The operation device 60 includes the control unit 67. The control unit 67 generates motion data based on detection results from the acceleration sensor 65 and the gyro sensor 66. When the operation signal is output form the input unit 64, the control unit 67 generates motion data. When the operation signal is output, the control unit 67 generates motion data including the detection results output from the acceleration sensor 65 and the gyro sensor 66 in a predetermined time (for example, 5 seconds) after the operation signal has been input. That is, the control unit 67 generates motion data with push of the switch 62 as a trigger. The predetermined time can be appropriately set by a user. The control unit 67 outputs the motion data to the communication unit 63.

The control unit 67 may generate motion data including the detection results output from the acceleration sensor 65 and the gyro sensor 66 while the switch 62 is being pushed, that is, while the operation signal is being output. The control unit 67 may generate motion data including the detection results output from the acceleration sensor 65 and the gyro sensor 66 until the switch 62 is pushed once more after the switch 62 has been pushed once.

When sightline data is output from the communication unit 14, the control unit 67 causes a vibration unit 68 to vibrate for a predetermined time. The predetermined time in which the vibration unit 68 is caused to vibrate can be appropriately set.

The control unit 67 can be constituted by a processor such as a CPU or a GPU, a clock, and an internal memory. The control unit 77 may be constituted as a single hardware piece (system on a chip (SoC)) in which the processor, the clock, the internal memory, and the communication unit 63 are integrated.

The operation device 60 includes a vibration unit 68. The vibration unit 68 causes the body 61 to vibrate. The vibration unit 68 can be constituted by a motor, a piezoelectric device, or the like. The vibration unit 68 is controlled by the control unit 67.

The operation device 60 includes a battery 69. The battery 69 supplies electric power to the constituents of the operation device 60. The battery 69 is charged by attaching a charging cable to the body 61 or may be charged by wireless power transmission.

The operation of the operation device 60 by each of the users U1, U2, and U3 when an ear animation E of a character C (C1, C2, and C3) operates to express a motion such as "nod," "agreement," "praise (applause)," "inquiry," "show of hands," or "surprise" will be described below. That is, a relationship between the motion of the ear animation E of the character C and the motion of each of the users U1, U2, and U3 detected by the operation device 60 will be described. Motion patterns illustrated in FIGS. 14 to 19 are examples of a motion of an ear animation E. User motions illustrated in FIGS. 14 to 19 are examples of movement of a hand H of each of the users U1, U2, and U3 when the ear animation E operates based on the motion patterns illustrated in FIGS. 14 to 19.

Figure 14:
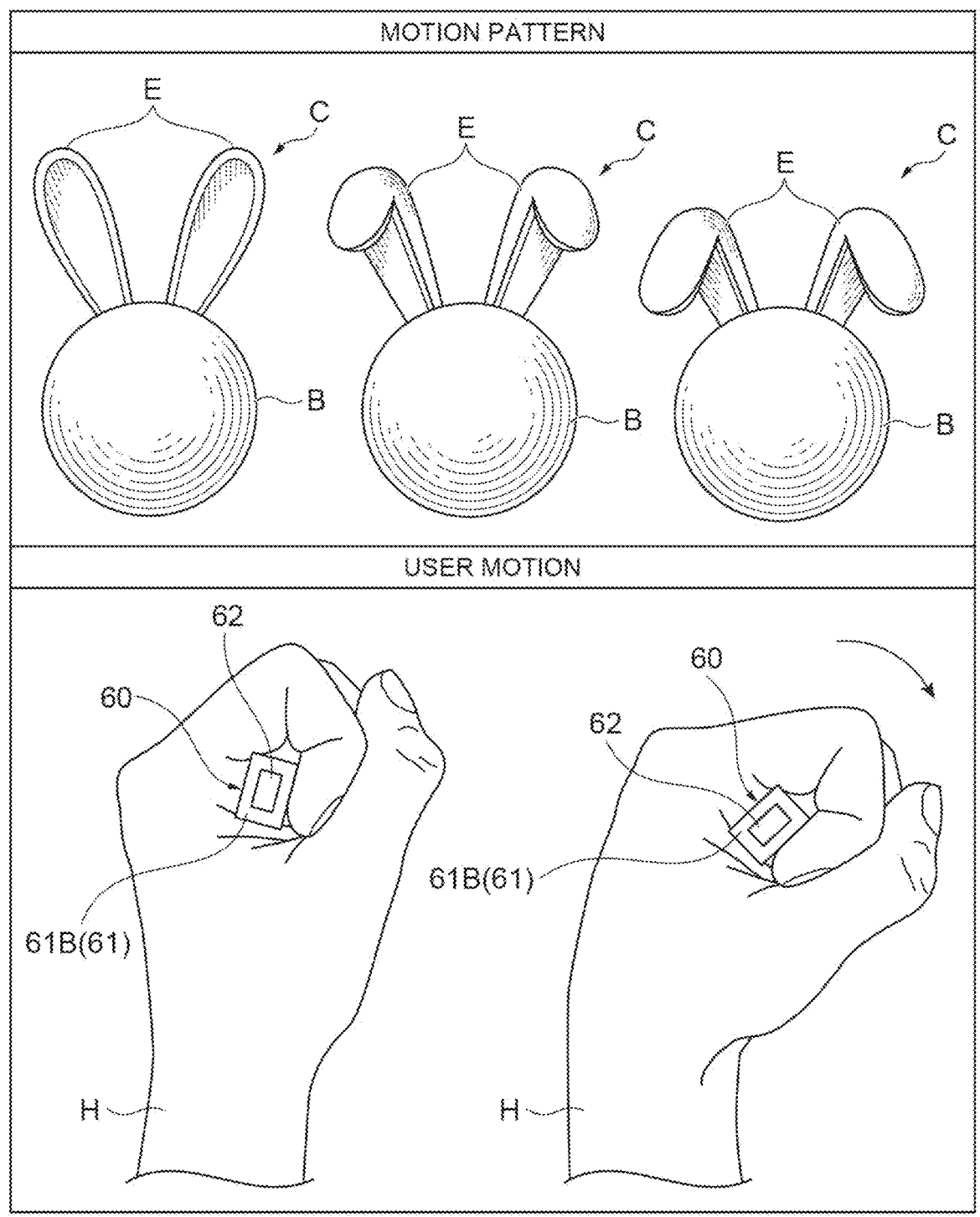
FIG. 14 is a diagram illustrating an example of a motion of an ear animation as a motion pattern and an example of movement of a user's hand when the ear animation illustrated in the motion pattern of FIG. 14 is operated as a user motion.

The motion pattern of FIG. 14 indicates a motion of "nod" in the ear animation E. As illustrated in the motion pattern of FIG. 14, in the motion of "nod," an upper half of each ear in the ear animation E of the character C is folded forward. When the ear animation E operates to perform the motion of "nod," each of the users U1, U2, and U3 lightly folds the hand H grasping the operation device 60 forward with respect to the wrist as illustrated in the user motion of FIG. 14.

When a motion indicated by the user motion of FIG. 14 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "nod" based on the motion data. When the motion of the hand H stops at a position indicated by the user motion of FIG. 14, the ears of the ear animation E may stop in a state in which the ears have been folded.

Figure 15:
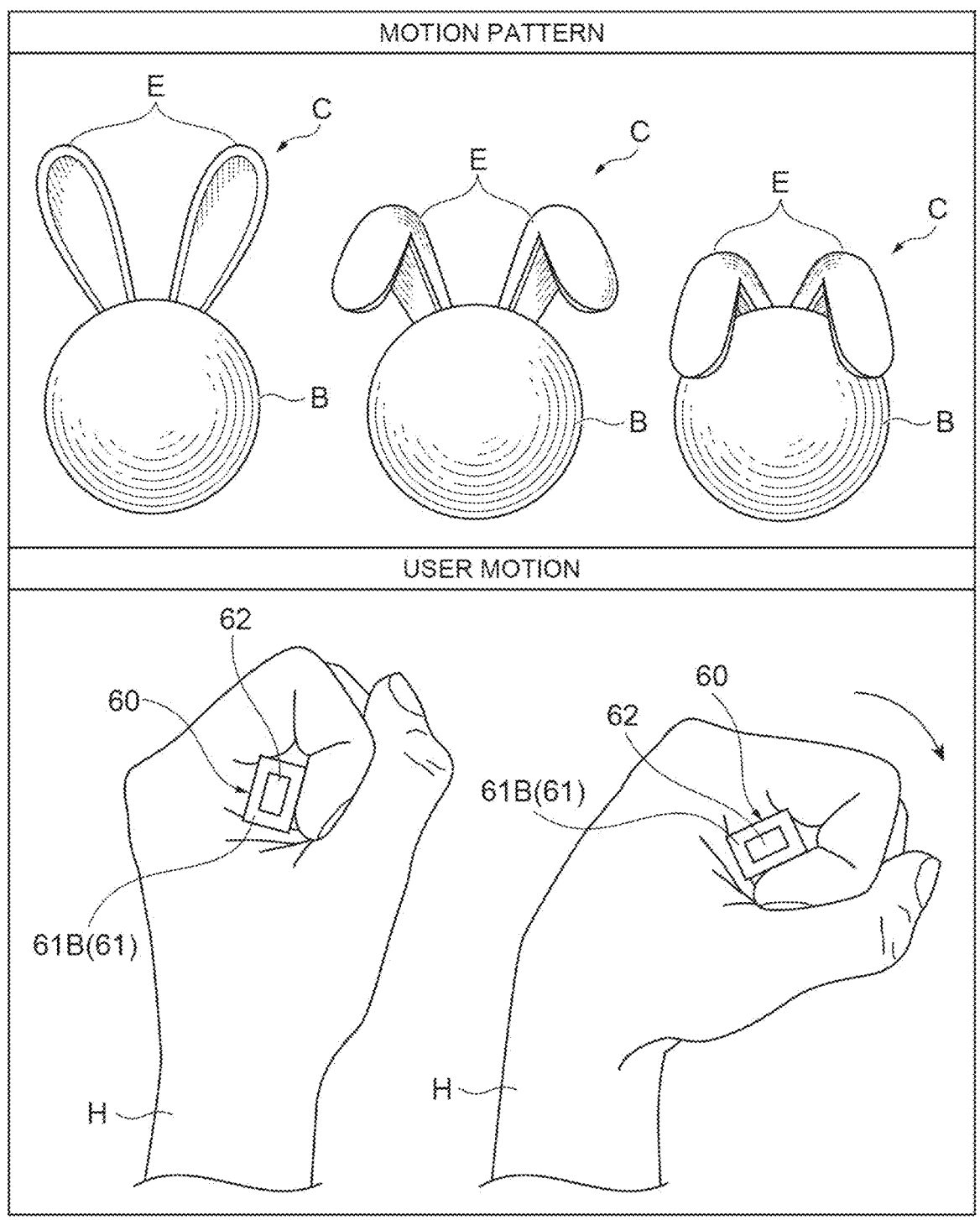
FIG. 15 is a diagram illustrating an example of a motion of an ear animation as a motion pattern and an example of movement of a user's hand when the ear animation illustrated in the motion pattern of FIG. 15 is operated as a user motion.

The motion pattern of FIG. 15 indicates a motion of "agreement" in the ear animation E. In the motion of "agreement," each ear in the ear animation E of the character C is folded forward as a whole. When the ear animation E operates to perform the motion of "agreement," each of the users U1, U2, and U3 deeply folds the hand H grasping the operation device 60 forward as illustrated in the user motion of FIG. 15. Deep folding means that the hand is folded deeper than the motion indicated by the user motion of FIG. 14.

When a motion indicated by the user motion of FIG. 15 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "agreement" based on the motion data.

Figure 16:
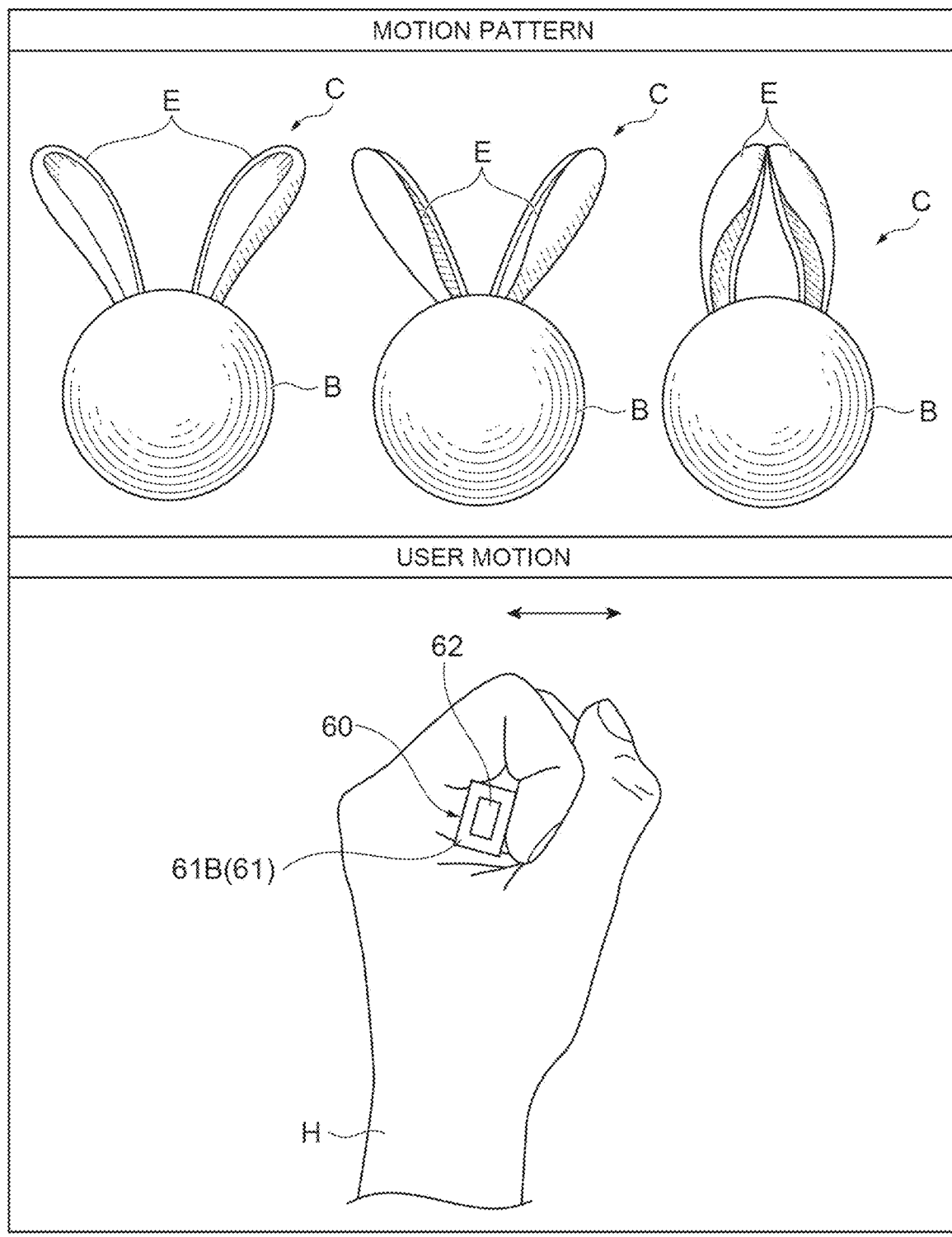
FIG. 16 is a diagram illustrating an example of a motion of an ear animation as a motion pattern and an example of movement of a user's hand when the ear animation illustrated in the motion pattern of FIG. 16 is operated as a user motion.

The motion pattern of FIG. 16 indicates a motion of "praise (applause)" in the ear animation E. In the motion of "praise (applause)," the ears in the ear animation E of the character C get close or separated away. When the ear animation E operates to perform the motion of "praise (applause)," each of the users U1, U2, and U3 moves the hand H grasping the operation device 60 horizontally in the right-left direction (the front-rear direction) as illustrated in the user motion of FIG. 16. Each of the users U1, U2, and U3 may perform a motion of applauding with the hand H grasping the operation device 60 and the other hand.

When a motion indicated by the user motion of FIG. 16 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "praise (applause)" based on the motion data.

Figure 17:
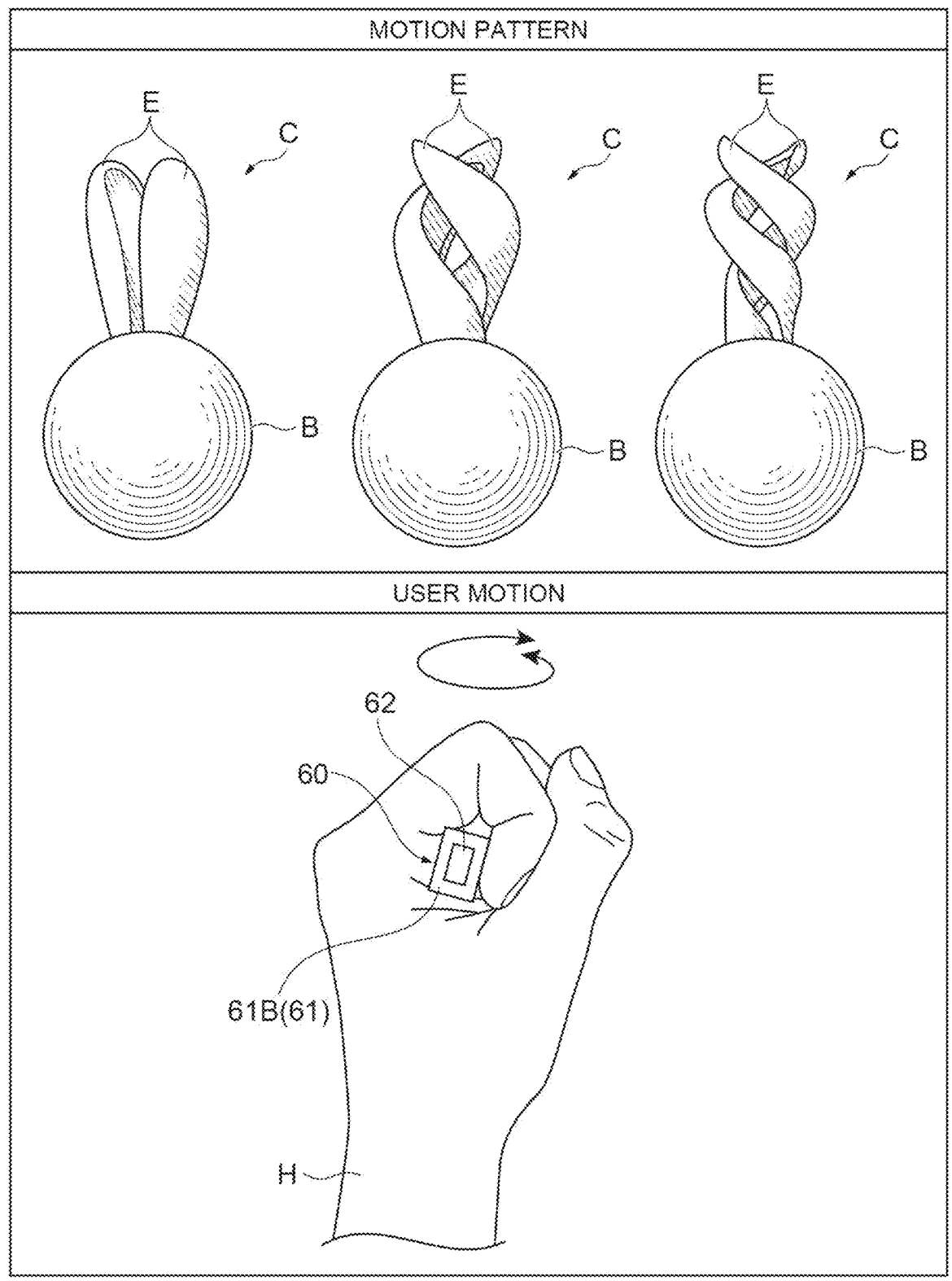
FIG. 17 is a diagram illustrating an example of a motion of an ear animation as a motion pattern and an example of movement of a user's hand when the ear animation illustrated in the motion pattern of FIG. 17 is operated as a user motion.

The motion pattern of FIG. 17 indicates a motion of "inquiry" in the ear animation E. In the motion of "inquiry," the ears in the ear animation E of the character C are entwined. When the ear animation E operates to perform the motion of "inquiry," each of the users U1, U2, and U3 performs a motion rotating the hand H grasping the operation device 60 with respect to the wrist as illustrated in the user motion of FIG. 17.

When a motion indicated by the user motion of FIG. 17 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "inquiry" based on the motion data.

Figure 18:
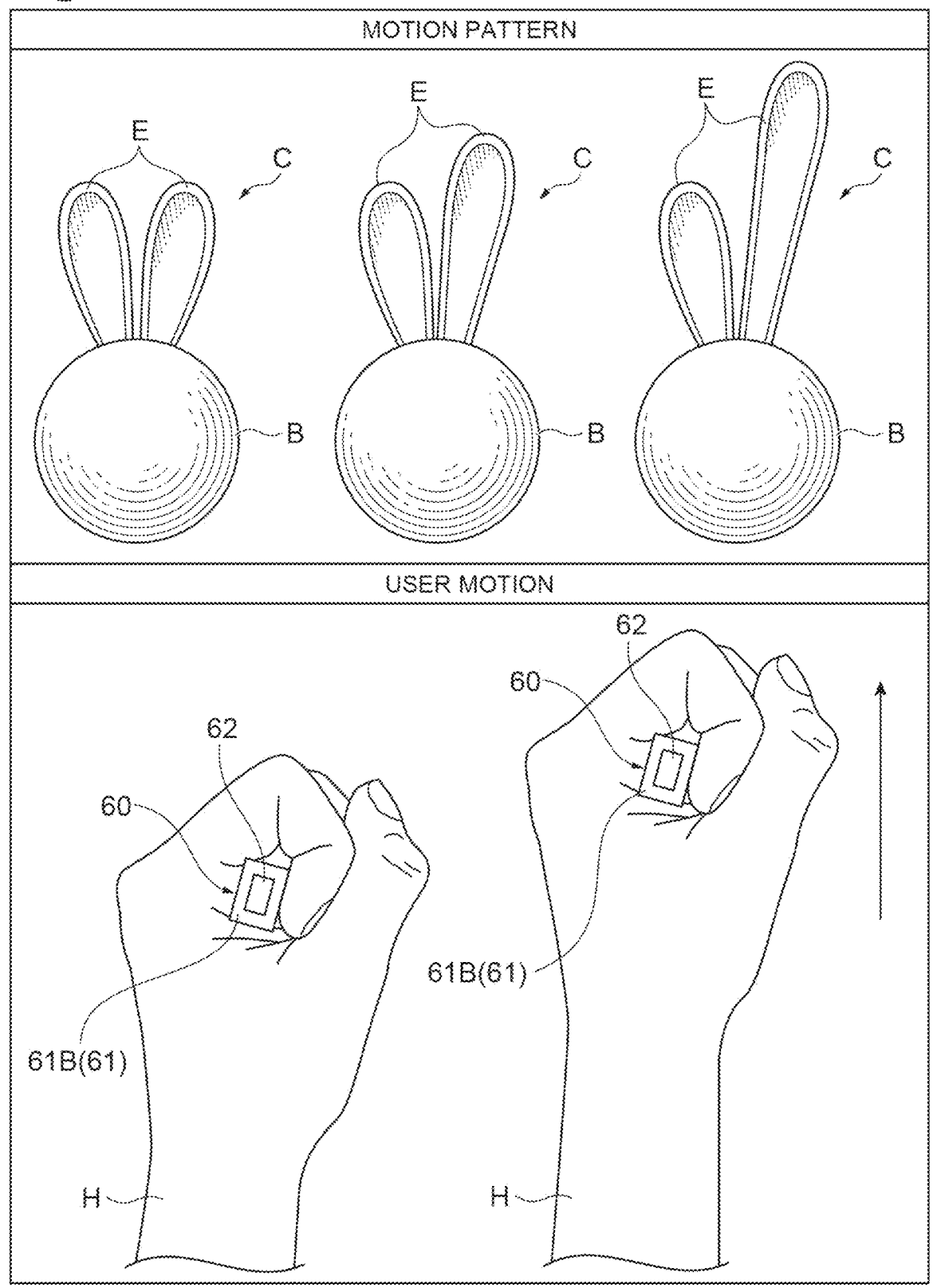
FIG. 18 is a diagram illustrating an example of a motion of an ear animation as a motion pattern and an example of movement of a user's hand when the ear animation illustrated in the motion pattern of FIG. 18 is operated as a user motion.

The motion pattern of FIG. 18 indicates a motion of "show of hands" in the ear animation E. In the motion of "show of hands," the ears in the ear animation E of the character C grow. When the ear animation E operates to perform the motion of "show of hands," each of the users U1, U2, and U3 performs a motion of raising the hand H grasping the operation device 60 as illustrated in the user motion of FIG. 18.

When a motion indicated by the user motion of FIG. 18 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "show of hands" based on the motion data.

Figure 19:
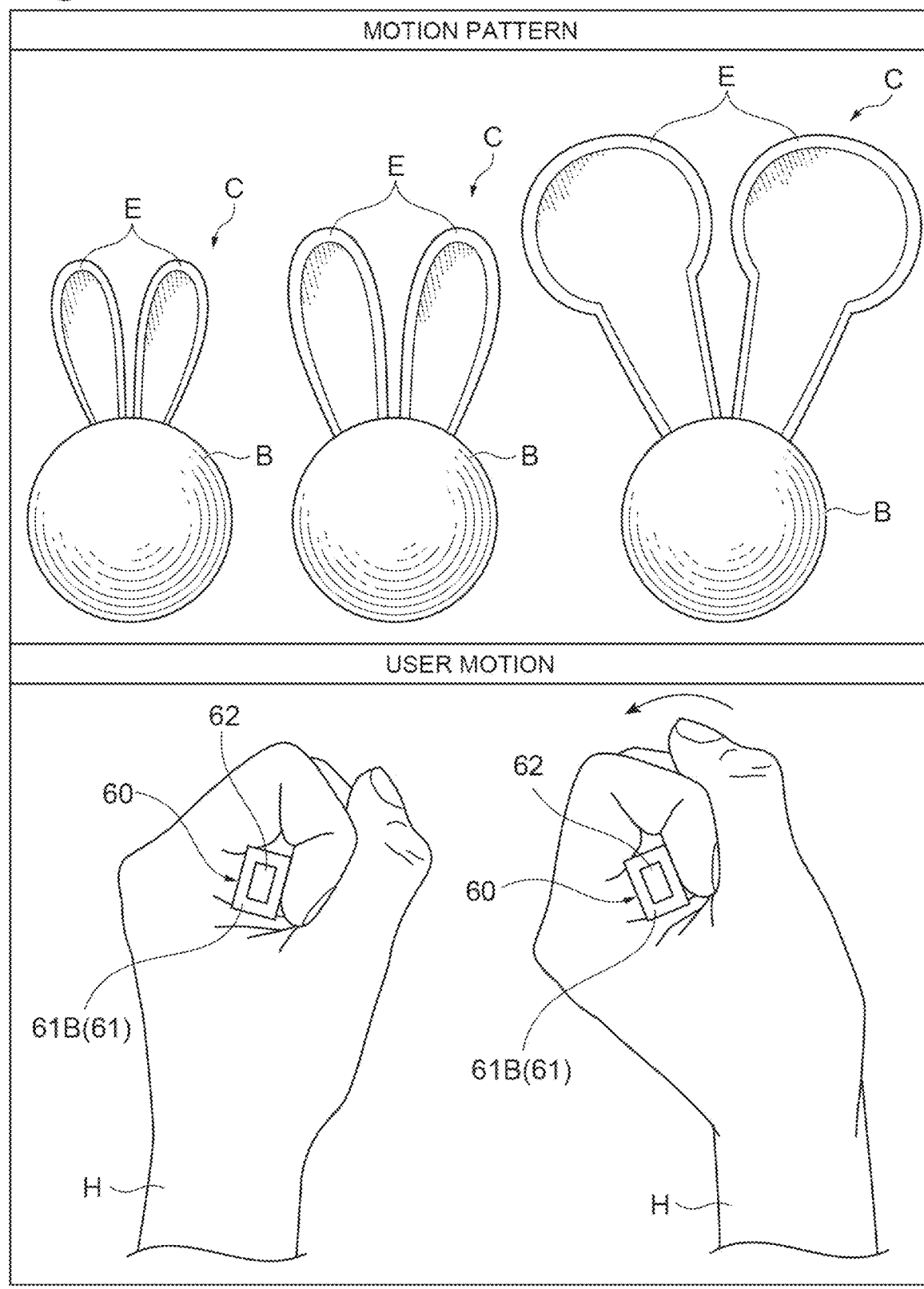
FIG. 19 is a diagram illustrating an example of a motion of an ear animation as a motion pattern and an example of movement of a user's hand when the ear animation illustrated in the motion pattern of FIG. 19 is operated as a user motion.

The motion pattern of FIG. 19 indicates a motion of "surprise" in the ear animation E. In the motion of "surprise," the tip of each ear in the ear animation E of the character C is enlarged. At this time, the body B of the character C turns over rearward. When the ear animation E operates to perform the motion of "surprise," each of the users U1, U2, and U3 turns over the hand H grasping the operation device 60 rearward with respect to the wrist as illustrated in the user motion of FIG. 19.

When a motion indicated by the user motion of FIG. 19 is performed, the operation device 60 detects the motion using the acceleration sensor 65 and the gyro sensor 66 and transmits the detected motion as motion data to the terminals 10, 20, and 30. The control unit 12 of each of the terminals 10, 20, and 30 generates control data for operating the ear animation E to perform the motion of "surprise" based on the motion data.

<Operation Method for Motion of Ear Animation>

An operation method for a motion of an ear animation E of a character C will be described below. When the ear animation E is operated, each of the users U1, U2, and U3 pushes the switch 62 of the operation device 60. Each of the users U1, U2, and U3 performs a motion indicated by one of the user motion of FIG. 14, the user motion of FIG. 15, the user motion of FIG. 16, the user motion of FIG. 17, the user motion of FIG. 18, and the user motion of FIG. 19 in a predetermined time after the switch 62 of the operation device 60 has been pushed. Accordingly, motion data is generated by the operation device 60. The operation device 60 transmits the motion data to the terminals 10, 20, and 30.

The terminals 10, 20, and 30 generate control data corresponding to the motion data when the motion data is received. Accordingly, in the communication screens G of the terminals 10, 20, and 30, the ear animations E of the characters C1, C2, and C3 perform one motion of "nod," "agreement," "praise (applause)," "inquiry," "show of hands," and "surprise." In this way, the motions of the ear animations E of the character C are controlled by the users U1, U2, and U3 operating the operation devices 60.

Advantageous Effects

As described above, the operation device 60 according to this embodiment includes the acceleration sensor 65 and the gyro sensor 66. The operation device 60 detects motions of the users U1, U2, and U3 grasping the operation device 60 using the acceleration sensor 65 and the gyro sensor 66, generates motion data, and transmits the motion data to the terminals 10, 20, and 30. The terminals 10, 20, and 30 generate control data corresponding to the motion data and execute motions of the ear animations E. Accordingly, in the system 100, when the operation devices 60 are not operated by the users U1, U2, and U3, the ear animations E do not operate. The ear animations E operate when a specific motion with which the acceleration and the angular velocity of the operation device 60 become predetermined values is performed. Accordingly, for example, when a motion of simply touching the operation device 60 is performed, the ear animation E does not operate. In this way, it is possible to reflect only necessary motions in the ear animations E at timings intended by the users U1, U2, and U3. Accordingly, it is possible to operate the ear animations E according to intentions of the users U1, U2, and U3.

The operation device 60 according to this embodiment is grasped with the hand H of each of the users U1, U2, and U3. Accordingly, the users U1, U2, and U3 can operate the motion of the ear animation E by moving the hand H. Accordingly, a broad operation space for operating the operation device 50 is not necessary. Since the operation device 60 is operated through movement of the hand H of each of the users U1, U2, and U3, it is possible to naturally and conveniently operate the operation device 60. Since the hand H can perform various motions, it is possible to increase variations of the ear animation E corresponding to the motion data.

The operation device 60 according to this embodiment includes the switch 62. When the switch 62 is pushed, the operation device 60 generates motion data and transmits the motion data to the terminals 10, 20, and 30. In this way, the operation device 60 generates motion data only when the switch 62 is pushed. That is, when the switch 62 is not pushed, motion data is not generated even if a specific operation is performed on the operation device 60. Accordingly, the operation device 60 does not generate motion data against intentions of the users U1, U2, and U3. As a result, it is possible to operate the ear animation E according to the intentions of the users U1, U2, and U3.

In this embodiment, the terminals 10, 20, and 30 generate sightline data including information associated with sightlines of the users U1, U2, and U3 and transmit the sightline data to the operation devices 60. The operation devices 60 cause the vibration unit 68 to vibrate for a predetermined time based on the sightline data. Accordingly, the users U1, U2, and U3 grasping the operation devices 60 can feel the sightlines of the other users U1, U2, and U3 directed to the own characters C1, C2, and C3.

Third Embodiment

A third embodiment will be described below. The third embodiment is different from the first embodiment and the second embodiment in the configuration of the operation device. In the third embodiment, the control unit 12 is a part that generates control data of the user U1. The control data of the user U1 is generated based on motion data which is output from an operation device (detection device) 70. In this embodiment, data causing the ear animation E of the character C1 to perform six motions such as "nod," "agreement," "praise (applause)," "inquiry," "show of hands," and "surprise" is generated as the control data.

The control data is correlated with the motion data. In this embodiment, the motion data is correlated with the control data for "nod," "agreement," "praise (applause)," "inquiry," "show of hands," and "surprise." The motion data is data that is transmitted from the operation device 70. The motion data includes a value detected by an acceleration sensor 75 of the operation device 70 and a value detected by a gyro sensor 76. A predetermined motion of a predetermined ear animation E is correlated with a predetermined value of acceleration detected by the acceleration sensor 75 and a predetermined value of an angular velocity detected by the gyro sensor 76. For example, in case of the motion of "nod," the predetermined value of the angular velocity detected by the gyro sensor 76 can be set to about 180 deg/s. In case of the motion of "agreement," the predetermined value of the angular velocity detected by the gyro sensor 76 can be set to about 90 deg/s. The predetermined value can include a predetermined numerical range. Specifically, the predetermined value may be set to a range of OO m/s$^2$ to OO m/s$^2$ in association with acceleration and may be set to a range of OO deg/s to OO deg/s in association with an angular velocity. When the motion data corresponds to the control data, the control unit 12 generates the control data.

<Configuration of Operation Device>

Figure 20:
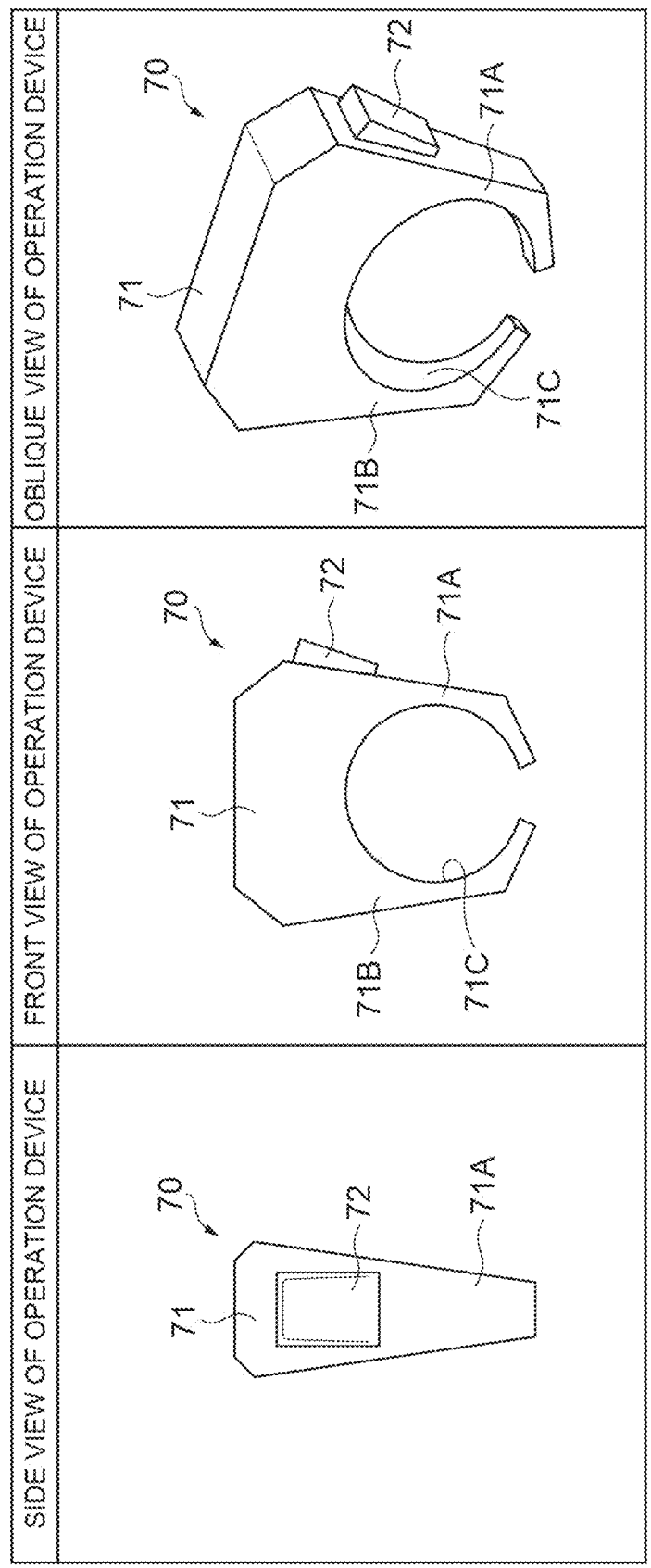
FIG. 20 is a perspective view of an operation device according to a third embodiment.
Figure 21:
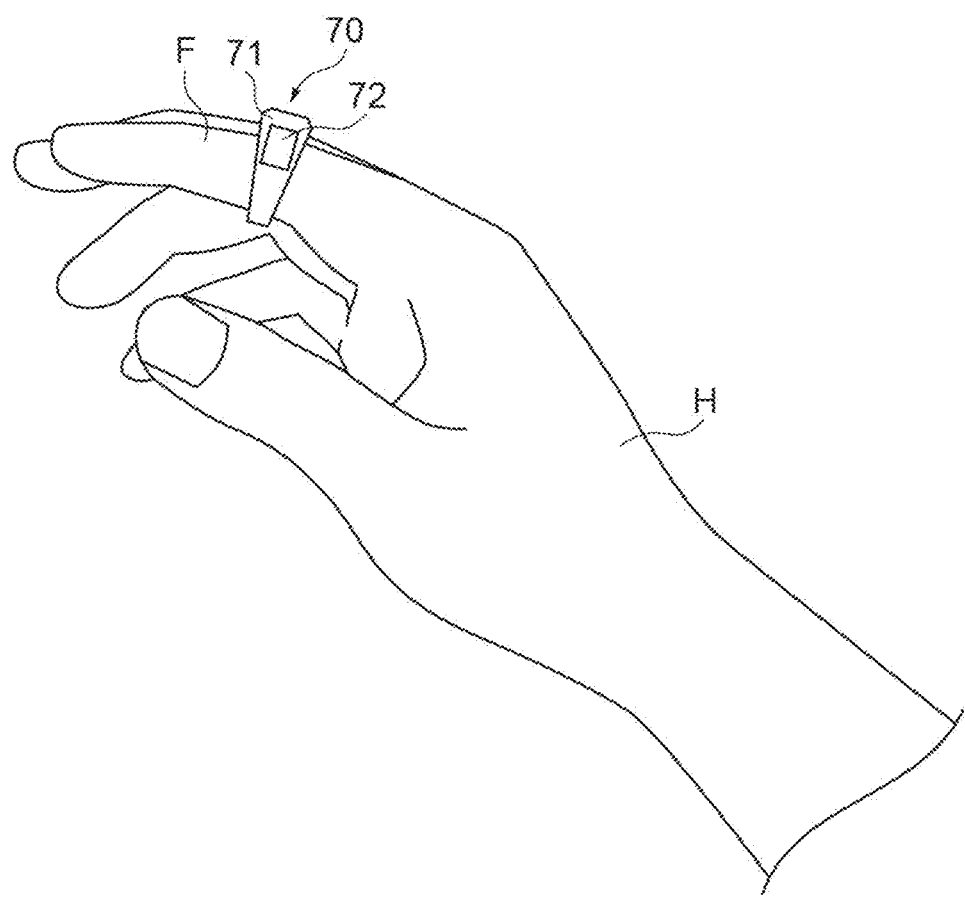
FIG. 21 is a diagram illustrating a state in which the operation device is worn on a finger of a user.

FIG. 20 is a diagram illustrating the operation device 70 according to the third embodiment. FIG. 21 is a diagram illustrating a state in which the operation device 70 is worn on a finger F of each of the users U1, U2, and U3. As illustrated in FIG. 20, the operation device 70 includes a body 71 and a switch 72 as hardware constituents. The operation device 70 is a device that is operated by each of the users U1, U2, and U3. The ear animation E is operated through operation of each of the users U1, U2, and U3 on the operation device 70.

The body 71 is worn on a body of each of the users U1, U2, and U3. In this embodiment, the body 71 is worn on a finger F of a hand H of each of the users U1, U2, and U3 (see FIG. 21). The body 71 has a ring-like shape. The body 71 can be formed of a resin, a metal, or the like. In this embodiment, the body 71 includes a pair of arms 71A and 71B. An opening 71C into which the finger F is inserted is formed by the pair of arms 71A and 71B. It is preferable that the pair of arms 71A and 71B be formed of an elastic member. In this case, since the pair of arms 71A and 71B can be broadened, it is possible to achieve improvement in wearability.

The switch 72 is disposed on a side surface of the arm 71A of the body 71. The switch 72 is, for example, a mechanical switch. The switch 72 protrudes from the side surface of the arm 71A. The switch 72 outputs an operation signal to an input unit 74 when it is pushed by each of the users U1, U2, and U3.

As illustrated in FIG. 21, the body 71 of the operation device 70 is worn on a finger F of a hand H of each of the users U1, U2, and U3. Specifically, the operation device 70 is worn on an index finger F. Specifically, the operation device 70 can be worn on a second joint of the index finger F. The operation device 70 is worn such that the switch 72 faces the thumb. Accordingly, it is possible to operate the switch 72 with the thumb.

Figure 22:
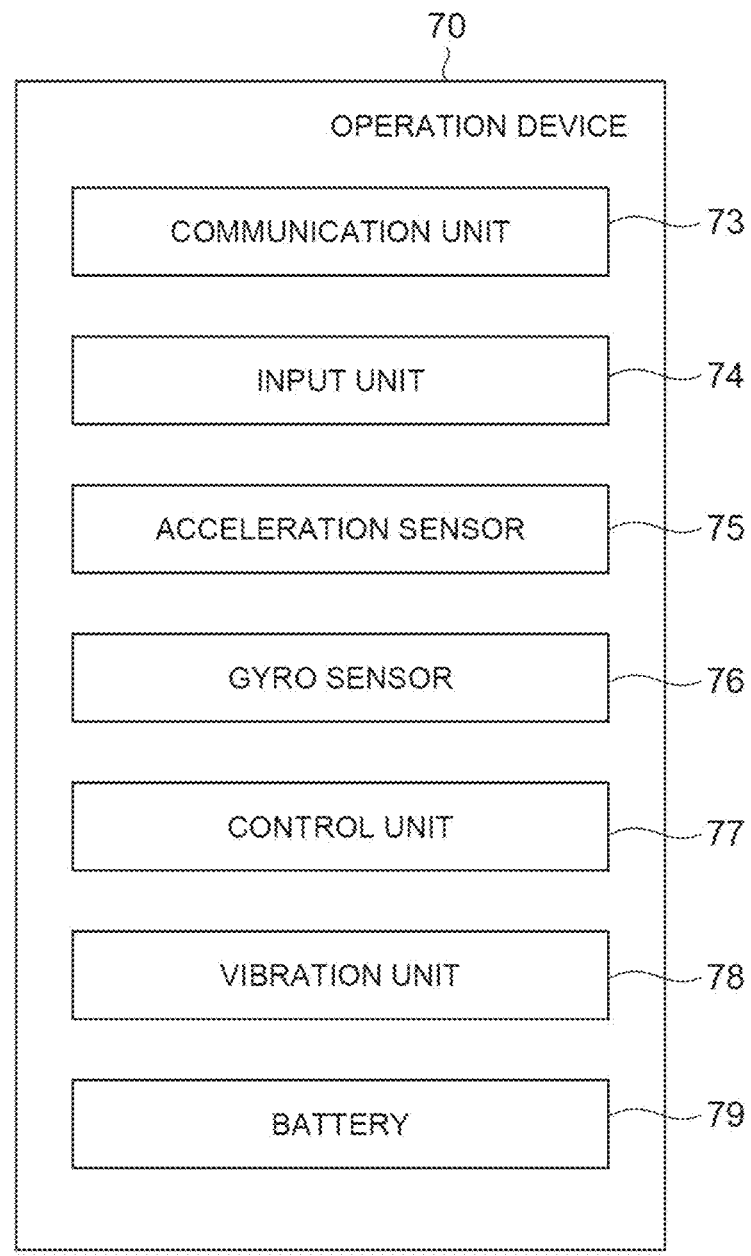
FIG. 22 is a diagram illustrating an example of functional blocks of the operation device.

FIG. 22 is a diagram illustrating an example of functional blocks of the operation device 70. As illustrated in FIG. 22, the operation device 70 includes a communication unit 73. The communication unit 73 is a part that communicates with an external device by wireless communication or wired communication. The wireless communication is, for example, LAN, Bluetooth (registered trademark), or WiFi. Examples of the external device include the terminal 10, the terminal 20, and the terminal 30. The communication unit 73 transmits motion data output from a control unit 77 to the terminal 10, the terminal 20, and the terminal 30 or receives sightline data from the terminal 10, the terminal 20, and the terminal 30.

The operation device 70 includes an input unit 74. The input unit 74 is a part that receives an input of an operation signal of the switch 72. The input unit 74 outputs the operation signal to the control unit 77.

The operation device 70 includes an acceleration sensor (acceleration detecting unit) 75. The acceleration sensor 75 detects acceleration of the body 71. That is, the acceleration sensor 75 detects acceleration of the finger F of each of the users U1, U2, and U3 wearing the operation device 70. A detection sensitivity of the acceleration sensor 75 can be appropriately set. The acceleration sensor 75 outputs a detection value to the control unit 77.

The operation device 70 includes a gyro sensor (angular velocity detecting unit) 76. The gyro sensor 76 detects an angular velocity of the body 71. The gyro sensor 76 is a three-axis (an X axis, a Y axis, and a Z axis) gyro sensor. The gyro sensor 76 detects a change in rotation or direction of the body 71 as the angular velocity. That is, the gyro sensor 76 detects an angular velocity of the finger F of each of the users U1, U2, and U3 wearing the operation device 70. A detection sensitivity of the gyro sensor 76 can be appropriately set. The gyro sensor 76 outputs a detection value to the control unit 77.

The operation device 70 includes the control unit 77. The control unit 77 generates motion data based on detection results from the acceleration sensor 75 and the gyro sensor 76. When the operation signal is output from the input unit 74, the control unit 77 generates motion data. When the operation signal is output, the control unit 77 generates motion data including the detection results output from the acceleration sensor 75 and the gyro sensor 76 in a predetermined time (for example, 5 seconds) after the operation signal has been input. That is, the control unit 77 generates motion data with push of the switch 72 as a trigger. The predetermined time can be appropriately set by a user. The control unit 77 outputs the motion data to the communication unit 73.

The control unit 77 may generate motion data including the detection results output from the acceleration sensor 75 and the gyro sensor 76 while the switch 72 is being pushed, that is, while the operation signal is being output. The control unit 77 may generate motion data including the detection results output from the acceleration sensor 75 and the gyro sensor 76 until the switch 72 is pushed once more after the switch 72 has been pushed once.

When sightline data is output from the communication unit 14, the control unit 77 causes a vibration unit 78 to vibrate for a predetermined time. The predetermined time in which the vibration unit 78 is caused to vibrate can be appropriately set.

The control unit 77 can be constituted by a processor such as a central processing unit (CPU) or a graphics processing unit (GPU), a clock, and an internal memory. The control unit 77 may be constituted as a single hardware piece (system on a chip (SoC)) in which the processor, the clock, the internal memory, and the communication unit 73 are integrated.

The operation device 70 includes a vibration unit 78. The vibration unit 78 causes the body 71 to vibrate. The vibration unit 78 can be constituted by a motor, a piezoelectric device, or the like. The vibration unit 78 is controlled by the control unit 77.

The operation device 70 includes a battery 79. The battery 79 supplies electric power to the constituents of the operation device 70. The battery 79 is charged by attaching a charging cable to the body 71 or may be charged by wireless power transmission.

The operation of the operation device 70 by each of the users U1, U2, and U3 when an ear animation E of a character C (C1, C2, and C3) operates to express a motion such as "nod," "agreement," "praise (applause)," "inquiry," "show of hands," or "surprise" will be described below. That is, a relationship between the motion of the ear animation E of the character C and the motion of each of the users U1, U2, and U3 detected by the operation device 70 will be described. Motion patterns illustrated in FIGS. 23 to 28 are examples of a motion of an ear animation E. User motions illustrated in FIGS. 23 to 28 are examples of movement of a hand H (a finger F) of each of the users U1, U2, and U3 when the ear animation E operates based on the motion patterns illustrated in FIGS. 23 to 28.

Figure 23:
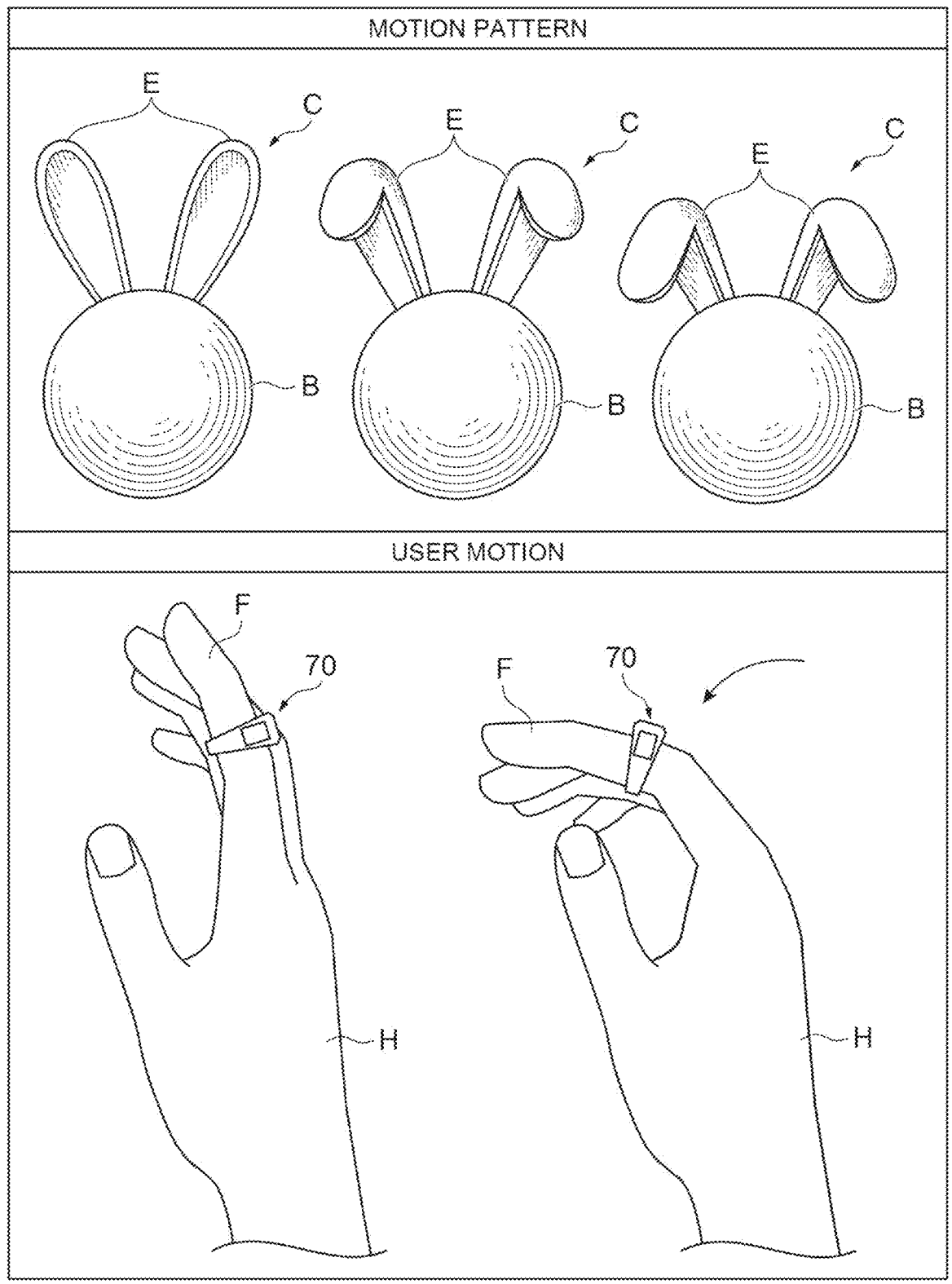
FIG. 23 is a diagram illustrating an example of a motion of an ear animation as a motion pattern and an example of movement of a user's hand when the ear animation illustrated in the motion pattern of FIG. 23 is operated as a user motion.

The motion pattern of FIG. 23 indicates a motion of "nod" in the ear animation E. As illustrated in the motion pattern of FIG. 23, in the motion of "nod," an upper half of each ear in the ear animation E of the character C is folded forward. When the ear animation E operates to perform the motion of "nod," each of the users U1, U2, and U3 lightly folds the finger F wearing the operation device 70 forward with respect to the wrist as illustrated in the user motion of FIG. 23.

When a motion indicated by the user motion of FIG. 23 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "nod" based on the motion data. When the motion of the finger F stops at a position indicated by the user motion of FIG. 23, the ears of the ear animation E may stop in a state in which the ears have been folded.

Figure 24:
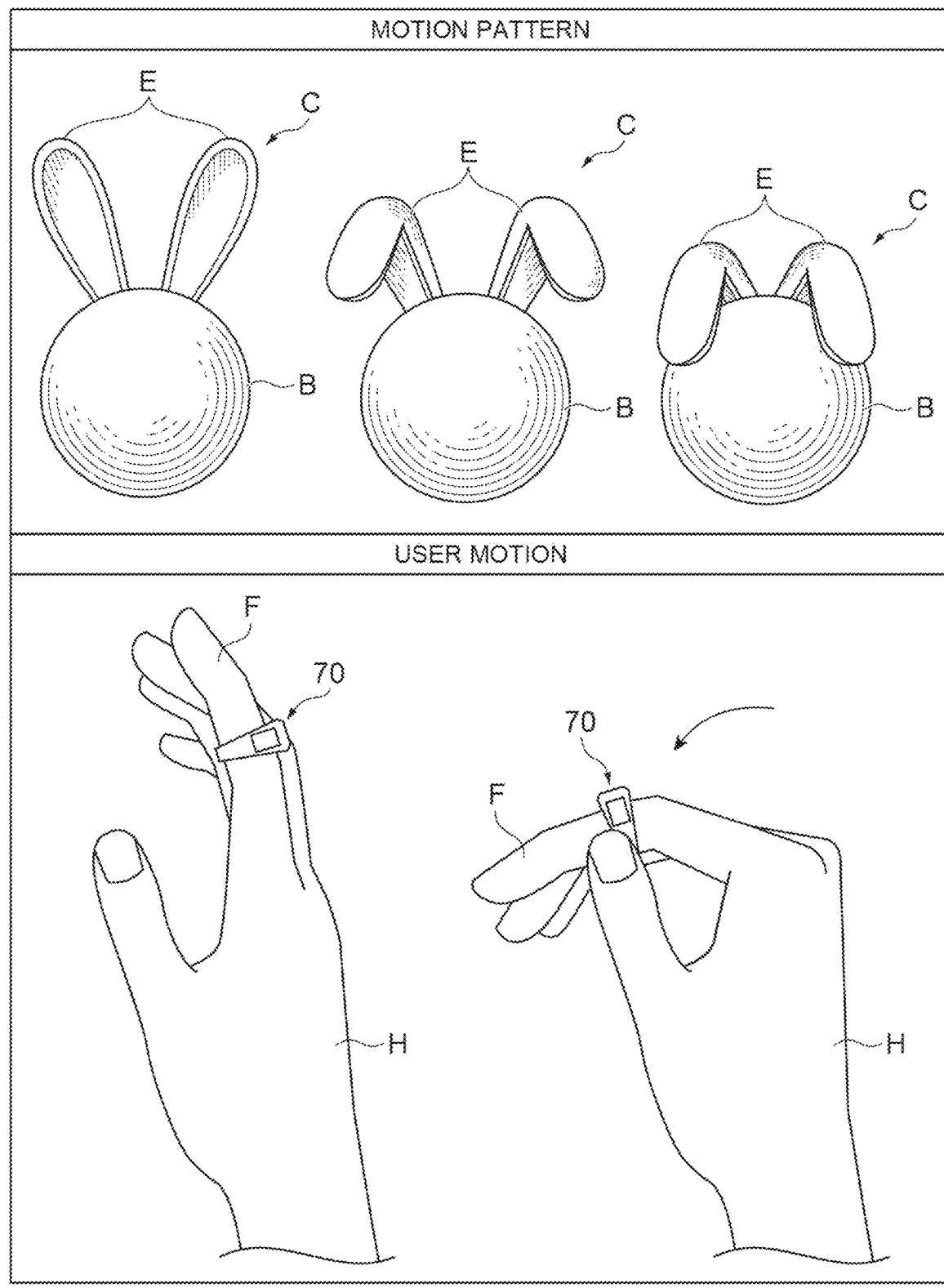
FIG. 24 is a diagram illustrating an example of a motion of an ear animation as a motion pattern and an example of movement of a user's hand when the ear animation illustrated in the motion pattern of FIG. 24 is operated as a user motion.

The motion pattern of FIG. 24 indicates a motion of "agreement" in the ear animation E. In the motion of "agreement," each ear in the ear animation E of the character C is folded forward as a whole. When the ear animation E operates to perform the motion of "agreement," each of the users U1, U2, and U3 deeply folds the finger F wearing the operation device 70 forward as illustrated in the user motion of FIG. 24. Deep folding means that the hand is folded deeper than the motion indicated by the user motion of FIG. 23.

When a motion indicated by the user motion of FIG. 24 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "agreement" based on the motion data.

The motion pattern of FIG. 25 indicates a motion of "praise (applause)" in the ear animation E. In the motion of "praise (applause)," the ears in the ear animation E of the character C get close or separated away. When the ear animation E operates to perform the motion of "praise (applause)," each of the users U1, U2, and U3 performs a motion of applauding with the hand H wearing the operation device 70 as illustrated in the user motion of FIG. 25. Each of the users U1, U2, and U3 may tap a table with the hand H wearing the operation device 70.

When a motion indicated by the user motion of FIG. 25 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "praise (applause)" based on the motion data.

Figure 26:
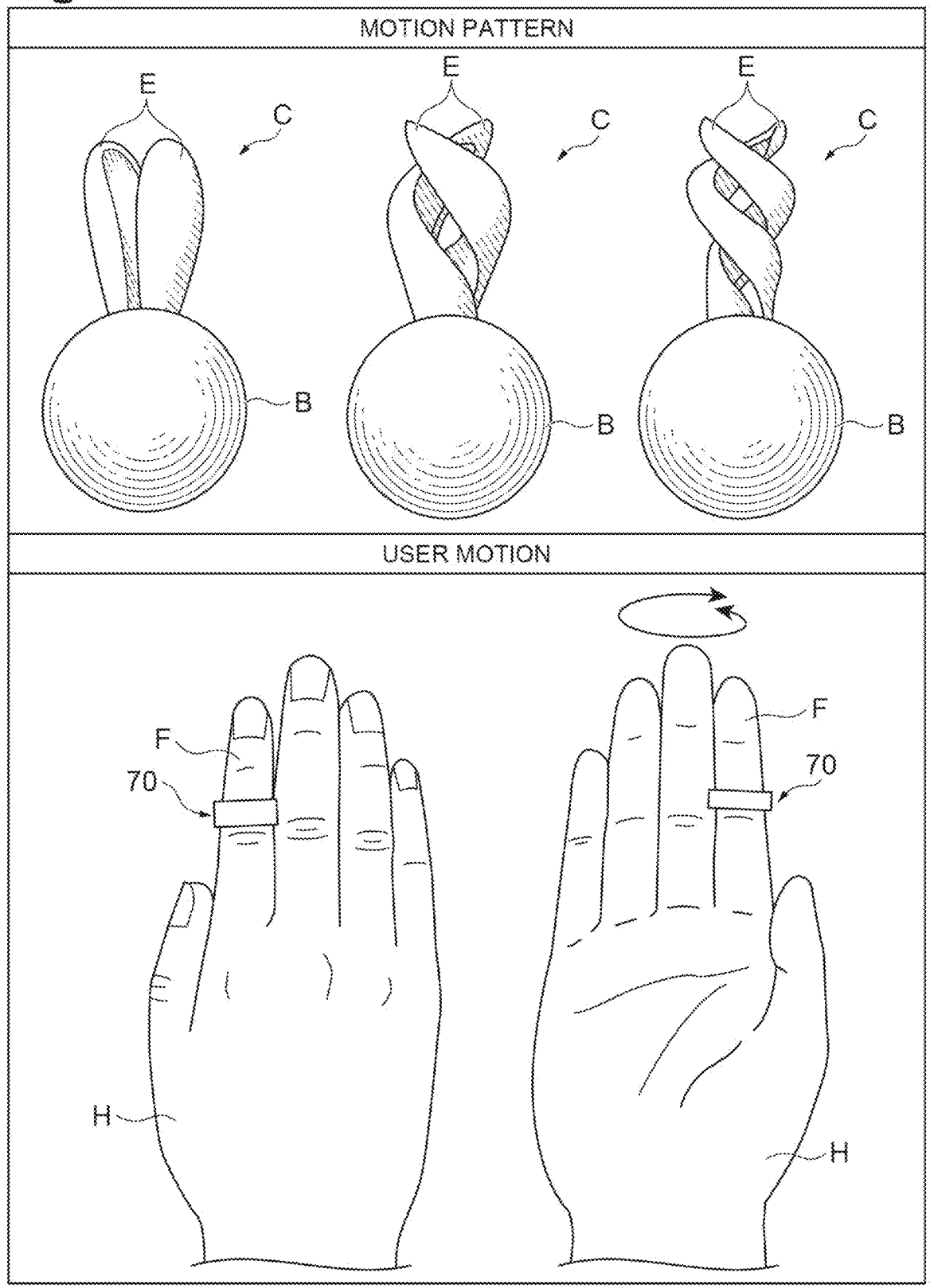
FIG. 26 is a diagram illustrating an example of a motion of an ear animation as a motion pattern and an example of movement of a user's hand when the ear animation illustrated in the motion pattern of FIG. 26 is operated as a user motion.

The motion pattern of FIG. 26 indicates a motion of "inquiry" in the ear animation E. In the motion of "inquiry," the ears in the ear animation E of the character C are entwined. When the ear animation E operates to perform the motion of "inquiry," each of the users U1, U2, and U3 performs a motion rotating the hand H wearing the operation device 70 with respect to the wrist as illustrated in the user motion of FIG. 26.

When a motion indicated by the user motion of FIG. 26 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "inquiry" based on the motion data.

Figure 27:
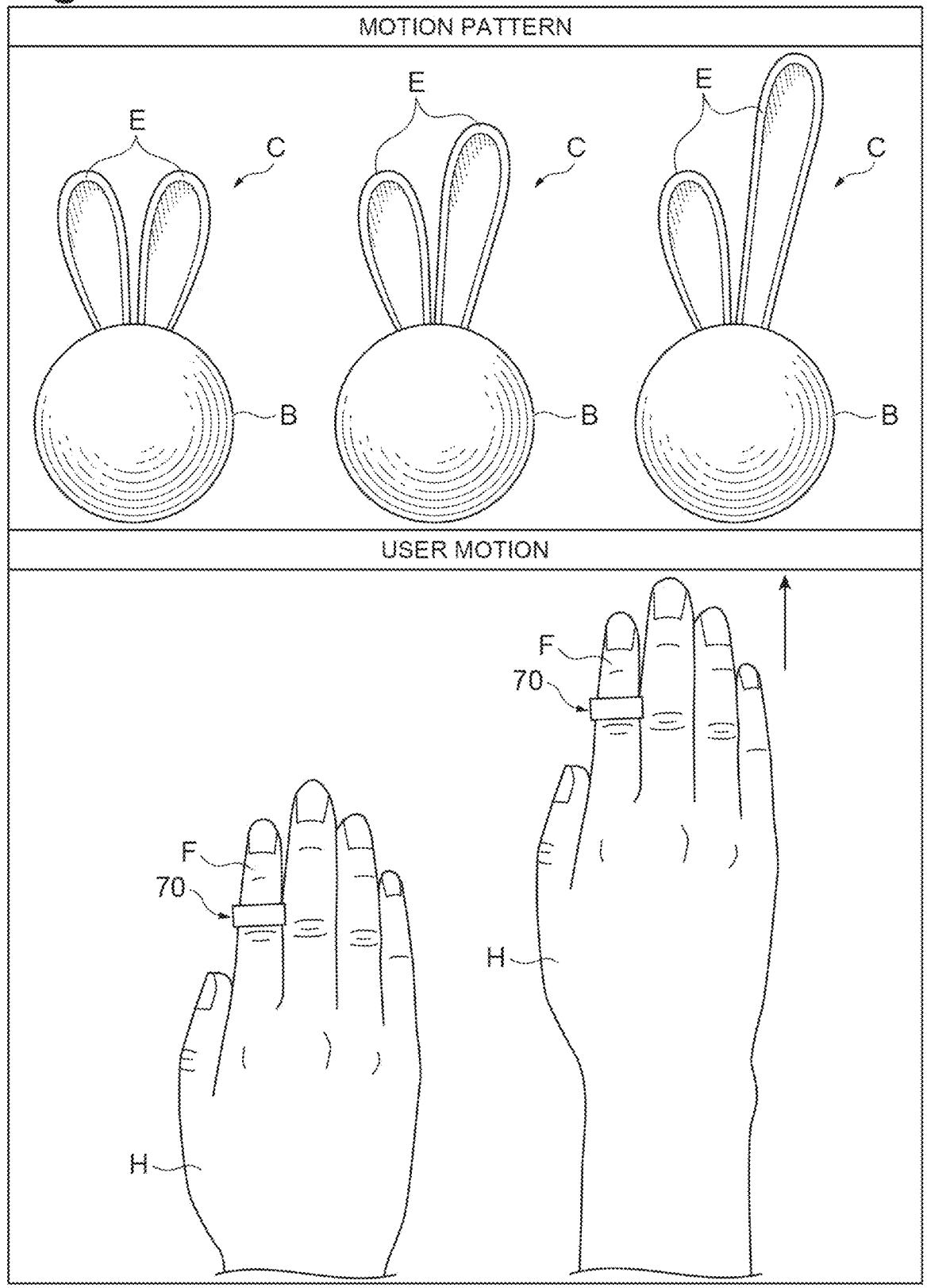
FIG. 27 is a diagram illustrating an example of a motion of an ear animation as a motion pattern and an example of movement of a user's hand when the ear animation illustrated in the motion pattern of FIG. 27 is operated as a user motion.

The motion pattern of FIG. 27 indicates a motion of "show of hands" in the ear animation E. In the motion of "show of hands," the ears in the ear animation E of the character C grow. When the ear animation E operates to perform the motion of "show of hands," each of the users U1, U2, and U3 performs a motion of raising the hand H wearing the operation device 70 as illustrated in the user motion of FIG. 27.

When a motion indicated by the user motion of FIG. 27 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "show of hands" based on the motion data.

Figure 28:
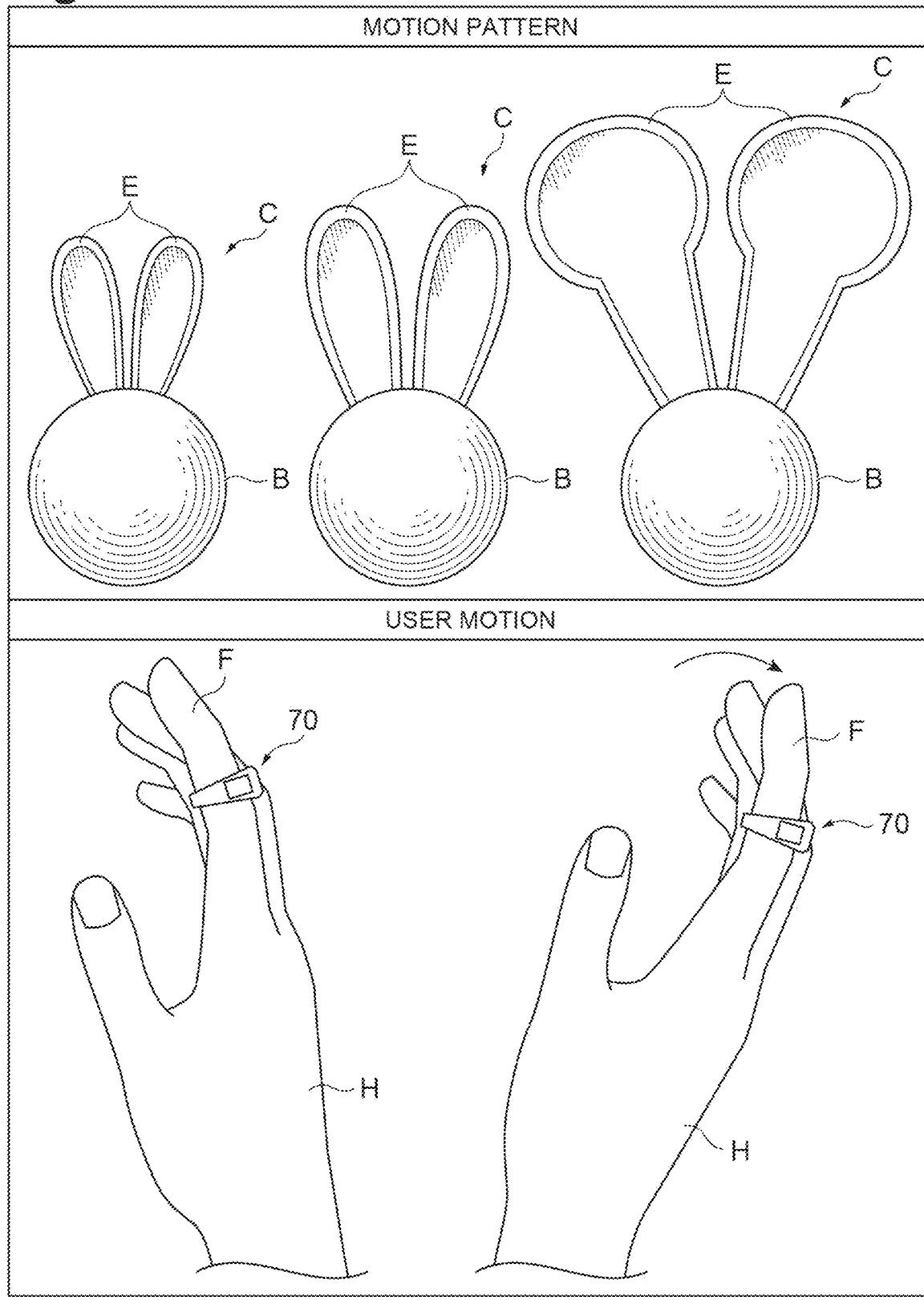
FIG. 28 is a diagram illustrating an example of a motion of an ear animation as a motion pattern and an example of movement of a user's hand when the ear animation illustrated in the motion pattern of FIG. 28 is operated as a user motion.

The motion pattern of FIG. 28 indicates a motion of "surprise" in the ear animation E. In the motion of "surprise," the tip of each ear in the ear animation E of the character C is enlarged. At this time, the body B of the character C turns over rearward. When the ear animation E operates to perform the motion of "surprise," each of the users U1, U2, and U3 turns over the hand H wearing the operation device 70 rearward with respect to the wrist as illustrated in the user motion of FIG. 28.

When a motion indicated by the user motion of FIG. 28 is performed, the operation device 70 detects the motion using the acceleration sensor 75 and the gyro sensor 76 and transmits the detected motion as motion data to the terminals 10, 20, and 30. The control unit 12 of each of the terminals 10, 20, and 30 generates control data for operating the ear animation E to perform the motion of "surprise" based on the motion data.

<Operation Method for Motion of Ear Animation>

An operation method for a motion of an ear animation E of a character C will be described below. When the ear animation E is operated, each of the users U1, U2, and U3 pushes the switch 72 of the operation device 70. Each of the users U1, U2, and U3 performs a motion indicated by one of the user motion of FIG. 23, the user motion of FIG. 24, the user motion of FIG. 25, the user motion of FIG. 26, the user motion of FIG. 27, and the user motion of FIG. 28 in a predetermined time after the switch 72 of the operation device 70 has been pushed. Accordingly, motion data is generated by the operation device 70. The operation device 70 transmits the motion data to the terminals 10, 20, and 30.

The terminals 10, 20, and 30 generate control data corresponding to the motion data when the motion data is received. Accordingly, in the communication screens G of the terminals 10, 20, and 30, the ear animations E of the characters C1, C2, and C3 perform one motion of "nod," "agreement," "praise (applause)," "inquiry," "show of hands," and "surprise." In this way, the motions of the ear animations E of the character C are controlled by the users U1, U2, and U3 operating the operation devices 70.

Advantageous Effects

As described above, the system 100 according to this embodiment includes the operation device 70. The operation device 70 includes the acceleration sensor 75 and the gyro sensor 76. The operation device 70 detects motions of the users U1, U2, and U3 wearing the operation device 70 using the acceleration sensor 75 and the gyro sensor 76, generates motion data, and transmits the motion data to the terminals 10, 20, and 30. The terminals 10, 20, and 30 generate control data corresponding to the motion data and execute motions of the ear animations E. Accordingly, in the system 100, when the operation devices 70 are not operated by the users U1, U2, and U3, the ear animations E do not operate. The ear animations E operate when a specific motion with which the acceleration and the angular velocity of the operation device 70 become predetermined values is performed. Accordingly, for example, when a motion of simply touching the operation device 70 is performed, the ear animation E does not operate. In this way, it is possible to reflect only necessary motions in the ear animations E at timings intended by the users U1, U2, and U3. Accordingly, it is possible to operate the ear animations E according to intentions of the users U1, U2, and U3.

For example, in a mode in which statuses of the users U1, U2, and U3 are estimated on the basis of speech data and image data acquired by a microphone and a camera and the ear animations E are operated based thereon, a method of turning on the microphone or the camera when it is intended to operate the ear animation E or turning off the microphone or the camera when it is not intended to operate the ear animation E is considered to operate the ear animations E according to intentions of the users U1, U2, and U3. However, it is troublesome to turn on/off the camera or the microphone every time. When turning off the camera or the microphone gets forgotten, the ear animations E may operate against intentions of the users U1, U2, and U3. On the other hand, in the system 100, motions of the ear animations E are executed only when a specific operation is performed on the operation devices 70 by the users U1, U2, and U3. Accordingly, with the system 100, it is possible to operate the ear animations E according to intentions of the users U1, U2, and U3 without performing any troublesome operation.

The operation device 70 according to this embodiment is worn on the finger F of each of the users U1, U2, and U3. Accordingly, the users U1, U2, and U3 can operate the motion of the ear animation E by moving the finger F. Accordingly, a broad operation space for operating the operation device 70 is not necessary. Since the operation device 70 is operated through movement of the finger F of each of the users U1, U2, and U3, it is possible to naturally and conveniently operate the operation device 70. Since the finger F can perform various motions, it is possible to increase variations of the ear animation E corresponding to the motion data.

The operation device 70 according to this embodiment includes the switch 72. When the switch 72 is pushed, the operation device 70 generates motion data and transmits the motion data to the terminals 10, 20, and 30. In this way, the operation device 70 generates motion data only when the switch 72 is pushed. That is, when the switch 72 is not pushed, motion data is not generated even if a specific operation is performed on the operation device 70. Accordingly, the operation device 70 does not generate motion data against intentions of the users U1, U2, and U3. As a result, it is possible to operate the ear animation E according to the intentions of the users U1, U2, and U3.

In the system 100 according to this embodiment, the terminals 10, 20, and 30 generate sightline data including information associated with sightlines of the users U1, U2, and U3 and transmit the sightline data to the operation devices 70. The operation devices 70 cause the vibration unit 78 to vibrate for a predetermined time based on the sightline data. Accordingly, the users U1, U2, and U3 wearing the operation devices 70 can feel the sightlines of the other users U1, U2, and U3 directed to the own characters C1, C2, and C3.

Fourth Embodiment

<Configuration of Operation Device>

Figure 29:
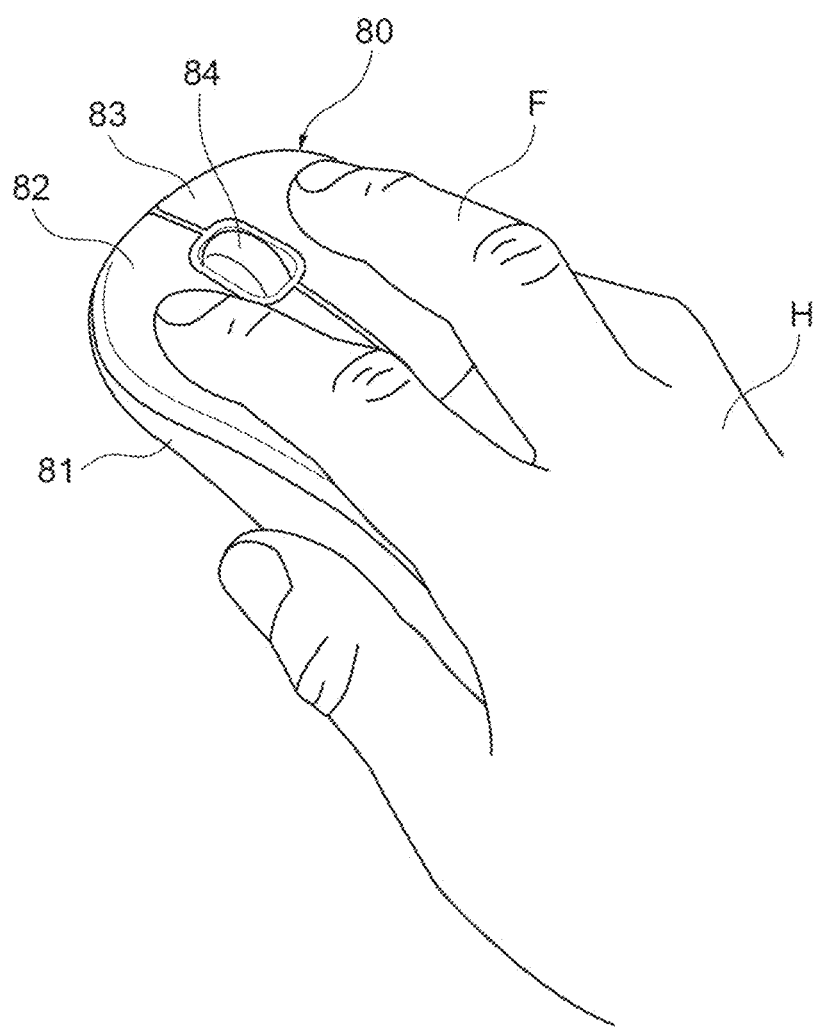
FIG. 29 is a perspective view of an operation device according to a fourth embodiment.

FIG. 29 is a perspective view of an operation device 80 according to a fourth embodiment. FIG. 29 is a diagram illustrating a state in which the operation device 80 is operated by a finger F of each of the users U1, U2, and U3. The operation device 80 is a device that is operated by each of the users U1, U2, and U3. The ear animation E is operated through operation of each of the users U1, U2, and U3 on the operation device 80. The operation device 80 is a mouse. An optical type, a laser type, a blue LED, an IR LED, a ball type, or the like can be employed as a type of the mouse. The operation device 80 includes a body 81, a right button 82, a left button 83, and a wheel 84.

Figure 30:
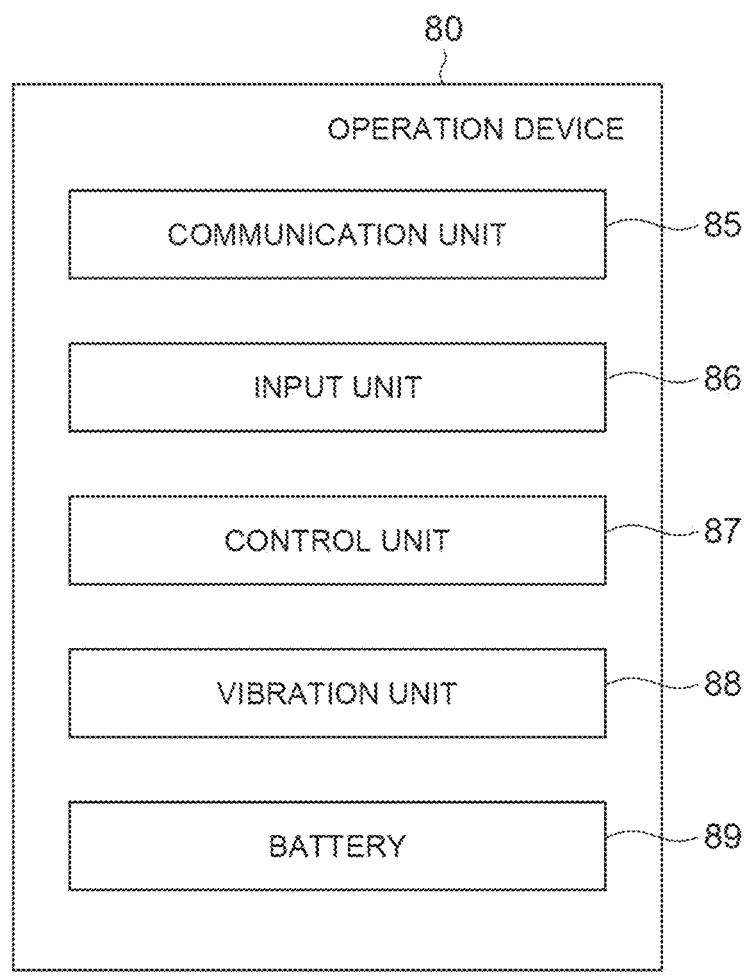
FIG. 30 is a diagram illustrating an example of functional blocks of the operation device illustrated in FIG. 29.

FIG. 30 is a diagram illustrating an example of functional blocks of the operation device 80. As illustrated in FIG. 30, the operation device 80 includes a communication unit 85.

The communication unit 85 is a part that communicates with an external device by wireless communication or wired communication. The wireless communication is, for example, Bluetooth (registered trademark) or a 2.4 GHz system. Examples of the external device include the terminal 10, the terminal 20, and the terminal 30. The communication unit 85 transmits motion data output from a control unit 87 to the terminal 10, the terminal 20, and the terminal 30 or receives sightline data from the terminal 10, the terminal 20, and the terminal 30.

The operation device 80 includes an input unit 86. The input unit 86 is a part that receives an input of an operation by the users U1, U2, and U3. The input unit 86 detects an operation of the right button 82, the left button 83, and the wheel 84 by each of the users U1, U2, and U3. The input unit 86 outputs an operation signal to the control unit 87.

The operation device 80 includes the control unit 87. The control unit 87 generates motion data based on the operation signal from the input unit 86. The control unit 87 outputs the motion data to the communication unit 85. When sightline data is output from the communication unit 14, the control unit 87 causes a vibration unit 88 to vibrate for a predetermined time. The predetermined time in which the vibration unit 88 is caused to vibrate can be appropriately set.

The control unit 87 can be constituted by a processor such as a CPU or a GPU, a clock, and an internal memory. The control unit 87 may be constituted as a single hardware piece (system on a chip (SoC)) in which the processor, the clock, the internal memory, and the communication unit 85 are integrated.

The operation device 80 includes a vibration unit 88. The vibration unit 88 causes the body 81 to vibrate. The vibration unit 88 can be constituted by a motor, a piezoelectric device, or the like. The vibration unit 88 is controlled by the control unit 87.

The operation device 80 includes a battery 89 when wireless communication is performed. The battery 89 supplies electric power to the constituents of the operation device 80.

The operation of the operation device 80 by each of the users U1, U2, and U3 when an ear animation E of a character C (C1, C2, and C3) operates to express a motion such as "nod," "agreement," "surprise," "praise (applause)," or "inquiry" will be described below. That is, a relationship between the motion of the ear animation E of the character C and the motion of each of the users U1, U2, and U3 detected by the operation device 80 will be described.

Motion patterns illustrated in FIGS. 31 to 34 are examples of a motion of an ear animation E. User motions illustrated in FIGS. 31 to 34 are examples of movement of a finger F of the users U1, U2, and U3 when the ear animation E operates based on the motion patterns illustrated in FIGS. 31 to 34.

Figure 31:
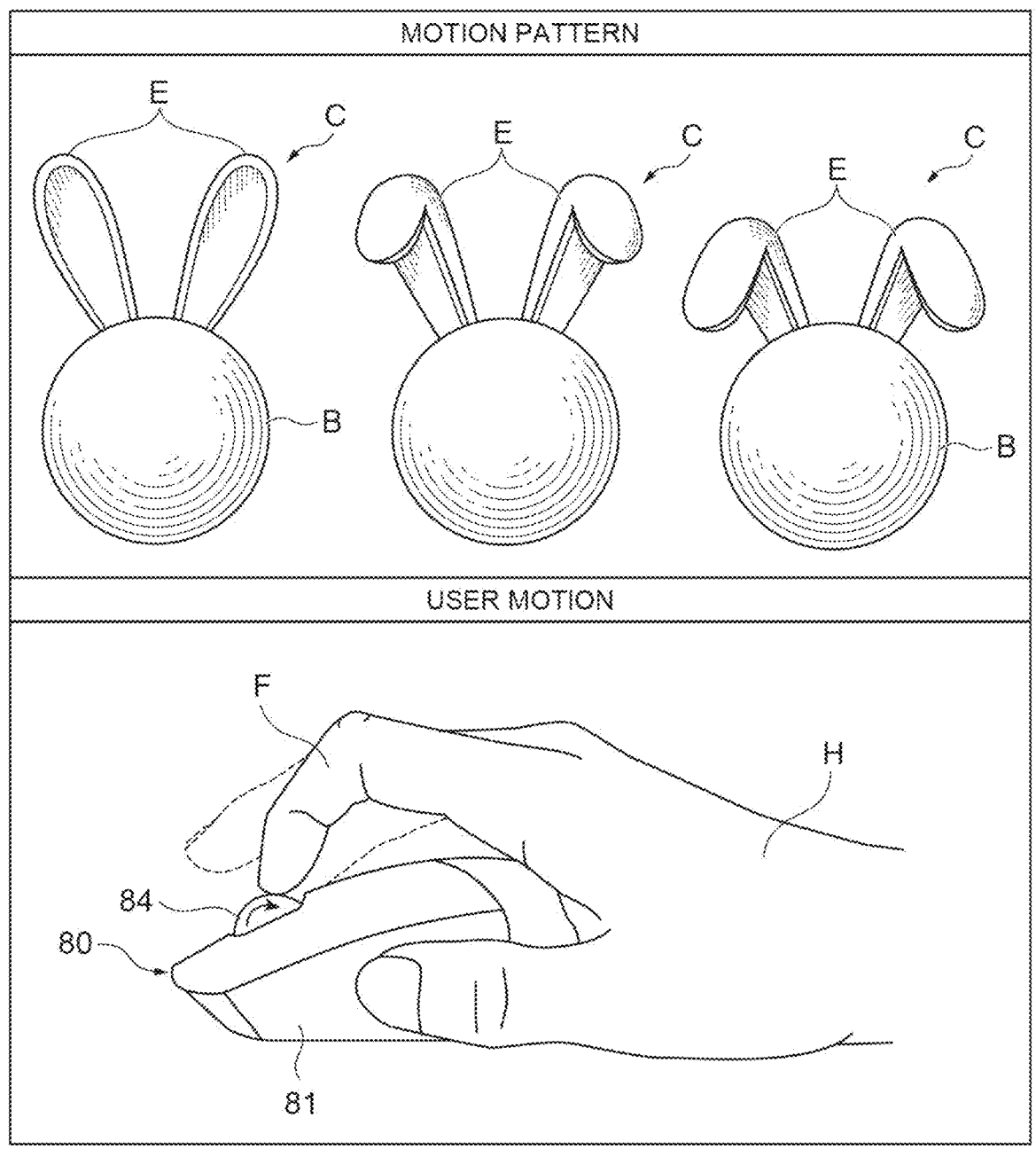
FIG. 31 is a diagram illustrating an example of a motion of an ear animation as a motion pattern and an example of movement of a user's hand when the ear animation illustrated in the motion pattern of FIG. 31 is operated as a user motion.

The motion pattern of FIG. 31 indicates a motion of "nod" in the ear animation E. As illustrated in the motion pattern of FIG. 31, in the motion of "nod," an upper half of each ear in the ear animation E of the character C is folded forward. When the ear animation E operates to perform the motion of "nod," each of the users U1, U2, and U3 rotates the wheel 84 of the operation device 80 with a finger F (for example, an index finger) as illustrated in the user motion of FIG. 31.

When a motion indicated by the user motion of FIG. 30 is performed, the operation device 80 detects the motion through the input unit 86 and transmits the detected motion as motion data to the terminals 10, 20, and 30. The control unit 12 of each of the terminals 10, 20, and 30 generates control data for operating the ear animation E to perform the motion of "nod" based on the motion data. In the user motion of FIG. 31, a motion speed of the ear animation E may be changed based on a rotation speed of the wheel 84. For example, when the rotation speed of the wheel 84 is low, the motion speed of the ear animation E may be decreased. The motion of the ear animation E may be changed based on a rotation quantity of the wheel 84. For example, the motion of "nod" may be performed when the rotation quantity of the wheel 84 is less than a predetermined value, and the motion of "agreement" may be performed when the rotation quantity of the wheel 84 is equal to or greater than the predetermined value.

Figure 32:
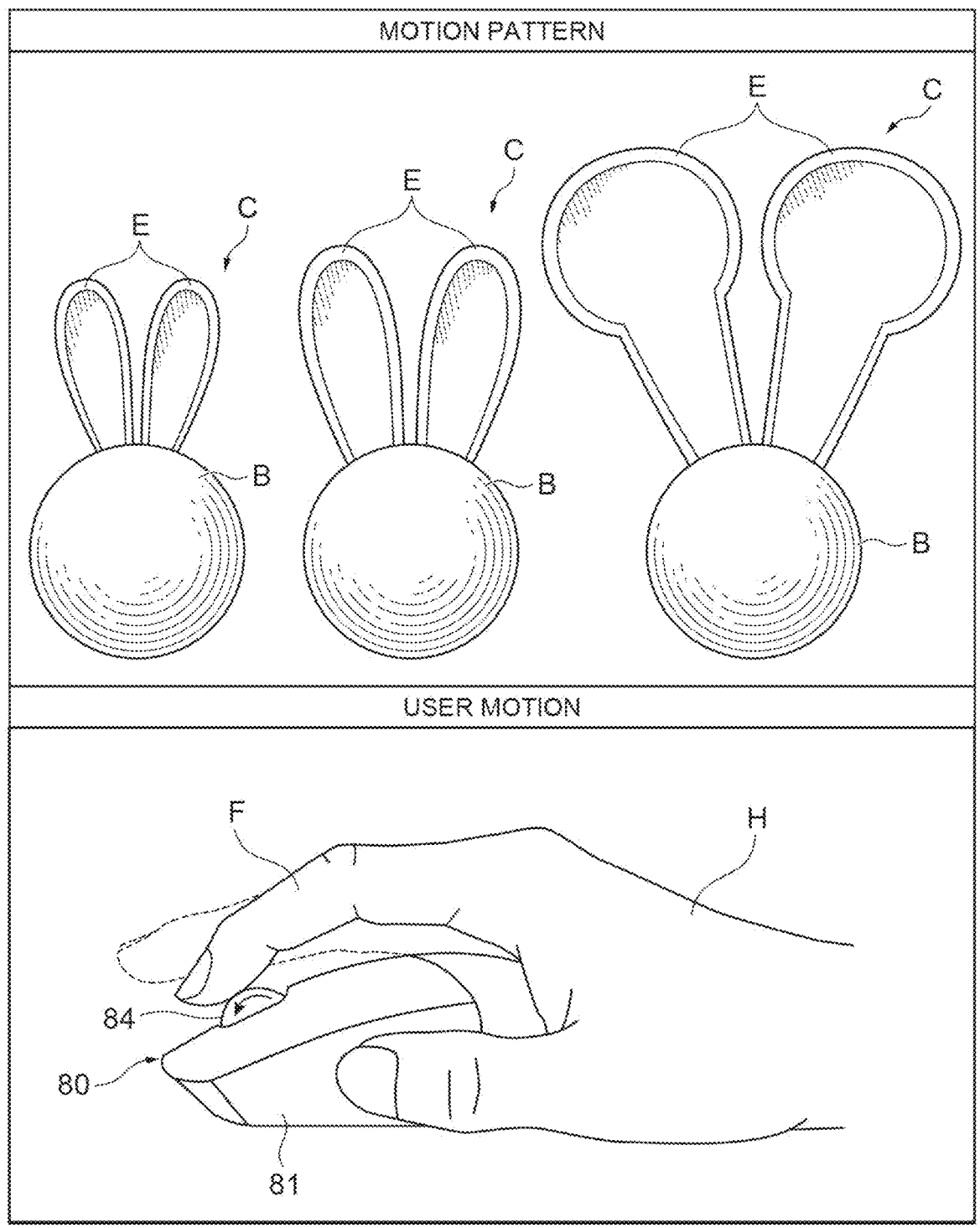
FIG. 32 is a diagram illustrating an example of a motion of an ear animation as a motion pattern and an example of movement of a user's hand when the ear animation illustrated in the motion pattern of FIG. 32 is operated as a user motion.

The motion pattern of FIG. 32 indicates a motion of "surprise" in the ear animation E. In the motion of "surprise," the tip of each ear in the ear animation E of the character C is enlarged. At this time, the body B of the character C turns over rearward. When the ear animation E operates to perform the motion of "surprise," each of the users U1, U2, and U3 rotates the wheel 84 forward with a finger F (for example, an index finger) as illustrated in the user motion of FIG. 32.

When a motion indicated by the user motion of FIG. 32 is performed, the operation device 80 detects the motion through the input unit 86 and transmits the detected motion as motion data to the terminals 10, 20, and 30. The control unit 12 of each of the terminals 10, 20, and 30 generates control data for operating the ear animation E to perform the motion of "surprise" based on the motion data.

Figure 33:
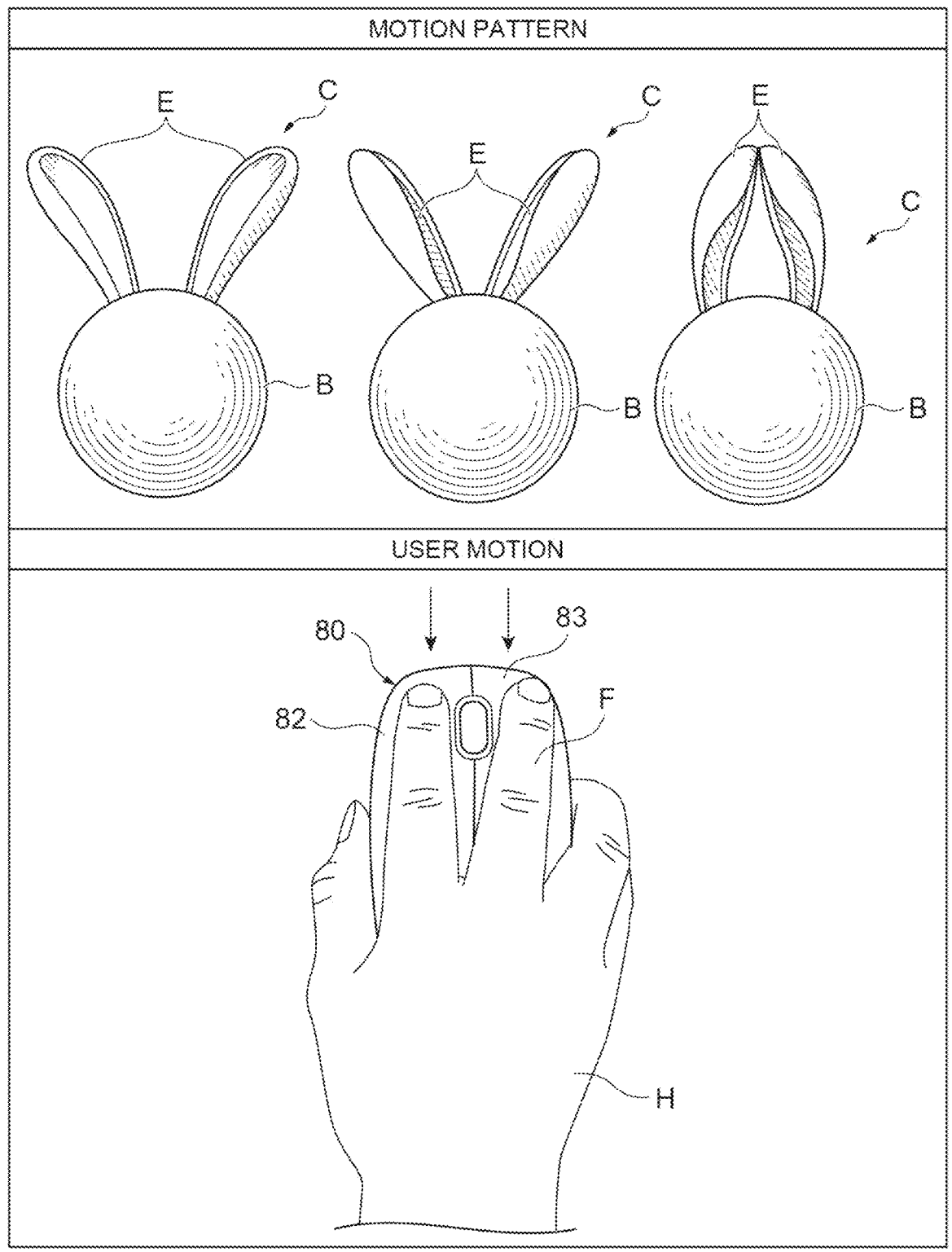
FIG. 33 is a diagram illustrating an example of a motion of an ear animation as a motion pattern and an example of movement of a user's hand when the ear animation illustrated in the motion pattern of FIG. 33 is operated as a user motion.

The motion pattern of FIG. 33 indicates a motion of "praise (applause)" in the ear animation E. In the motion of "praise (applause)," the ears in the ear animation E of the character C get close or separated away. When the ear animation E operates to perform the motion of "praise (applause)," each of the users U1, U2, and U3 simultaneously clicks the right button 82 and the left button 83 with two fingers F (for example, an index finger and a middle finger) as illustrated in the user motion of FIG. 33.

When a motion indicated by the user motion of FIG. 33 is performed, the operation device 80 detects the motion through the input unit 86 and transmits the detected motion as motion data to the terminals 10, 20, and 30. The control unit 12 of each of the terminals 10, 20, and 30 generates control data for operating the ear animation E to perform the motion of "praise (applause)" based on the motion data. The control unit 12 of each of the terminals 10, 20, and 30 may generate control data to applaud a plurality of times based on motion data associated with one motion of clicking the right button 82 and the left button 83 once.

Figure 34:
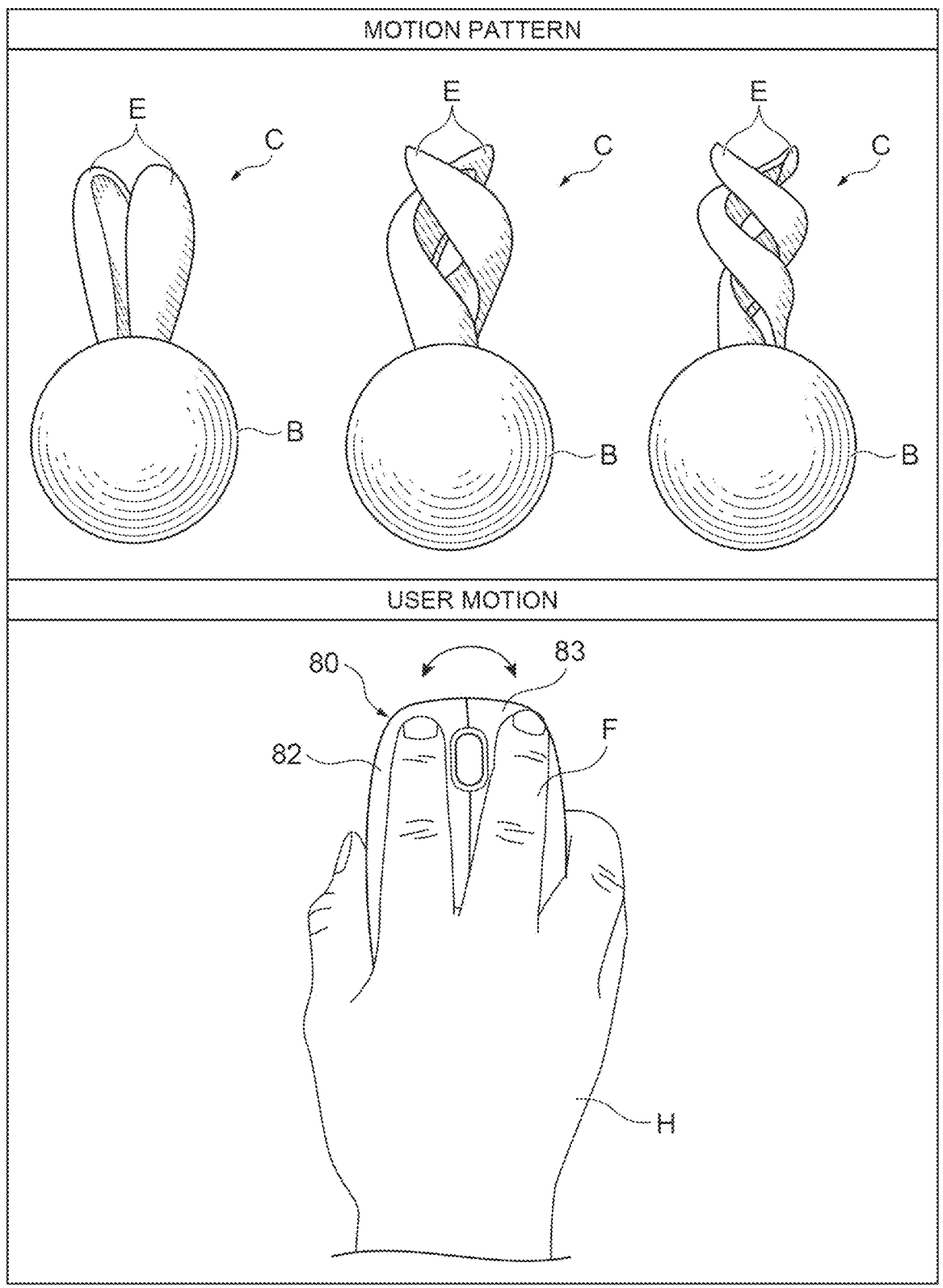
FIG. 34 is a diagram illustrating an example of a motion of an ear animation as a motion pattern and an example of movement of a user's hand when the ear animation illustrated in the motion pattern of FIG. 34 is operated as a user motion.

The motion pattern of FIG. 34 indicates a motion of "inquiry" in the ear animation E. In the motion of "inquiry," the ears in the ear animation E of the character C are entwined. When the ear animation E operates to perform the motion of "inquiry," each of the users U1, U2, and U3 alternately clicks the right button 82 and the left button 83 with two fingers F (for example, an index finger and a middle finger) as illustrated in the user motion of FIG. 34.

When a motion indicated by the user motion of FIG. 34 is performed, the operation device 80 detects the motion through the input unit 86 and transmits the detected motion as motion data to the terminals 10, 20, and 30. The control unit 12 of each of the terminals 10, 20, and 30 generates control data for operating the ear animation E to perform the motion of "inquiry" based on the motion data.

<Operation Method for Motion of Ear Animation>

An operation method for a motion of an ear animation E of a character C will be described below. When the ear animation E is operated, each of the users U1, U2, and U3 performs a motion indicated by one of the user motion of FIG. 31, the user motion of FIG. 32, the user motion of FIG. 33, and the user motion of FIG. 34. Accordingly, motion data is generated by the operation device 80. The operation device 80 transmits the motion data to the terminals 10, 20, and 30.

The terminals 10, 20, and 30 generate control data corresponding to the motion data when the motion data is received. Accordingly, in the communication screens G of the terminals 10, 20, and 30, the ear animations E of the characters C1, C2, and C3 perform one motion of "nod (agreement)," "surprise," "praise (applause)," and "inquiry." In this way, the motions of the ear animations E of the character C are controlled by the users U1, U2, and U3 operating the operation devices 80.

Advantageous Effects

As described above, the operation device 80 according to this embodiment includes the right button 82, the left button 83, and the wheel 84. The operation device 80 detects motions of the users U1, U2, and U3 using the right button 82, the left button 83, and the wheel 84, generates motion data, and transmits the motion data to the terminals 10, 20, and 30. The terminals 10, 20, and 30 generate control data corresponding to the motion data and execute motions of the ear animations E. Accordingly, in the system 100, when the operation devices 80 are not operated by the users U1, U2, and U3, the ear animations E do not operate. For example, when a motion of simply moving the operation device 80 is performed, the ear animation E does not operate. In this way, it is possible to reflect only necessary motions in the ear animations E at timings intended by the users U1, U2, and U3. Accordingly, it is possible to operate the ear animations E according to intentions of the users U1, U2, and U3.

While embodiments of the present invention have been described above, the present invention is not limited to the embodiments and can be modified in various forms without departing from the gist thereof.

In the embodiments, for example, an ear animation E operates to express one motion of "nod," "agreement," "praise (applause)," "inquiry," "show of hands," and "surprise." However, the motion of the ear animation E corresponding to a motion of a user is not limited thereto. The motion of the ear animation E may be another motion or may include another motion. For example, the ear animation E may operate to express a motion of "OK." In the first embodiment, when the motion of "OK" is performed by the ear animation E, each of the users U1, U2, and U3 causes two fingers F (for example, an index finger and a middle finger) to slide, for example, such that a circle is drawn in a state in which the two fingers F touch the operation surface 51A.

The correspondence between the motion patterns and the user motions in association with the motions of the users U1, U2, and U3 when the ear animation E operates to express one motion of "nod," "agreement," "praise (applause)," "inquiry," "show of hands," and "surprise" is not limited to the examples in the aforementioned embodiments. For example, in the first embodiment, when the motion of "inquiry" in FIG. 9 is performed by the ear animation E, each of the users U1, U2, and U3 causes two fingers F (for example, an index finger and a middle finger) to slide such that a semicircle (an arc) is drawn in a state in which the two fingers F touch the operation surface 51A, but the two fingers may slide to draw ∞ (infinity). The correspondence between the motion patterns and the user motion can be appropriately set.

In the aforementioned embodiments, for example, a motion of a hand H or a finger F of each of the users U1, U2, and U3 is detected by one of the operation device 50, the operation device 60, the operation device 70, and the operation device 80. However, the hand H or the finger F of each of the users U1, U2, and U3 may be detected by an image sensor (such as a camera or a laser).

In the aforementioned embodiments, the operation device has only to detect acceleration and an angular velocity. The operation device may be, for example, a mobile phone (such as a smartphone) including a display (a display unit) that displays an ear animation E. When the operation device is a mobile phone, motion data is generated by operating the mobile phone similarly to the operation devices 50, 60, 70, and 80.

Specifically, when the motion of "nod" is performed by the ear animation E, for example, the mobile phone is inclined forward. When the motion of "agreement" is performed by the ear animation E, the mobile phone is inclined forward deeper than the motion of "nod." When the motion of "praise (applause)" is performed by the ear animation E, the mobile phone is slightly swung. When the motion of "inquiry" is performed by the ear animation E, the mobile phone is rotated to reciprocate. When the motion of "show of hands" is performed by the ear animation E, the mobile phone is raised upward.

When the operation device is a mobile phone, the ear animation E (the character C) is displayed on the display of the operation device, and thus it is possible to operate the operation device while ascertaining the ear animation E. Since the operation device and the display displaying the ear animation E are integrated, it is possible to achieve simplification of a structure.

In the first embodiment, for example, the operation device 50 includes the vibration unit 55 and operates the vibration unit 55 (causes the body 51 to vibrate) based on the sightline data. However, the operation device 50 may not include the vibration unit 55. The operation device 50 may include, for example, a light emitting unit (for example, an LED). In this configuration, the light emitting unit is made to emit light based on the sightline data.

In addition to the first embodiment, the operation device 50 may cause the vibration unit 55 to vibrate based on the motion data. A vibration pattern can be set to correspond to the motion data. The vibration pattern can be set to correspond to "nod," "agreement," "praise (applause)," "inquiry," "show of hands," and "surprise." For example, the vibration pattern can be set to vibration of a short time for "nod" and vibration of a longer time than that of the vibration for "nod" for "agreement." In this configuration, when the operation device 50 vibrates according to intentions of the users U1, U2, and U3, it is possible to achieve motion togetherness.

In the first embodiment, the motion of the ear animation E may change based on at least one of the motion speed and the moving quantity of the finger F (the hand H) of each of the users U1, U2, and U3 in the operation device 50. That is, at least one of the motion speed and the moving quantity of the finger F (the hand H) of each of the users U1, U2, and U3 in the operation device 50 may be reflected in the motion of the car animation E.

For example, the motion speed of the ear animation E may change according to the motion speed of the finger F. Specifically, for example, in the motion of "nod" in the motion pattern of FIG. 6, a folding speed of the ears of the ear animation E may be increased when the sliding speed of the finger F of each of the users U1, U2, and U3 on the operation surface 51A of the operation device 50 is increased, and the folding speed of the ears may be decreased when the sliding speed of the finger F on the operation surface 51A is decreased. For example, in the motion of "nod" in the motion pattern of FIG. 6, a folding angle of the ears of the ear animation E may be increased when a slide quantity (a moving quantity) of each of the users U1, U2, and U3 on the operation surface 51A is increased, and the folding angle of the ears may be decreased when the slide quantity on the operation surface 51A is decreased. The other motions of the ear animation E can also be appropriately set. The sensitivity of the motion of the ear animation E to the motion speed and the moving quantity of the finger F (the hand H) of each of the users U1, U2, and U3 on the operation device 50 can be set while actually ascertaining the motion of the ear animation E.

As described above, the operation device 50 that detects at least one of the motion speed and the moving quantity of at least one of the hand H and the finger F of each of the users U1, U2, and U3 is used, and the motion of the ear animation E is changed based on at least one of the motion speed and the moving quantity. In this method, a motion speed or a moving quantity of the ear animation E changes according to the motion speed or the moving quantity. Accordingly, it is possible to express (display) sensitive non-verbal information corresponding to a situation (including conversation details and context) of each of the users U1, U2, and U3 with the ear animation E. Accordingly, since an emotion (a feeling) of each of the users U1, U2, and U3 is expressed by the ear animation E, it is possible to realize smooth communication. In the other embodiments, at least one of the motion speed and the moving quantity of at least one of the hand H and the finger F of each of the users U1, U2, and U3 can be detected using the operation device 60, 70, or 80, and the motion of the ear animation E can be changed based on at least one of the motion speed and the moving quantity.

In the second embodiment, for example, a user grasps the single operation device 60 with a hand H and operates the motion of the ear animation E. However, a user may grasp a plurality of operation devices 60 and operate the motion of the ear animation E. For example, the operation devices 60 may be grasped with two hands, respectively. With this configuration, it is possible to achieve diversification of the motion of the ear animation E by combining the motion data generated by the two operation devices 60.

In the second embodiment, for example, the operation device 60 includes the acceleration sensor 65. However, the operation device 60 may not include the acceleration sensor 65. That is, the operation device 60 may include only the gyro sensor 66.

In the second embodiment, for example, the operation device 60 includes the switch 62. However, the operation device 60 may not include the switch 62. In this configuration, when a value detected by the acceleration sensor 65 and/or the gyro sensor 66 of the operation device 60 is equal to or greater than a predetermined value, the control unit 67 may generate the motion data. The predetermined value can be set to be equal to or greater than the predetermined value of the acceleration sensor 65 and/or the gyro sensor 66. Accordingly, each of the users U1, U2, and U3 can operate the motion of the ear animation E without performing a specific operation.

The operation device 60 may include an input unit that receives an input of speech of each of the users U1, U2, and U3. In this configuration, when speech of each of the users U1, U2, and U3 is input to the input unit, motion data is generated. The operation device 60 generates the motion data when predetermined speech, for example, "uh-huh," is input to the input unit. The speech input to generate the motion data may not be transmitted to another user.

In the second embodiment, for example, the operation device 60 includes the vibration unit 68 and operates the vibration unit 68 (causes the body 61 to vibrate) based on the sightline data. However, the operation device 60 may not include the vibration unit 68. The operation device 60 may include, for example, a light emitting unit (for example, an LED). In this configuration, the light emitting unit is made to emit light based on the sightline data.

In addition to the second embodiment, the operation device 60 may cause the vibration unit 68 to vibrate based on the motion data. A vibration pattern can be set to correspond to the motion data. The vibration pattern can be set to correspond to "nod," "agreement," "praise (applause)," "inquiry," "show of hands," and "surprise." For example, the vibration pattern can be set to vibration of a short time for "nod" and vibration of a longer time than that of the vibration for "nod" for "agreement." In this configuration, when the operation device 60 vibrates according to intentions of the users U1, U2, and U3, it is possible to achieve motion togetherness.

In the third embodiment, for example, a user wears the single operation device 70 on a finger F and operates the motion of the ear animation E. However, a user may wear a plurality of operation devices 70 and operate the motion of the ear animation E. For example, the operation devices 70 may be worn on an index finger and a middle finger or may be worn on fingers of two hands, respectively. With this configuration, it is possible to achieve diversification of the motion of the ear animation E by combining the motion data generated by the two operation devices 70.

In the third embodiment, for example, the operation device 70 includes the acceleration sensor 75. However, the operation device 70 may not include the acceleration sensor 75. That is, the operation device 70 may include only the gyro sensor 76.

In the embodiment, for example, the operation device 70 includes the switch 72. However, the operation device 70 may not include the switch 72. In this configuration, when a value detected by the acceleration sensor 75 and/or the gyro sensor 76 of the operation device 70 is equal to or greater than a predetermined value, the control unit 77 may generate the motion data. The predetermined value can be set to be equal to or greater than the predetermined value of the acceleration sensor 75 and/or the gyro sensor 76. Accordingly, each of the users U1, U2, and U3 can operate the motion of the ear animation E without performing a specific operation.

The operation device 70 may include an input unit that receives an input of speech of each of the users U1, U2, and U3. In this configuration, when speech of each of the users U1, U2, and U3 is input to the input unit, motion data is generated. The operation device 70 generates the motion data when predetermined speech, for example, "uh-huh," is input to the input unit. The speech input to generate the motion data may not be transmitted to another user.

In the embodiment, for example, the operation device 70 includes the vibration unit 78 and operates the vibration unit 78 (causes the body 71 to vibrate) based on the sightline data. However, the operation device 70 may not include the vibration unit 78. The operation device 70 may include, for example, a light emitting unit (for example, an LED). In this configuration, the light emitting unit is made to emit light based on the sightline data.

In addition to the embodiment, the operation device 70 may cause the vibration unit 78 to vibrate based on the motion data. A vibration pattern can be set to correspond to the motion data. The vibration pattern can be set to correspond to "nod," "agreement," "praise (applause)," "inquiry," and "show of hands." For example, the vibration pattern can be set to vibration of a short time for "nod" and vibration of a longer time than that of the vibration for "nod" for "agreement." In this configuration, when the operation device 70 vibrates according to intentions of the users U1, U2, and U3, it is possible to achieve motion togetherness.

In the fourth embodiment, for example, the operation device 80 includes the vibration unit 88 and operates the vibration unit 88 (causes the body 81 to vibrate) based on the sightline data. However, the operation device 80 may not include the vibration unit 88. The operation device 80 may include, for example, a light emitting unit (for example, an LED). In this configuration, the light emitting unit is made to emit light based on the sightline data.

In addition to the fourth embodiment, the operation device 80 may cause the vibration unit 88 to vibrate based on the motion data. A vibration pattern can be set to correspond to the motion data. The vibration pattern can be set to correspond to "nod," "surprise," "praise (applause)," and "inquiry." In this configuration, when the operation device 80 vibrates according to intentions of the users U1, U2, and U3, it is possible to achieve motion togetherness.

In the aforementioned embodiments, for example, each of the terminals 10, 20, and 30 generates control data. However, the control data may be generated by the server 40. In this configuration, each of the terminals 10, 20, and 30 transmits motion data to the server 40, and the server 40 generates control data based on the motion data.

In the aforementioned embodiments, for example, the body B of each of the characters C1, C2, and C3 has a spherical shape. However, the shape of the body B of each of the characters C1, C2, and C3 is not limited to the spherical shape. The body B may have a shape imitating a display. In this case, for example, materials, a translation (for example, "Hello!") of utterance details of a speaker, and face images of the users U1, U2, and U3 may be displayed on the body B. By linking the utterance details to an AI, a diagram, text, a moving image, speech, or the like corresponding to conversations may be automatically displayed on the display of the body B.

The body B may have a shape imitating an automobile, a shape imitating an alarm clock, or a shape imitating a tree. The body B may change, deform, or the like according to a user status. Each of the characters C1, C2, and C3 may have a shape in which an ear animation E is displayed on a head of a robot or the like. In this case, a part of the body B (for example, a semicircular shape) may be displayed in addition to the ear animation E. In this configuration, a cap of the ear animation E is displayed to be worn on the head of the robot or the like. In this case, the body B may be a display. A head set or the like including the ear animation E may be displayed along with a robot or the like. Each of the characters C1, C2, and C3 may include a leg animation. In this case, the leg animation of each of the characters C1, C2, and C3 may operate based on a detection result from a sensor detecting movement of a leg of each of the users U1, U2, and U3.

In the aforementioned embodiments, for example, the characters C1, C2, and C3 of all the users U1, U2, and U3 participating in communication are displayed on the communication screen G as illustrated in FIG. 2. However, only a character of a user which is a communication partner may be displayed on the communication screen. For example, only the character C2 of the user U2 and the character C3 of the user U3 may be displayed on the communication screen G of the terminal 10 of the user U1.

In FIG. 2, for example, the characters C1, C2, and C3 are displayed to face each other around the table T. However, arrangement of the characters C1, C2, and C3 or the like is not limited thereto. For example, the characters C1, C2, and C3 may be arranged on a stage. The stage may be movable. On the stage, the characters C1, C2, and C3 can dance or do physical exercise according to operations of the users U1, U2, and U3.

When the body B has a shape imitating a display, a display on which materials and the like are displayed may be displayed on the communication screen G. Accordingly, it is possible to hold a lecture, a workshop, a lecture meeting, or the like. At this time, translations based on attributes of the users U1, U2, and U3 (such as nationality or a country of residence) can be displayed on the display of the body B.

In the aforementioned embodiments, for example, the body B and the ear animation E are displayed on the communication screen G of each of the terminals 10, 20, and 30. However, when the terminals are wearable terminals or head-mounted display (HMD) terminals, the body B, the ear animation E, and the like may be displayed on a lens or the like or may be displayed in hologram. That is, the characters C1, C2, and C3 are displayed in a cyberspace. The cyberspace may include virtual reality (VR), augmented reality (AR), and mixed reality (MR).

In the aforementioned embodiments, for example, the motion of the ear animation E of each of the characters C1, C2, and C3 displayed on the communication screen G in a television conference is operated. However, this animation operation method may be applied to operation of a motion of an ear animation of a character that gives a performance of dancing or singing.

REFERENCE SIGNS LIST

10 Terminal
11 Input unit
12 Control unit
13 Storage unit
13P Terminal program
14 Communication unit
15 Output unit
20 Terminal
30 Terminal
40 Server
42 Control unit
43 Storage unit
43P Server program
43S Reception data
44 Communication unit
50 Operation device (detection device)
51 Body
51A Operation surface
52 Communication unit
53 Input unit
54 Control unit
55 Vibration unit
56 Battery
58 Vibration unit
60 Operation device (detection device)

61A First body portion
61B Second body portion
61C Protrusion
62 Switch
63 Communication unit
64 Input unit
65 Acceleration sensor (acceleration detecting unit)
66 Gyro sensor (angular velocity detecting unit)
67 Control unit
68 Vibration unit
69 Battery
70 Operation device (detection device)
71A Arm
71B Arm
71C Opening
72 Switch
73 Communication unit
74 Input unit
75 Acceleration sensor (acceleration detecting unit)
76 Gyro sensor (angular velocity detecting unit)
77 Control unit
78 Vibration unit
79 Battery
80 Operation device (detection device)
81 Body
82 Right button
83 Left button
84 Wheel
85 Communication unit
86 Input unit
87 Control unit
88 Vibration unit
89 Battery
100 System
A Arm animation
AP Access point
B Body
BS Base station
C Character
C1 Character
C2 Character
C3 Character
E Ear animation
F Finger
G Communication screen
H Hand
N Network
T Table
U1 User
U2 User
U3 User

The invention claimed is:

1. An animation operation method performed by a detection device and comprising:
   detecting a motion of a finger of a user that is in contact with the detecting device; and
   displaying a motion of the animation of the ears corresponding to the motion detected by the detection device,
   wherein the motion of the animation of the ears comprises at least one of nodding, curling, straightening, twisting, spreading, dispreading, lengthening, shortening, shrinking of enlarging of at least one of the ears,
   wherein a correlation between the motion of the animation of the ears and the motion of the finger of the user is predetermined, and
   wherein the displayed motion of the animation of the ears expresses non-verbal information.

2. The animation operation method according to claim 1, wherein the motion of the finger of the user that is detected comprises at least one of a motion speed or a motion attribute of the finger of the user, and
   wherein the motion of the animation of the ears is a motion corresponding to the at least one of the motion speed or the motion attribute of the finger of the user.

3. The animation operation method according to claim 1, wherein the motion of the finger of the user that is detected comprises at least one of an angular velocity or an acceleration speed of the finger of the user, and
   wherein the motion of the animation of the ears is a motion corresponding to the at least one of the angular velocity or the acceleration speed of the finger of the user.

4. The animation operation method according to claim 1, wherein the detection device is a device that is worn on the finger of the user.

5. The animation operation method according to claim 1, wherein the detection device a device that includes a track pad, and
   wherein the motion of the animation of the ears is performed based on a user's finger movement on the track pad.

6. A non-transitory storage medium having stored therein an animation operation program, the animation operation program including instructions for causing a computer to perform a method comprising:
   detecting a motion of a finger of a user that is in contact with the detecting device; and
   displaying a motion of the animation of the ears corresponding to the motion detected by the detection device,
   wherein the motion of the animation of the ears comprises at least one of nodding curling, straightening, twisting, spreading, dispreading, lengthening, shortening, shrinking or enlarging of at least one of the ears,
   wherein a correlation between the motion of the animation of the ears and the motion of the finger of the user is predetermined, and
   wherein the displayed motion of the animation of the ears expresses non-verbal information.

7. An animation operation system comprising:
   a display; and
   a detection device configured to detect a motion of a finger of a user that is in contact with the detecting device,
   display a motion of the animation of the ears corresponding to the motion detected by the detection device,
   wherein the motion of the animation of the ears comprises at least one of nodding, curling, straightening, twisting, spreading, dispreading, lengthening, shortening, shrinking or enlarging of at least one of the ears,
   wherein a correlation between the motion of the animation of the ears and the motion of the finger of the user is predetermined, and
   wherein the displayed motion of the animation of the ears expresses non-verbal information.

* * * * *